United States Patent [19]
Ohnishi et al.

[11] Patent Number: 5,925,087
[45] Date of Patent: Jul. 20, 1999

[54] METHOD AND APPARATUS FOR ELIMINATING NOISE IN A SLOPE ESTIMATION ARRANGEMENT FOR A MOTOR VEHICLE

[75] Inventors: Hiroshi Ohnishi, Katsuta; Hiroshi Katayama; Mitsuo Kayano, both of Hitachi; Junichi Ishii, Katsuta; Toshimichi Minowa, Naka-gun; Michimasa Horiuchi, Katsuta, all of Japan

[73] Assignee: Hitachi, Ltd., Japan

[21] Appl. No.: 08/112,373

[22] Filed: Aug. 27, 1993

[30] Foreign Application Priority Data

Aug. 27, 1992 [JP] Japan .................................. 4-228878
Sep. 16, 1992 [JP] Japan .................................. 4-246719

[51] Int. Cl.⁶ ............................ B60K 41/22; H04B 15/06
[52] U.S. Cl. ................................... 701/70; 701/1; 701/76
[58] Field of Search ............................ 364/184, 424.098, 364/424.034, 424.036, 426.021, 426.038, 426.045, 574; 371/31; 701/70

[56] References Cited

U.S. PATENT DOCUMENTS

| | | | |
|---|---|---|---|
| 3,906,472 | 9/1975 | Guadara et al. | 340/224 |
| 4,056,782 | 11/1977 | Makino et al. | 325/313 |
| 4,137,501 | 1/1979 | Kuroyanagi et al. | 325/313 |
| 4,169,255 | 9/1979 | Hulsman et al. | 364/574 |
| 4,172,505 | 10/1979 | Rabus et al. | 180/290 |
| 4,285,252 | 8/1981 | Yamaki et al. | 477/120 |
| 4,380,048 | 4/1983 | Kishi et al. | 364/424.1 |
| 4,384,331 | 5/1983 | Fukuhara et al. | 364/574 |
| 4,490,790 | 12/1984 | Shinoda | 364/424.08 |
| 4,494,210 | 1/1985 | Miller | 364/567 |
| 4,500,977 | 2/1985 | Gelhand | 367/108 |
| 4,625,590 | 12/1986 | Müller | 477/120 |
| 4,639,885 | 1/1987 | Spock et al. | 364/574 |
| 4,679,145 | 7/1987 | Beeck et al. | 364/424.08 |
| 4,789,936 | 12/1988 | Kurihara et al. | 364/424.085 |
| 4,967,316 | 10/1990 | Goebel et al. | 361/424 |
| 5,033,002 | 7/1991 | Sol | 364/426.03 |
| 5,119,321 | 6/1992 | Burton et al. | 364/574 |
| 5,231,582 | 7/1993 | Takahashi et al. | 364/424.085 |
| 5,231,897 | 8/1993 | Morita | 477/120 |
| 5,267,158 | 11/1993 | Sakaguchi et al. | 364/424.1 |
| 5,300,820 | 4/1994 | Sayama et al. | 307/234 |
| 5,333,944 | 8/1994 | Shirai et al. | 364/426.02 |
| 5,361,207 | 11/1994 | Hayafune | 364/424.086 |
| 5,455,779 | 10/1995 | Sato et al. | 364/574 |

FOREIGN PATENT DOCUMENTS

| | | |
|---|---|---|
| 0 471 102A1 | 2/1992 | European Pat. Off. . |
| 27 00 788A1 | 7/1978 | Germany . |
| 29 29 266C2 | 3/1980 | Germany . |
| 28 52 195C2 | 6/1980 | Germany . |
| 30 12 896A1 | 10/1980 | Germany . |
| 30 18 032C2 | 11/1981 | Germany . |
| 31 44 845A1 | 12/1982 | Germany . |
| 33 41 652C2 | 6/1985 | Germany . |
| 35 39 682C2 | 5/1986 | Germany . |
| 36 21 674A1 | 1/1987 | Germany . |
| 40 10 104A1 | 10/1990 | Germany . |
| 41 12 577A1 | 10/1991 | Germany . |
| 60-70307 | of 1985 | Japan . |
| 3-24362 | of 1991 | Japan . |

Primary Examiner—Kevin J. Teska
Assistant Examiner—Russell W. Frejd
Attorney, Agent, or Firm—Evenson, McKeown, Edwards & Lenahan, P.L.L.C.

[57] ABSTRACT

A method and apparatus to estimate slopes accurately, as well as to eliminate slope estimation errors, taking error generating conditions into account. The slope on which the vehicle is running is estimated from the vehicle speed and the engine rpm value. The result is entered to the slope estimation unit through a low pass filter, then to the navigation unit. A noise eliminator is provided to the output of the slope estimation unit so that noises can be eliminated, for example, during gear-shifting or for a certain time after the gear shifting is completed by obtaining the "gear shifting" information from the automatic transmission control. The preceding estimated slope value is held during the noise elimination period.

6 Claims, 53 Drawing Sheets

SLOPE VARIABLE FUNCTION 1

SLOPE VARIABLE FUNCTION 2

SLOPE VARIABLE FUNCTION 3

SLOPE VARIABLE FUNCTION 4

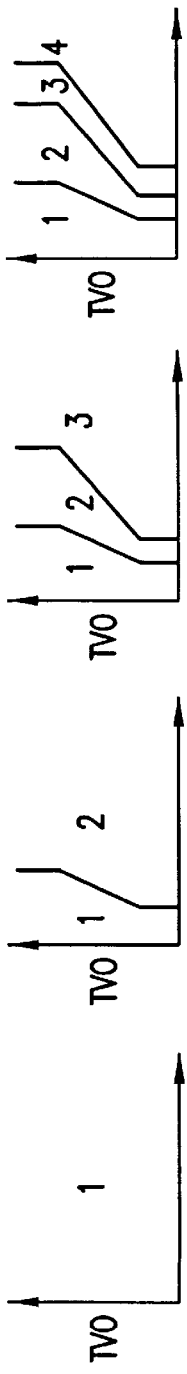
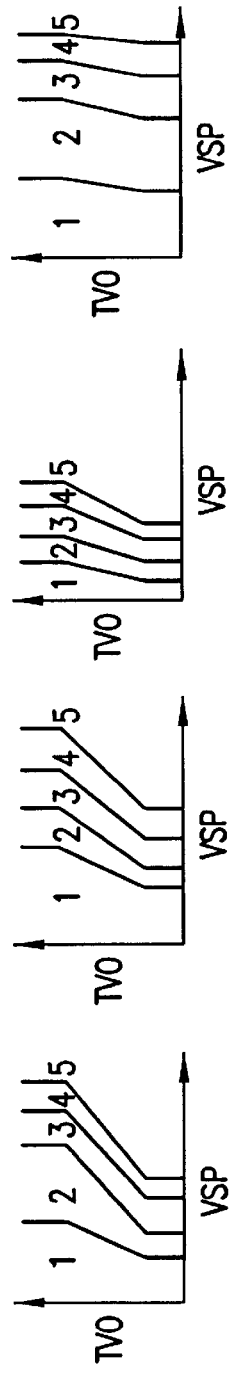
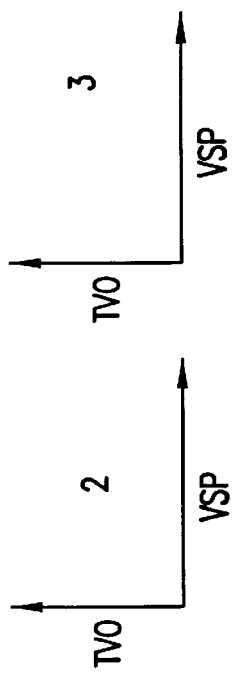
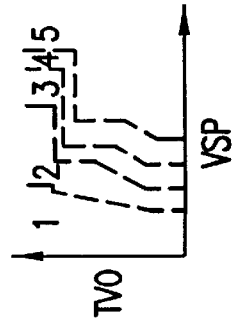
FIG.33a  FIG.33b  FIG.33c  FIG.33d
FIG.33e  FIG.33f  FIG.33g  FIG.33h
FIG.33i  FIG.33j  FIG.33k

METHOD AND APPARATUS FOR ELIMINATING NOISE IN A SLOPE ESTIMATION ARRANGEMENT FOR A MOTOR VEHICLE

BACKGROUND OF THE INVENTION

This invention is related to a method and apparatus for estimating the slope of a surface on which a vehicle is operating, and for controlling the vehicle based on the estimated slope information.

Vehicles that are comfortable to ride in are in great demand in recent years. In order to satisfy such demand, it is necessary to provide smooth control of the automatic transmission and other systems in response to the operating conditions in which the vehicle is running, such as, for example, going up or down an incline.

It is of course easy to sense a slope using a slope meter if the vehicle is at rest. However, when the vehicle is running, it is almost impossible to sense the slope using such a slope meter because the slope determination can be affected by acceleration of the vehicle. Such slope meters are therefore not useful for the conventional arts to sense the slope on which the vehicle is running. Instead, known devices have been developed to judge the status of any slope based on information concerning the engine output.

As described in Japanese Patent Laid-Open No. 24362/1991, conventional slope estimation units have used vehicle speed, throttle opening, and the rate of change of throttle opening to determine the subject slope status, and have controlled shifting of the vehicle gears according to the slope. However, such conventional units cannot sense a slope accurately enough to assure a comfortable driving environment to the driver.

A different technique is used in Japanese Patent Laid-Open No. 70307/1985, in which the slope is calculated based on longitudinal vehicle acceleration sensed directly and the acceleration found by calculating the rate of change of the vehicle speed. In this method, a pulse output vehicle speed sensor is used, and the sensor output is converted to voltage signals in a frequency-voltage converter.

The accuracy of slope estimation may be affected by the status and mechanical characteristics of the engine in some cases. For example, errors are apt to occur when the throttle opening is changed abruptly, when the brakes are applied, while a gear is being shifted and in other transient situations.

In prior art devices, output shaft torque is calculated and the acceleration torque is determined from the differentiated vehicle speed. However, estimation errors seem to be unavoidable due to the mechanical characteristics of the engine and the transmitter.

In other prior art, an acceleration sensor is used to detect the acceleration in the longitudinal direction of the vehicle. When the vehicle is going up or down a hill, the acceleration due to gravity affects this sensor so that it is impossible to find the acceleration of the vehicle correctly. Moreover, the latter method mainly utilizes analog processing which includes a frequency-voltage converter. Problems also arise because the errors generated by large fluctuations in vehicle running speed are not taken into account. In addition, the hardware required for this method is very expensive.

The purpose of the present invention, therefore is to provide a slope estimation apparatus, which eliminates estimation errors by eliminating noises appropriately to the physical phenomena and mechanical characteristics of the engine and the transmission. The slope can thus be estimated accurately and the estimated slope information can be used to control the vehicle, such as for example the shifting pattern of an automatic transmission. In other words, the purpose of this invention is to supply a slope estimation unit that can output consistently highly accurate slope estimation information.

SUMMARY OF THE INVENTION

In order to solve the first problem mentioned above, a first embodiment of this invention provides a slope estimation unit that has a device to calculate the vehicle torque and a device to detect the vehicle speed, and determines the running resistance from the vehicle speed. It then subtracts the running resistance from the vehicle torque to find the slope resistance and to estimate the slope of the vehicle operating surface. In another embodiment of the invention, the slope on which the subject vehicle is running is determined based on two types of acceleration information: that is, acceleration detected directly by an acceleration sensor, and acceleration found by differentiating the running speed of the vehicle.

In both of the above embodiments, the running speed of the vehicle is sensed by measuring the cycle of a train of pulses generated during a rotation cycle of a sensor attached to a rotating element of the vehicle drive train. Acceleration information is obtained by differentiating the vehicle's running speed detected by this running speed calculating means. Because the cycle of the pulses output from the sensor is measured to find the running speed of the subject vehicle, no frequency-voltage converter is needed in this invention. Measured values can also be digitized to sense slopes more accurately.

The slope estimation unit according to the invention is equipped with a noise suppression arrangement to eliminate noises from the estimated slope information. The noise suppression apparatus has a unit to determine when a noise is generated in the estimated slope information, and to suppress changes in the estimated slope information.

Other objects, advantages and novel features of the present invention will become apparent from the following detailed description of the invention when considered in conjunction with the accompanying drawings.

BRIEF DESCRIPTION OF THE DRAWINGS

FIG. 33 shows a variety of alternative gear shifting patterns;

DETAILED DESCRIPTION OF THE DRAWINGS

Figure 1:
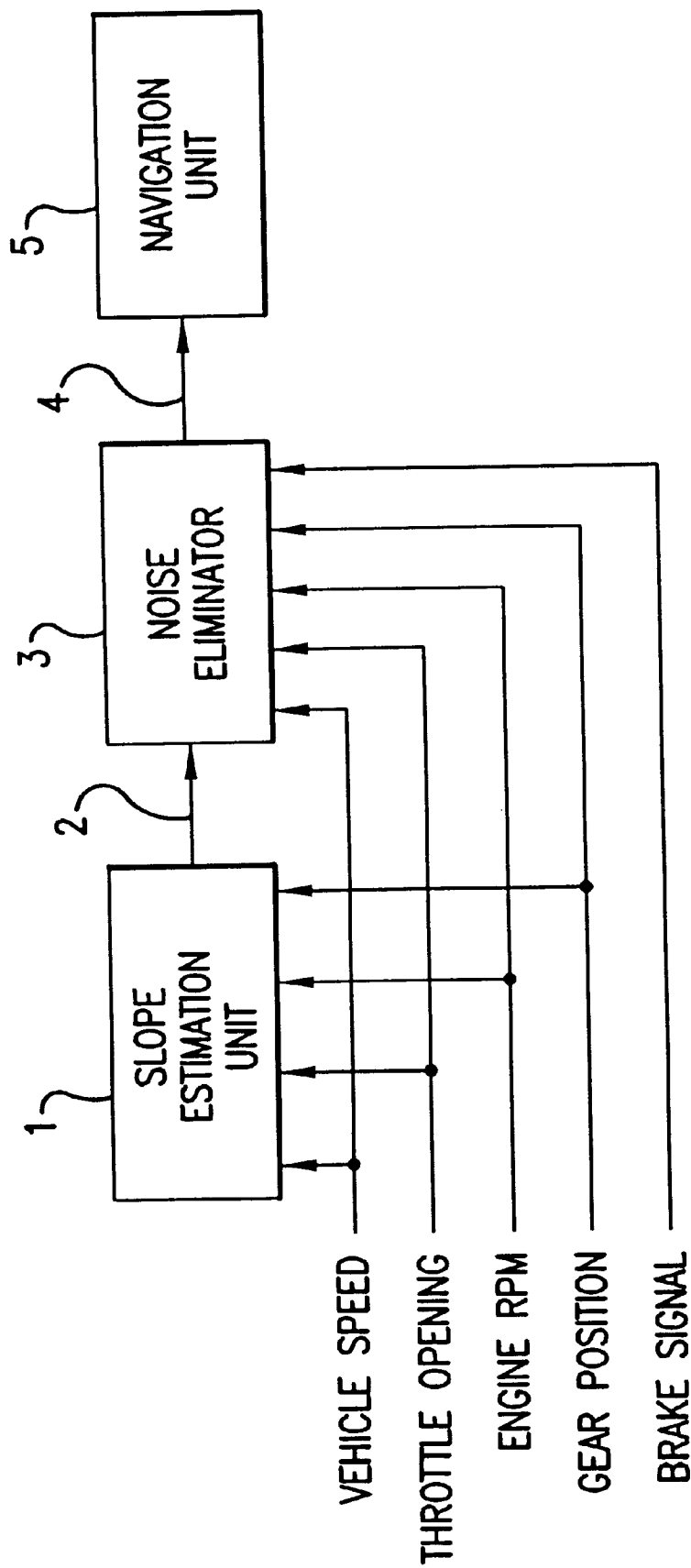
FIG. 1 is a conceptual block diagram of an embodiment of this invention which includes a noise suppression arrangement.

The slope oriented navigation system according to the invention, shown in the conceptual block diagram of FIG. 1, has a slope estimation unit 1, a noise suppression unit 3 and a navigation unit 5. The slope of the vehicle operating surface is estimated in the slope estimation unit 1 based on the internal status of the engine and the transmission, including the vehicle speed, throttle opening, engine speed, gear position brake operation, etc. The slope estimation unit 1 outputs the estimated slope information 2 to the noise suppression unit 3 which eliminates errors due to noises occurring in the input information concerning the internal status of the engine and transmission. In general, this is accomplished by suppressing any change of the estimated slope information provided by the slope estimation unit 1 during a noise elimination time period; that is, the noise suppression unit 3 causes the estimated slope value provided just prior to the noise eliminating period to be held constant through the noise eliminating period.

Figure 2:
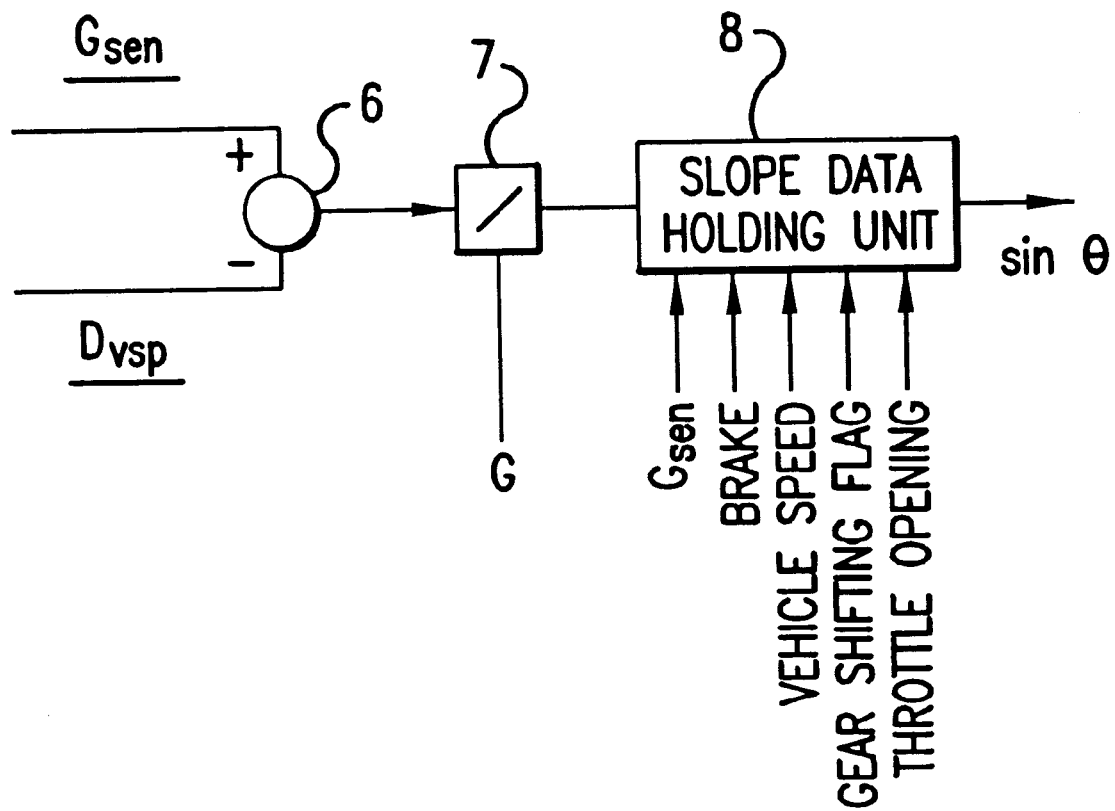
FIG. 2 is a conceptual block diagram of another embodiment of the invention having a noise suppression arrangement.

FIG. 2 shows another embodiment of the invention having a slope data holding unit 8 which receives and holds the estimated slope value sin θ from the subtraction unit 6 and division unit 7. (The manner of determination of slope value in this embodiment based on Gsen and DVSP is explained hereinbelow.) It also receives signals from a variety of sensors which monitor operating parameters of the vehicle, such as the acceleration sensor output Gsen, the braking signal, the vehicle speed signal, the speed changing flag, and the throttle opening signal, which signals are used to determine whether the vehicle is in a transient status that can cause errors or noise in the vehicle slope determination (the noise eliminating period). The slope value Sin θ is updated by the slope data holding unit 8 only when such transient status is not detected. That is, when the detected slope error may be large, updating of the slope value Sin θ is inhibited so that the slope can always be detected correctly.

The combinations of mechanical phenomena which can cause noise distortion in the estimated slope information are determined beforehand, and the system is programmed to generate a noise elimination signal based on the internal status of the vehicle mentioned above. For example, the time period when gear shifting is being performed in an automatic transmission, plus a certain time thereafter, is designated as a noise eliminating time period, and noises are eliminated. The length of the noise eliminating time period is determined by a low pass filter used in the internal processings. After noise elimination, the gear shifting pattern of automatic transmission (AT) can be changed by the navigation unit 5 (FIG. 1), using the estimated slope information 4 according to the subject slope status.

In one embodiment of the invention, the start and end of conditions which may cause frequent gear shifting (for example, high vehicle speed on a 5 to 6% slope) are detected, and an increase of the shifting frequency is suppressed by maintaining gear position after the gear is shifted down from the top gear position. In addition, it is also desirable to suppress unnecessary shifting when the accelerator pedal is released temporarily on an upwardly inclined slope (6 to 7%, for example), such as may occur on a curve or in a scenic place. In such cases, a shift pattern is used which permits, upshifting only when the throttle opening is low at higher vehicle speeds.

On a downward slope, at a low running speed, the gear position and the engine brake one way clutch are controlled so that safe driving may be assured with engine braking. While controlling the vehicle at a constant speed, slopes can be recognized, and the responsiveness of the vehicle on slopes can be substantially improved, making good use of this characteristic.

The navigation system according to the invention can also be used in a similar manner, to control the engine, the electronic throttle, antilock braking operation, traction, navigation, and the like. For example, slope estimation errors can be corrected in the navigation system by the declination of the vehicle itself. This is effective to minimize the accumulated location estimation errors.

Figure 3:
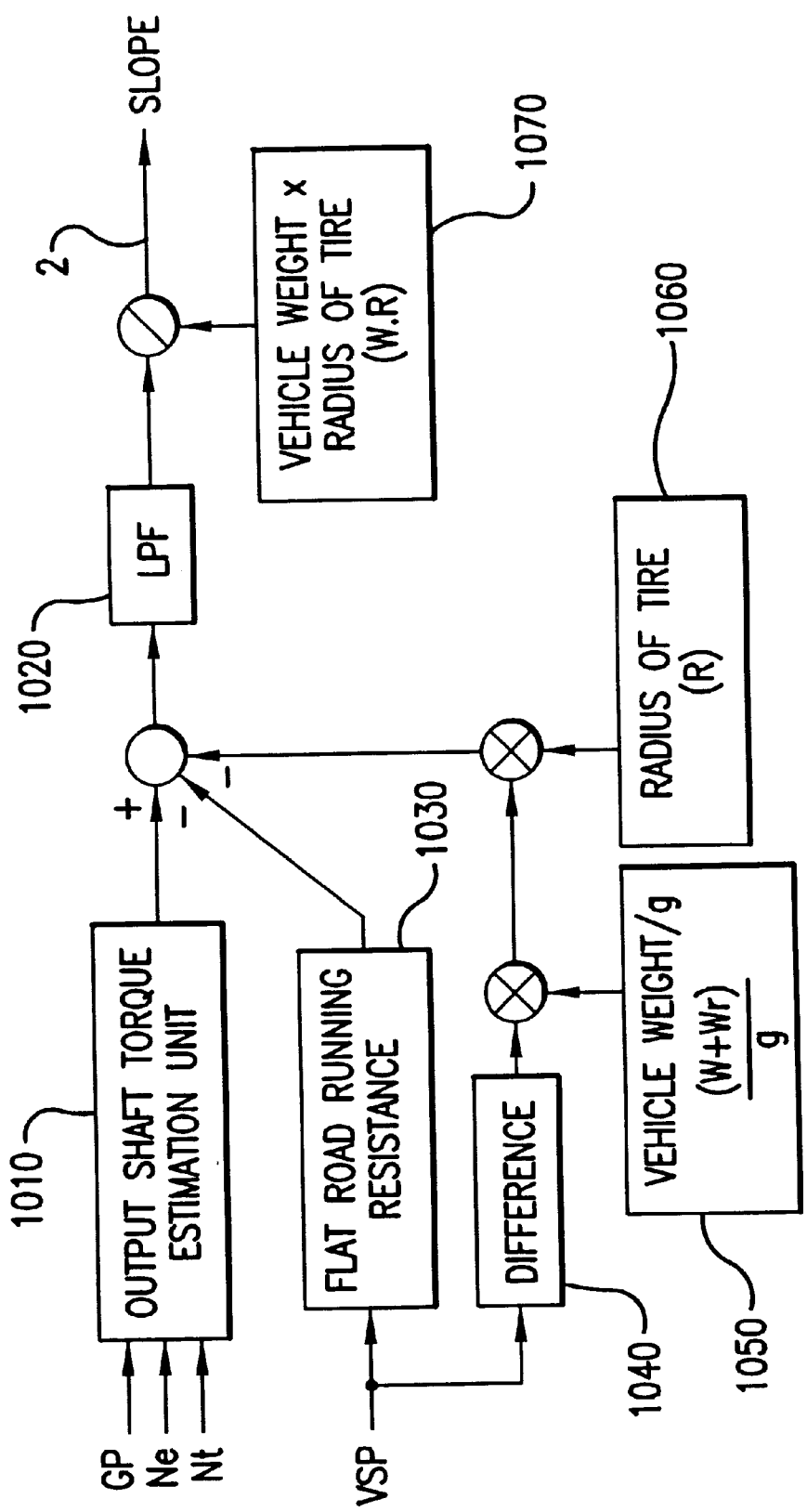
FIGS. 3, 4 and 5 respectively are block diagrams of alternative embodiments of slope estimation units according to the invention.

FIG. 3 is a block diagram of a first embodiment of the slope estimation unit 1 shown in FIG. 1. FIG. 3 will be explained below, first by way of appropriate mathematical expressions. The running resistance $F_R$ of a vehicle generated during driving at a constant speed, as shown in Expression 1 below, is the sum of rolling resistance, air resistance, and slope resistance:

$$F_R = F_r + F_A + F_\theta \qquad \text{[Expression 1]}$$

$F_R$: Running Resistance
$F_r$: Rolling Resistance
$F_A$: Air Resistance
$F_\theta$: Slope Resistance
The rolling resistance $F_r$, air resistance $F_A$ and slope resistance $F_\theta$ in turn are defined by expressions 2, 3 and 4 as follows:

$$F_r = \mu_r \cdot W \qquad \text{[Expression 2]}$$

W: Total Vehicle Weight
$\mu_r$: Rolling Resistance Coefficient $$F_A = \mu_1 \cdot A \cdot V^2 \qquad \text{[Expression 3]}$$

$\mu_r$: Air Resistance Coefficient
A: Frontal Projected Area
V: Vehicle Speed $$F_\theta = W \cdot \sin\theta \qquad \text{[Expression 4]}$$

θ: Slope
Combining expressions 2–4 with expression 1 above yields the following expression for the calculation of running resistance:

$$F_R = (\mu_r \cdot W) + (\mu_1 \cdot A \cdot V^2) + (W \cdot \sin\theta) \qquad \text{[Expression 5]}$$

The acceleration resistance $F_\alpha$ (that is, the force that must be exerted on the vehicle to achieve a particular acceleration α) is defined in expression 6, based on Newton's second law, F=ma:

$$F_\alpha = (W + W_r)/g \cdot \alpha \qquad \text{[Expression 6]}$$

$W_r$: rotational Inertia Equivalent Weight
$F_\alpha$: Acceleration Resistance
α: Acceleration (found by differentiating vehicle speed)
g: Conversion Constant (acceleration due to gravity)
When the vehicle is being accelerated, the diving force $F_o$ exerted by the vehicle drive train is equal to the sum of the vehicle running resistance $F_R$ and acceleration resistance $F_\alpha$, as shown in expression 7 which can be manipulated to yield expressions 8 and 9.

$$F_o = F_\alpha + F_R = F_\alpha + F_r + F_A + F_\theta \qquad \text{[Expression 7]}$$

$F_o$: Driving Force $$W \cdot \sin\theta = F_o - (F_r + F_A) - F_\alpha \qquad \text{[Expression 8]}$$

$$\sin\theta = 1; W \cdot \{F_o - (F_r + F_A) - F_\alpha\} \qquad \text{[Expression 9]}$$

$F_o$, the driving force transmitted to the vehicle by the engine, the torque converter, and the gear train, can be used to find the driving torque, using expression 10 shown below.

$$T_o = R \cdot F_o \qquad \text{[Expression 10]}$$

R: Radius of vehicle tires
Combining expressions 6 and 10 with expression 9 yields the following:

$$\sin\theta = \frac{1}{W \cdot R}\left[T_o - \{R \cdot (F_r + F_A)\} - \left\{R \cdot \left(\frac{W + W_r}{g}\right)\alpha\right\}\right] \qquad \text{[Expression 11]}$$

Expression 12 below is used to find the constant speed flat road running torque based on the flat road running resistance of the vehicle.

$$T_{RL} = R \cdot (F_r + F_A) \qquad \text{[Expression 12]}$$

$T_{RL}$: Flat Road Running Resistance
The overall vehicle driving torque $T_o$ can be determined by reference to expressions 13–16 below. First, expressions 13, 14 and 15 define respectively the input/output rotation speed ratio e, the input pump torque $T_p$ and the output turbine torque $T_t$ of the vehicle's torque converter unit:

$$e = N_t/N_e \qquad \text{[Expression 13]}$$

Nt: Turbine speed
Ne: Engine speed $$T_p = Ne^2 \cdot \tau(e) \quad \text{[Expression 14]}$$

τ(e): Torque converter pump capacity coefficient
$T_p$: Pump torque $$T_t = t(e) \cdot T_p \quad \text{[Expression 15]}$$

$T_t$: Turbine torque

Expressions 13–15 can be used to find the vehicle driving torque $T_o$ as shown in expression 16:

$$T_o = T_t \cdot r(G_p) \cdot r_f \quad \text{[Expression 16]}$$

$$= Ne^2 \cdot \tau(e) \cdot t(e) \cdot r(G_p) \cdot r_f$$

t(e): Torque ratio
r: Gear ratio
$r_f$: Gear ratio of the differential
$G_p$: Current Gear position The operation of the slope estimation unit according to the invention, which utilizes the relationships embodied in the above expressions, will now be explained by reference to the drawings.

Figure 5:
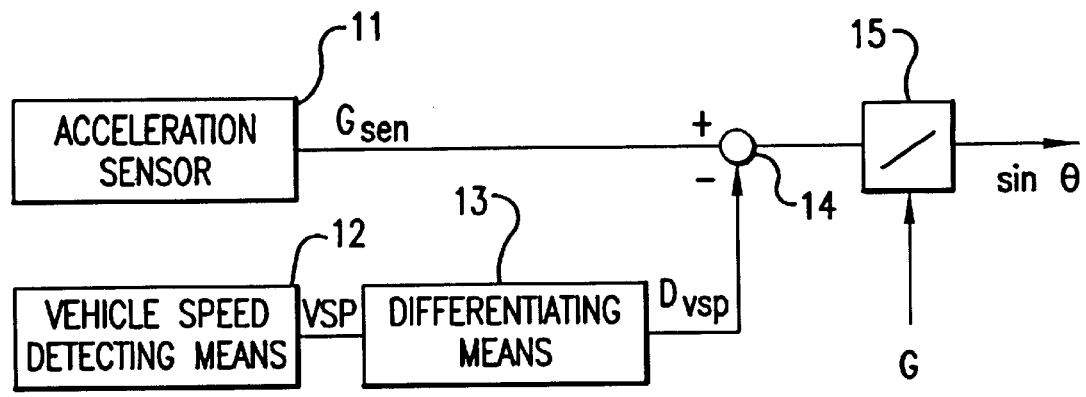

FIG. 3, is a conceptual block diagram of an embodiment of an arrangement for slope estimation according to expression 11 above. The flat road running resistance is determined from a look up table based on the vehicle speed Vsp, in the flat road running resistance unit 1030, while the differentiated vehicle speed found in the vehicle speed differentiator unit 1040 is multiplied by the total vehicle mass (that is, total vehicle weight W+Wr, divided by the acceleration due to gravity g) and the radius of the tires 1060. These two quantities are subtracted from the output shaft torque estimated in the output shaft torque estimation unit 1010 according to the vehicle running conditions such as the vehicle speed, turbine speed, engine speed, gear position, etc, as shown in FIG. 5. The result is then passed through low pass filter 1020 and divided by the total vehicle weight and the radius of the tires 1070 to find the slope 2. (See expression 11.)

Figure 4:
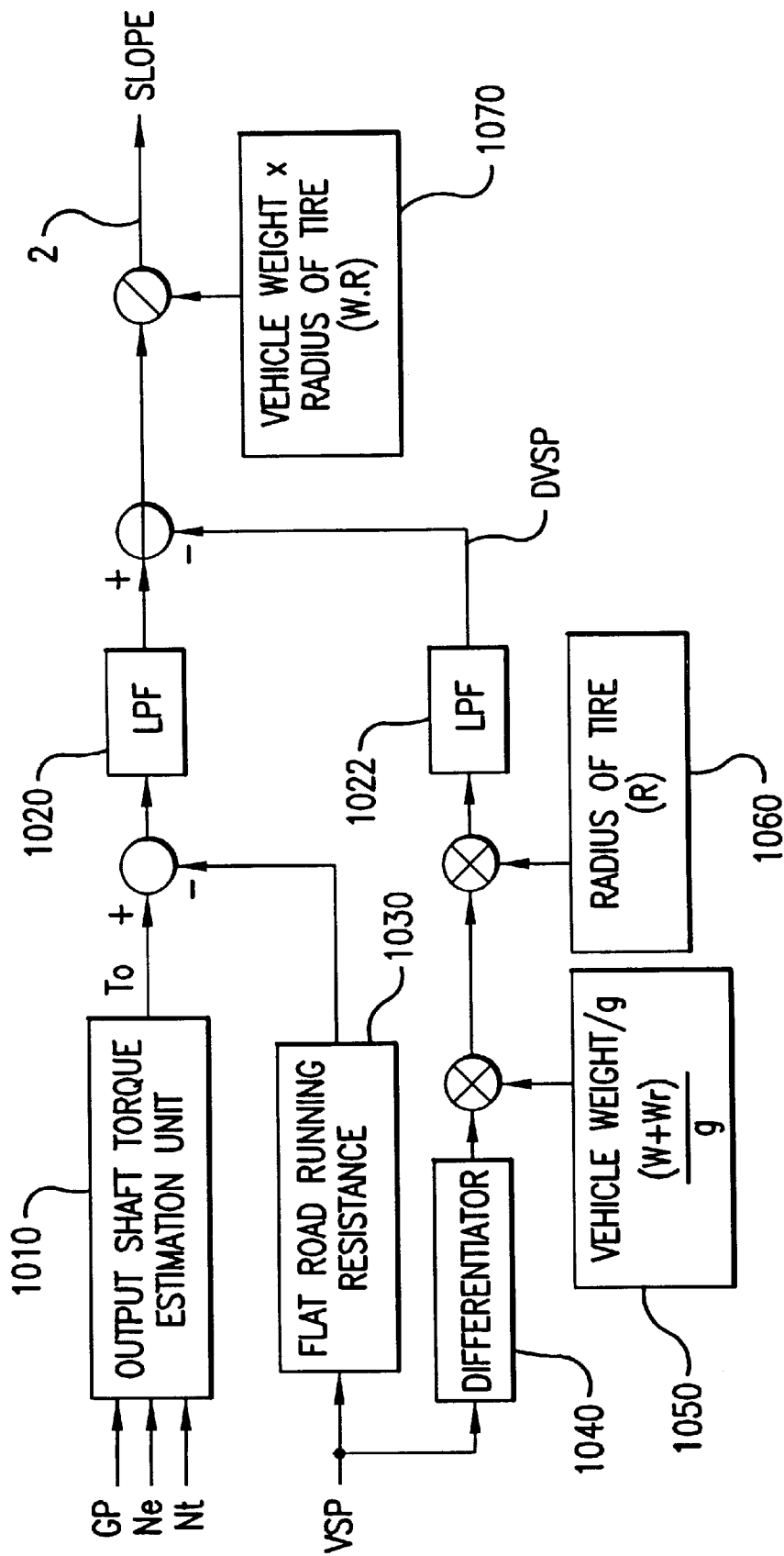

FIG. 4 is an alternative embodiment of an arrangement for determining vehicle slope based on mathematical expression 11. It differs from FIG. 2 in that the resulting signal $D_{VSP}$ from elements 1040, 1050 and 1060

$$\left( R \cdot \left( \frac{W + W_r}{g} \right) \alpha \right)$$

is passed through a separate low pass filter 1022, and is then summed algebraically with the output of the first low pass filter 1021. This embodiment has the advantage that the separately filtered signal $D_{VSP}$ is available for use as needed in controlling other processes.

FIG. 5 is a conceptual block diagram of another embodiment of the slope estimation unit in FIGS. 1 and 2. In this embodiment, 11 indicates an acceleration sensor; 12 is a vehicle speed sensor; 13 is a differentiator; 14 indicates a subtracting means, and 15 a dividing means. The acceleration sensor 11 is a pendulum type sensor (not shown in detail), and is mounted on the center line of the vehicle. It is used to detect acceleration in the longitudinal direction of the vehicle, and outputs the signal "Gsen" as the measured acceleration value.

It should be noted that while the pendulum type accelerometer 11 utilized in the embodiment of FIG. 1 is inherently affected by gravitational forces when the vehicle is operated on an incline, the acceleration value obtained by differentiating the vehicle speed determined by the vehicle speed sensor 12 is not. Thus, the difference between the two signals can be used to determine the effect of gravitational forces, and the elevation angle θ can be found by simple trigonometry, as described below.

Figure 6:
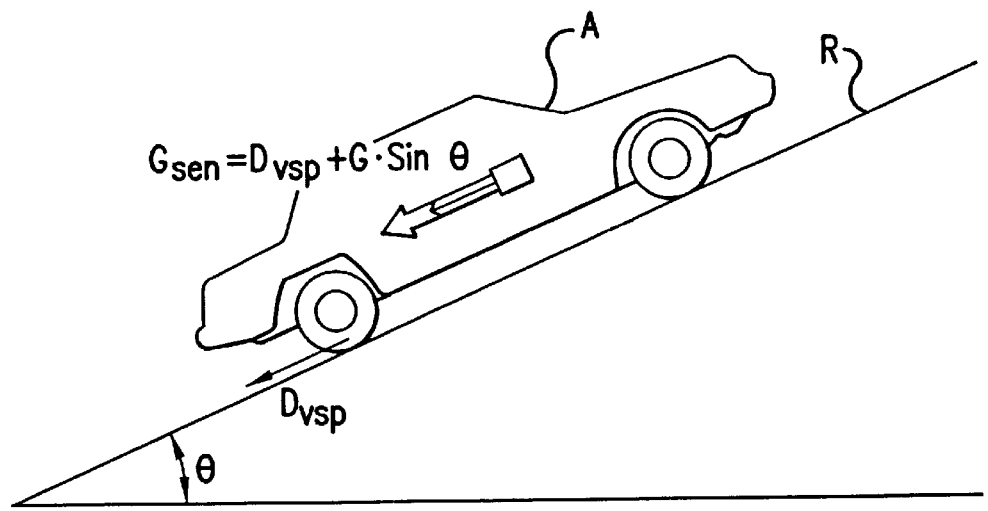
FIG. 6 illustrates the principles of the slope sensor unit according to the invention.

FIG. 6 is a schematic depiction of a vehicle resting on an incline; which shows the operating principles used by the device shown in FIG. 1. Assume that a vehicle A is on a road R that inclines by an angle of θ. The signal Gsen detected by the acceleration sensor contains not only the component Dvsp that indicates the actual acceleration in the longitudinal direction of the vehicle, but also the gravitational component G·sin θ.

On the other hand, if the wheels of the vehicle A are neither stuck nor idle, the running speed Vsp output from the vehicle speed sensor 12 accurately indicates the running speed of the vehicle A. Thus, the signal Dvsp that indicates the differentiated value of the running speed Vsp corresponds accurately to the actual acceleration of the vehicle A.

Since the signal Gsen is a total of the signal Dvsp and the signal G·sin θ, the slope Sin θ of the road R can be calculated using the expression 17.

$$\mathrm{Sin}\theta = \frac{Gsen - Dvsp}{G} \quad \text{[Expression 17]}$$

Referring again to FIG. 5, the running speed Vsp output from the vehicle speed detecting means 12 is differentiated by the differentiator 13 to calculate the acceleration Dvsp of the vehicle. Subtracting means 14 then subtracts the signal Dvsp from the signal Gsen, which is obtained by directly measuring the acceleration. Dividing means 15 divides the output from the subtracting means 14 by the acceleration due to gravity G, to output the slope signal Sin θ according to Expression 17.

Actually, the slope of the road R indicates the angle θ shown in FIG. 6. If this angle θ is small (Sin θ<0.12 or so), however, Sin θ, Tan θ, and the angle θ (in radians) are approximately equal. So, Sin θ is used as the slope of the road R in this example. In other words, the slope Sin θ can be found by subtracting the differentiated value Dvsp of the wheel speed from the signal Gsen of the acceleration sensor 11, then dividing the result by the gravity acceleration G. Usually, a slope is represented by the tangent value Tan θ as an angle θ between the plane and the slope. In the case of a slope of less than 10%, Sin θ=Tan θ. Thus, Sin θ is assumed as a slope value. This is because the slope resistance, when the vehicle weight is Mcar, is calculated as Mcar·G·Sin θ and it is convenient to use Sin θ as the value of the slope.

Figure 7:
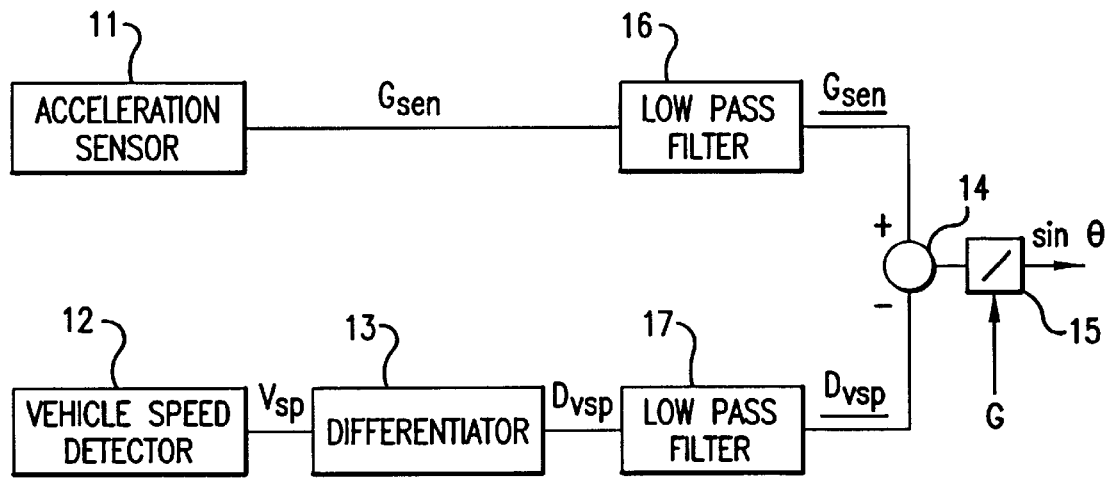
FIG. 7 is a block diagram which shows the basic configuration of another embodiment of the slope sensor unit according to the invention, including low pass filters.

In such a device as shown in FIG. 2, low pass filters are often used to reduce noises, as shown in FIG. 7, in which a low pass filter 16 is mounted between the acceleration sensor 11 and the subtracting means 14, and another low pass filter 17 is mounted between the differentiating means 13 and the subtracting means 14. When acceleration Dvsp is found from vehicle speed Vsp, the high frequency noise element is amplified through differentiation, and the amplified noise is added to the acceleration signal. The low pass filter 17 is used to eliminate the noise and obtain noiseless acceleration signal Dvsp. On the other hand, noise can also be added to the signal from the acceleration sensor 11. As a result, the signal must be matched with the acceleration signal Dvsp from the vehicle speed in phase and frequency characteristics. Thus, the signal from the acceleration sensor 11 is entered to the low pass filter 16, and the output signal Gsen is then entered to the subtracting means 14. The two low pass filters 16 and 17 should have the same frequency and phase characteristics as the signals Gsen and Dvsp.

Figure 8:
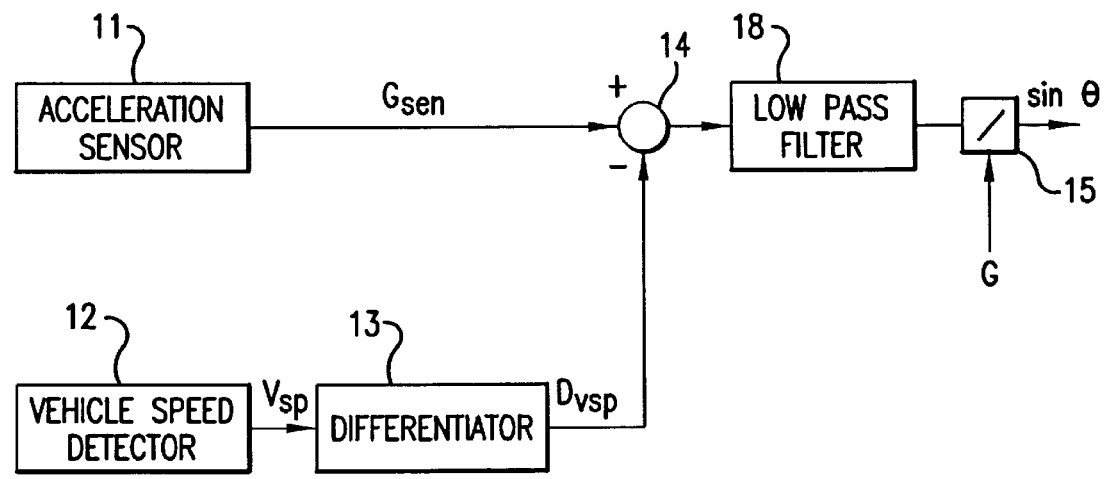
FIG. 8 is a block diagram which shows the basic configuration of yet another embodiment of the slope sensor unit according to the invention, having a low pass filter.

In FIG. 8, a single low pass filter 18 is mounted between the subtracting means 14 and the dividing means 15.

In the embodiment shown in FIGS. 5–8, two types of acceleration information are used to calculate the slope on which a vehicle is operated. First, the acceleration is measured directly by an acceleration sensor or the like; and second, the acceleration is calculated by differentiating the running speed of the vehicle.

The vehicle speed sensor used to detect the running speed VSP of the vehicle for the purpose of FIGS. 3, 4 and 5, comprises a pulse detecting type revolution speed sensor and a sensor output pulse cycle measuring means. The speed sensor, which generates pulses having a cycle that changes according to the revolution speed, may have either a magnetic, or a photoelectric pickup. The vehicle speed is calculated accurately by measuring the periodic cycle of output shaft revolution pulses. FIGS. 35 through 47 explain the determination of vehicle speed.

Figure 35:
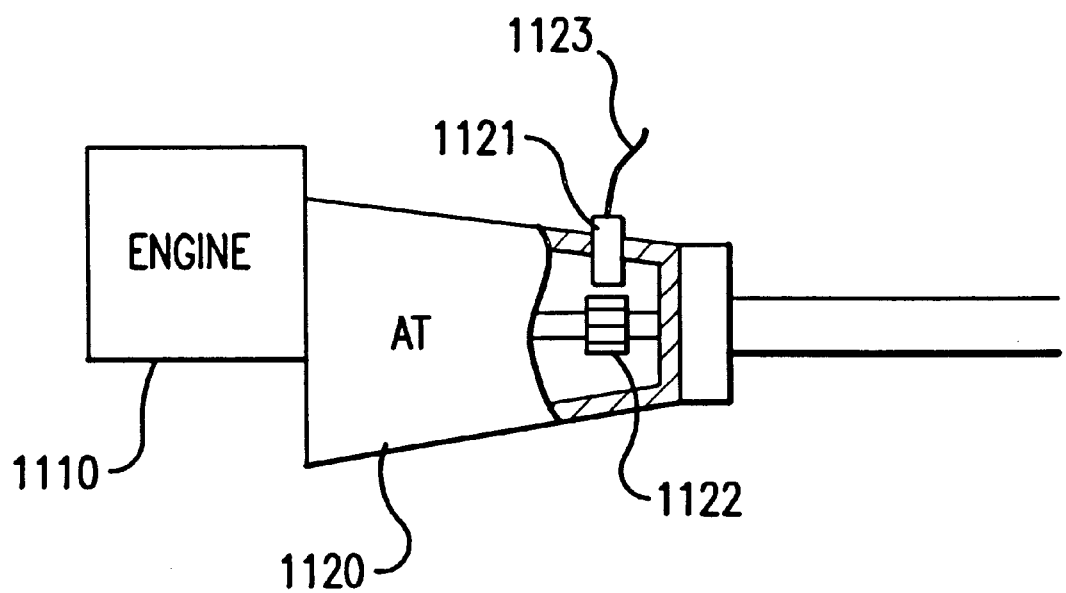
FIG. 35 shows an engine and transmission configuration.

In FIG. 35, the rotation of the engine 1110 is transmitted to the automatic transmission 1120, and then to the drive shaft through the torque converter. When the gear 1122 attached on the drive shaft is rotated, an output pulse train 1123 is generated from the vehicle speed sensor 1121 of the magnetic (or other) pickup in a manner that is known, per se. The cyclic period of these rotation pulses is measured to find the vehicle speed (vehicle speed being inversely proportional to such period). The gear 1122 and the vehicle speed sensor 1121 may also be mounted on the wheel shaft.

Figure 36:
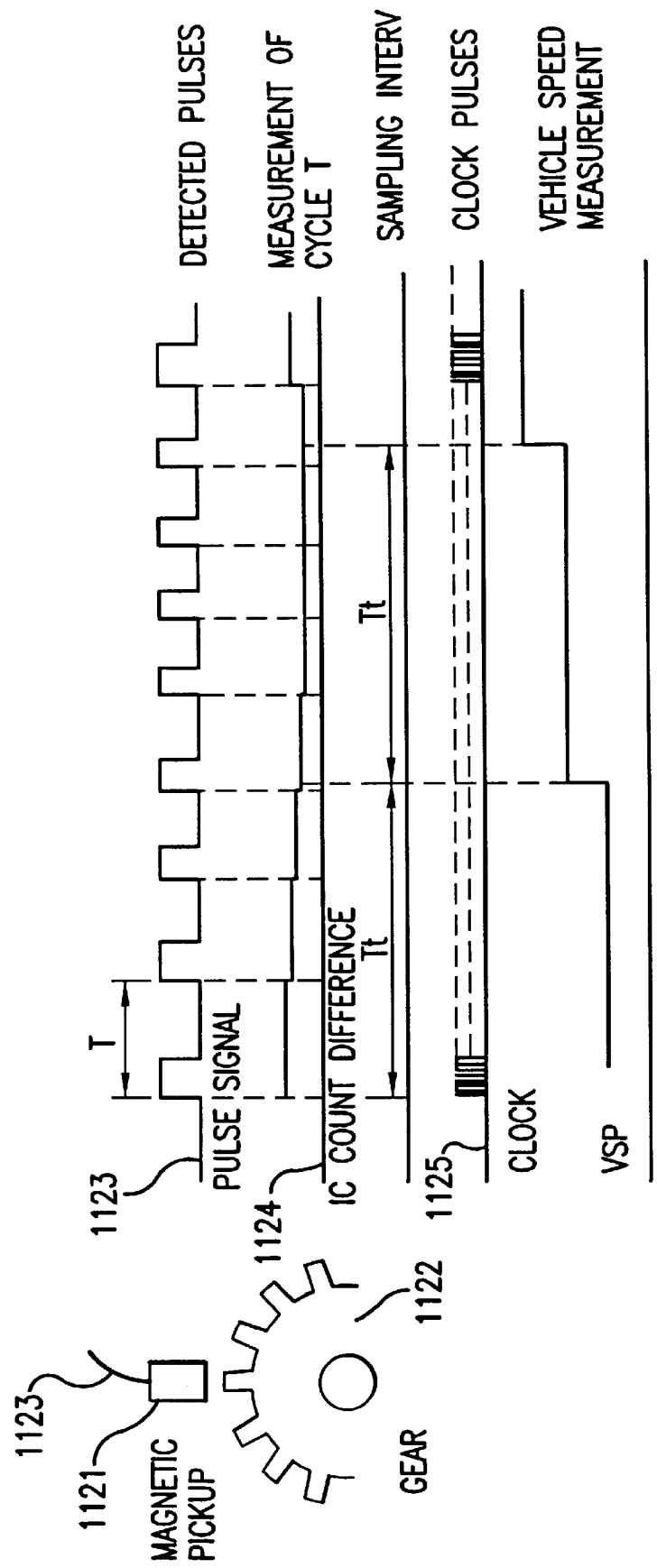
FIG. 36 shows a timing chart of vehicle speed measurement.

FIG. 36 shows the pulse generating apparatus of FIG. 35 in greater detail, together with a timing diagram which illustrates the determination of vehicle speed from the gear attached on the drive shaft (or a wheel shaft). When the gear 1122 is rotated, the pulse train 1123 is generated from the magnetic pickup of the vehicle speed sensor 1121. The clock signal 1125 is used to measure the intervals between the leading edges of these pulse signals to find the length of cycle T, shown at 1124. At fixed time intervals $T_t$, the most recently measured value of cycle T is sampled, and the result is converted to the vehicle speed $V_{sp}$.

Figure 37:
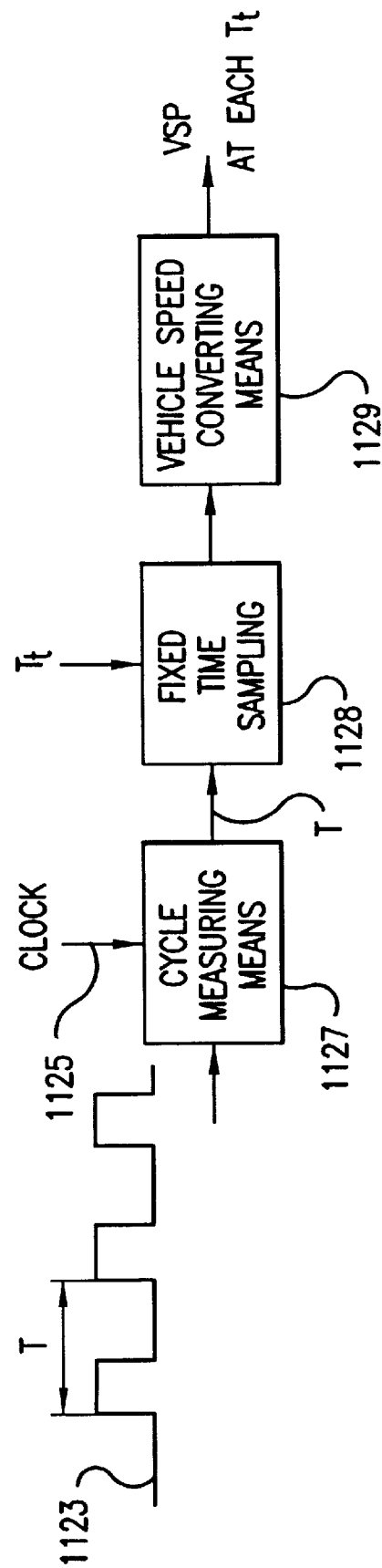
FIG. 37 is a block diagram of an arrangement for vehicle speed measurement.

FIG. 37 shows a schematic diagram of an arrangement to determine vehicle speed in the manner depicted in FIG. 36. The cycle of pulse signal 1123 is measured by the cycle measuring unit 1127 using clock signals 1125 to find the length of cycle T, which is sampled at fixed intervals $T_t$ in the sampling unit 1128, and the result is converted to the vehicle speed in a conventional manner in the vehicle speed conversion unit 1129.

Figure 38:
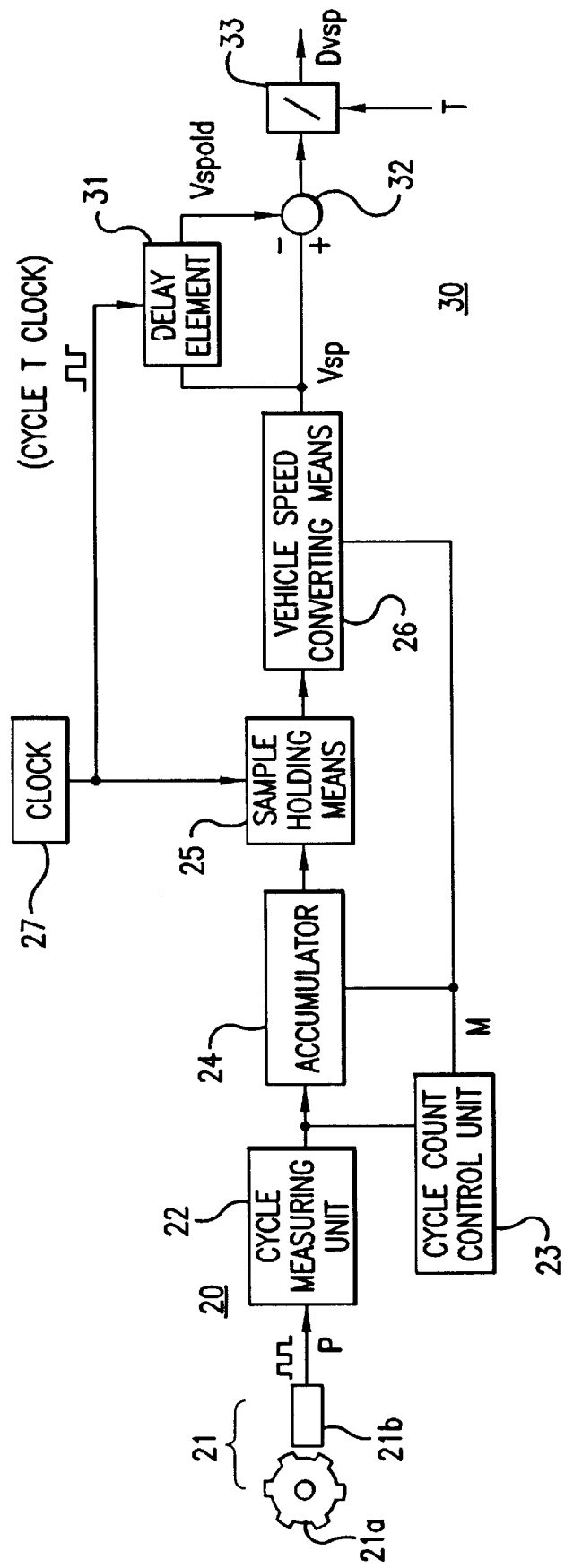
FIG. 38 is a block diagram of another embodiment of an arrangement for measuring vehicle speed, including a differentiation arrangement to determine vehicle acceleration.

FIG. 38 is a block diagram of another embodiment of a speed sensing arrangement, which also includes a differentiator to determine vehicle acceleration. (See FIGS. 3–8.) In this embodiment, 20 indicates a vehicle speed sensing arrangement and 30 is a differentiating segment, which correspond respectively to the vehicle speed sensor 12 and the differentiator 13 in the slope sensor unit shown in FIGS. 5, 7 and 8. When the arrangement shown in FIG. 38 is combined with the other elements of FIGS. 5, 7 and 8, that is the acceleration sensor 11, the subtracting means 14, the dividing means 15, and the low pass filters 16 and 17 (or the low pass filter 18), the slope value Sin θ detected by the dividing means 15 is output in the same manner as in the slope sensor unit shown in those figures. The embodiment of FIG. 38 may also be used to generate the signal Vsp in FIGS. 2 and 3, with the differentiating segment 30 corresponding to the differentiator 1040.

The pulse type revolution sensor 21 in FIG. 38 comprises a gear 21a made of a magnetic material, mounted on the drive shaft or wheels of the vehicle, and a magnetic pickup 21b placed near the circumference of the gear 21a. The sensor 21 generates a train of pulses P having a frequency which is proportional to the running speed of the vehicle, and a period or cycle that is inversely proportional to the running speed.

The cycle measuring unit 22 receives the train of pulses P generated by the sensor 21 and measures the time duration or period of a single cycle T. Since each pulse represents theoretically a precisely known portion of a single turn of the vehicle's drive train, it is apparent that the length of the measured cycle can be used to determine vehicle speed. However, as discussed below, it is inevitable in practice that the spacing of the gear teeth in the sensor 21 will be subject to errors, thus giving rise to noise errors in the vehicle speed measurement. Therefore, in order to average such inaccuracies and achieve a more accurate speed measurement, it is desirable to measure the duration T of a number of cycles of the pulse train P, especially at high driving speeds. On the other hand, however, if the number of cycles is too great, the measured value at low speeds may exceed the capacity of the components in the system. Accordingly, it is also desirable to vary the number of cycles M over which the cycle measurement is accumulated, based on the speed of the vehicle (M being greater at high speeds and smaller at low speeds). The arrangement of FIG. 38 includes apparatus to perform such a variation based on vehicle speed. The cycle count control unit 23 receives the measured value of a single pulse cycle T from the cycle measuring unit 22 (which, as noted previously, is indicative of vehicle speed) and determines (as described hereinafter) a number of cycles M of the pulse train P over which the measured value should be accumulated. M, therefore, is an integer whose maximum value equals the number of teeth on the gear 21a.

The cycle count control unit 23 outputs the value of M to the accumulator 24, which in turn accumulates the measured cycle values received from cycle measuring unit 22, over M cycles of T. The sample/holding unit 25 samples the accumulated measurement value in accumulator 24 synchronously with the clock signal $T_{clock}$ supplied from the clock signal generator 27, and holds the value until the next sampling time. The speed calculator 26 divides the measured cycle value held in the sample/hold unit 25 by the data integration count M to calculate the vehicle speed Vsp in a manner explained below.

The delay element 31 delays the vehicle speed value Vsp synchronously with the clock signal $T_{clock}$, and outputs the delayed vehicle speed Vspold. Subtracting unit 32 subtracts the vehicle speed Vspold delayed by the sampling cycle from the vehicle speed Vsp, and dividing unit 33 divides the signal output from the subtracting means 32 by the length of the clock cycle $T_{clock}$ to generate the acceleration Dvsp.

$$\left(\text{That is, acceleration} = \frac{\Delta v}{\Delta t}.\right)$$

Figure 39:
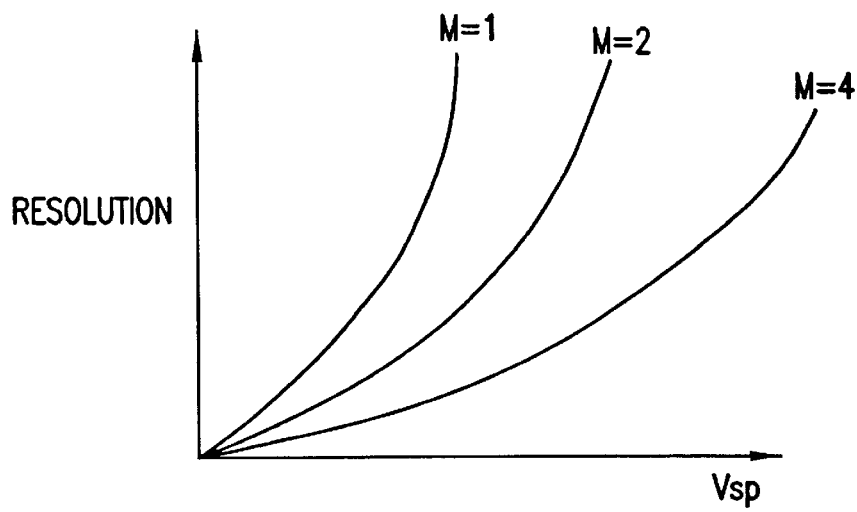
FIG. 39 shows a set of characteristics representing the relationship between accumulated clock pulse count and vehicle speed resolution in an embodiment of this invention.

Next, the cycle count control unit 23 will be explained in more detail. FIG. 39 shows the relationship between the number of cycles measured M, and resolution for measuring the vehicle speed Vsp. As shown in the figure, the larger the data integration count M is, the more the resolution of the vehicle speed Vsp is improved. That is, the quantization error is reduced.

Figure 40A:
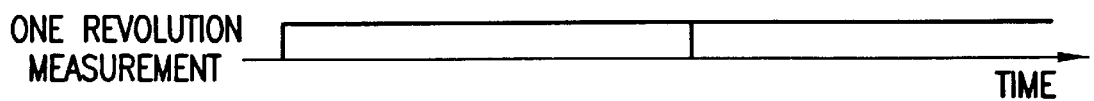
FIG. 40 is a timing diagram which shows speed detection errors and countermeasures in an embodiment of the invention.
Figure 40B:
Figure 40C:

FIG. 40 illustrates a cycle measurement error caused by a pitch error (uneven gear teeth spacing) in the gear 21a. In other words, it is unavoidable to generate at least some pitch error in the gear 21a because of manufacturing tolerances and cost. As shown in this figure, therefore, significant cycle measurement errors, caused by the pitch error in the gear 21a, appear inevitable in cycle measurement for one cycle of the pulse train P.

To average the cycle measurement error and improve the measurement accuracy, the measured cycle T value is accumulated over a number of cycles M. The maximum value of the integrating count M, as shown in FIG. 30C, is equal to the number of teeth for one rotation of the gear 21a. In the embodiment of FIG. 38, six teeth are shown schematically; in actual practice 21 teeth have been used advantageously.

Figure 41:
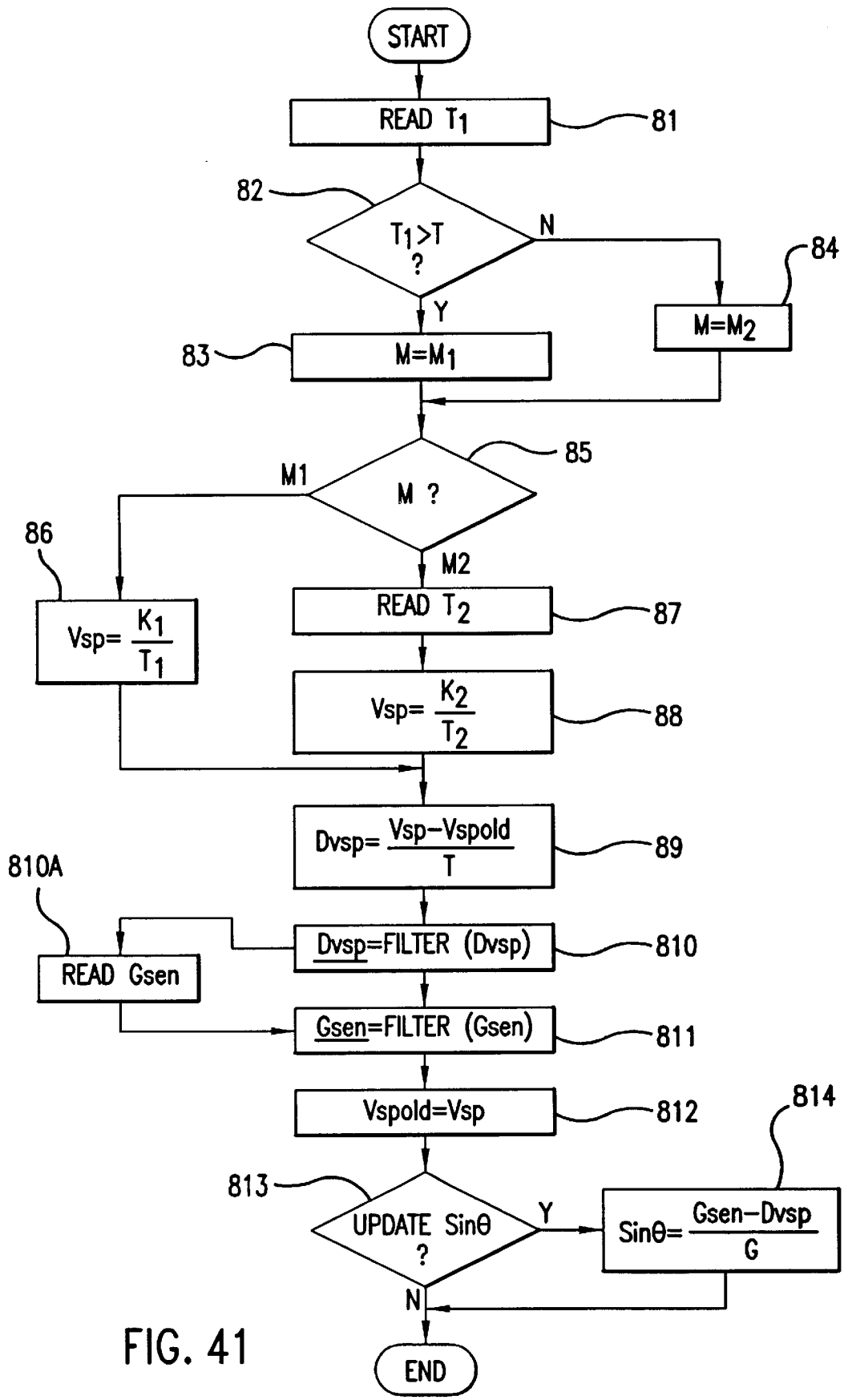
FIG. 41 is a flow chart which illustrates the operation of an embodiment of the invention.

FIG. 41 is a flow chart which shows the operation of a slope estimation unit according to the invention, which includes the speed and acceleration measuring apparatus of FIG. 38. Processing is initiated at step 81, in which the most recently sampled value $T_1$ of a single cycle T is read, and compared with a predetermined threshold value $T_x$ (step 82). If $T_1 > T_x$ (that is, vehicle speed is less than a corresponding value $V_x$), then M is set to $M_1$ (step 83); and if $T_1 \leq T_x$ ($V_{sp} \geq V_x$), M is set to $M_2$ (step 84), which is an integer greater than $M_1$. Next a determination is made (step 85) whether the current value of M equals $M_1$ or $M_2$. If $M=M_1$, then vehicle speed is calculated (step 86) as $K_1/T_1$, wherein $K_1$ is a proportionality constant ($V_{sp}$ being inversely proportional to T). If $M=M_2$ in step 85, then the value $T_2$ (the total length of $M_2$ cycles of T) is read at step 87 and $V_{sp}$ is calculated at step 88 in the same manner as in step 86, using a proportionality constant $K_2$ which bears the same ratio to $K_1$, as $M_2:M$. It should be noted that more than two values of M may be used by establishing additional thresholds $T_x$ in an analogous manner.

Next, the difference between the current vehicle speed Vsp and the vehicle speed Vspold determined in the previous sampling cycle is divided by the sampling cycle T to find the differentiated value Dvsp of the vehicle speed (step 89). Gsen is read (from the acceleration sensor) at step 810A, and the signals Dvsp and Gsen are both also passed through a low pass filter (steps 810, 811) to eliminate noises, and the vehicle speed Vspold determined in the previous cycle is updated with the new value (step 812).

Next, a check is made (step 813) whether the slope Value Sin θ can be updated or not, as explained below. If it can be updated, <u>Dvsp</u> is subtracted from data <u>Gsen</u>, and the result is divided by the acceleration due to gravity G to calculate the slope value Sin θ (step 814).

Figure 42:
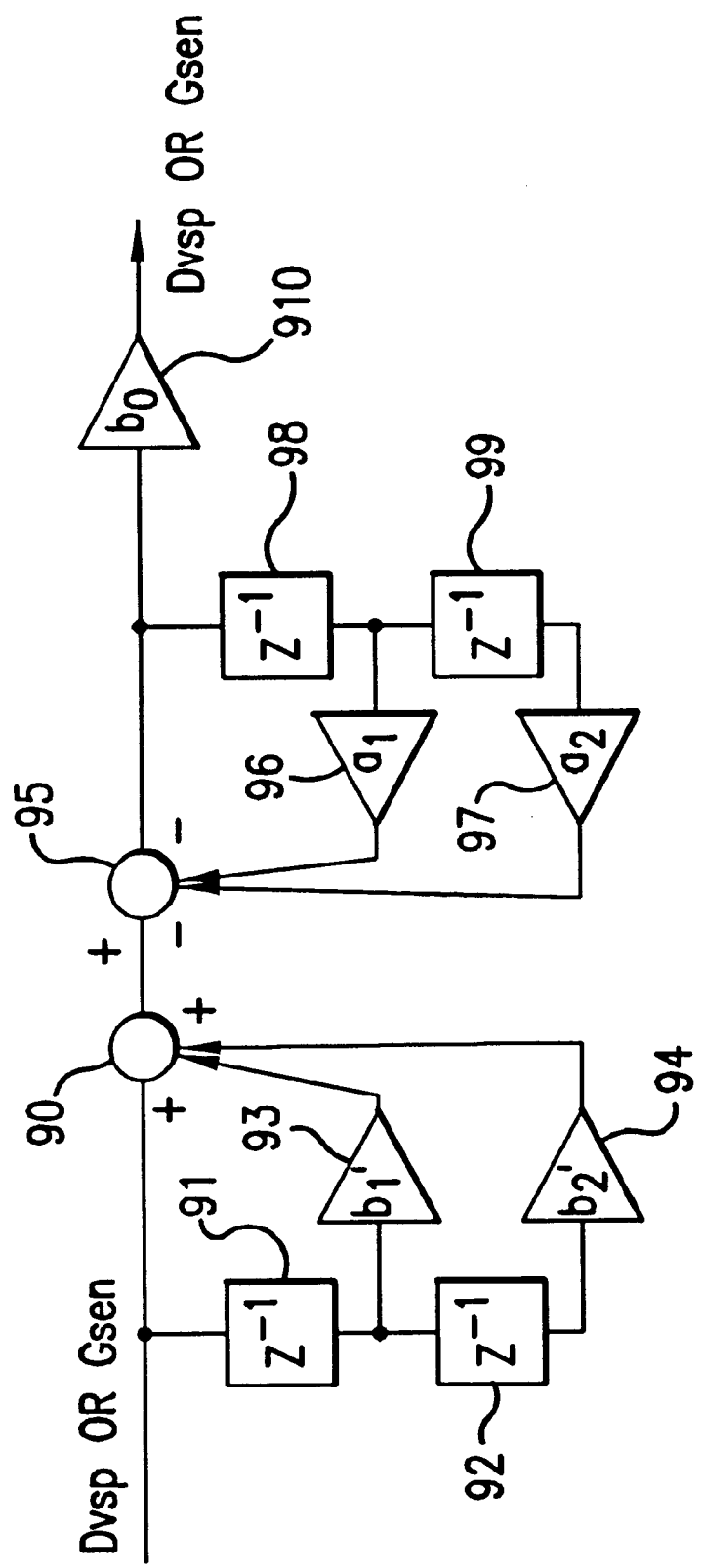
FIG. 42 is a block diagram of an embodiment of the low pass filter according to the invention.

As shown in FIGS. 7 and 8, the slope estimation arrangement according to the invention can achieve more accurate results using low pass filters such as shown in FIG. 42. This unit comprises two adders 90 and 95, four delay elements 91, 92, 98, and 99, and five amplifiers 93, 94, 96, 97 and 910.

As will be recognized by those skilled in the art, the transmission functions of the low pass filter shown in FIG. 42 is represented by Expression 2 (below). Thus, the filtering characteristics can be changed by adjusting the gains of the amplifier 93, 94, 96, and 97.

$$F(z) = \frac{b_0 + b_1 \cdot Z^{-1} + b_2 \cdot Z^{-2}}{1 + a_1 \cdot Z^{-1} + a_2 \cdot Z^{-2}} \quad \text{[Expression 18]}$$

$$= \frac{1 + b_1' \cdot Z_{-1} + b_2' \cdot Z^{-2}}{1 + a_1 \cdot Z^{-1} + a_2 \cdot Z^{-2}} \cdot b_0$$

where $b_1 = b_1' \cdot b_0; b_2 = b_2' \cdot_0$

Figure 43:
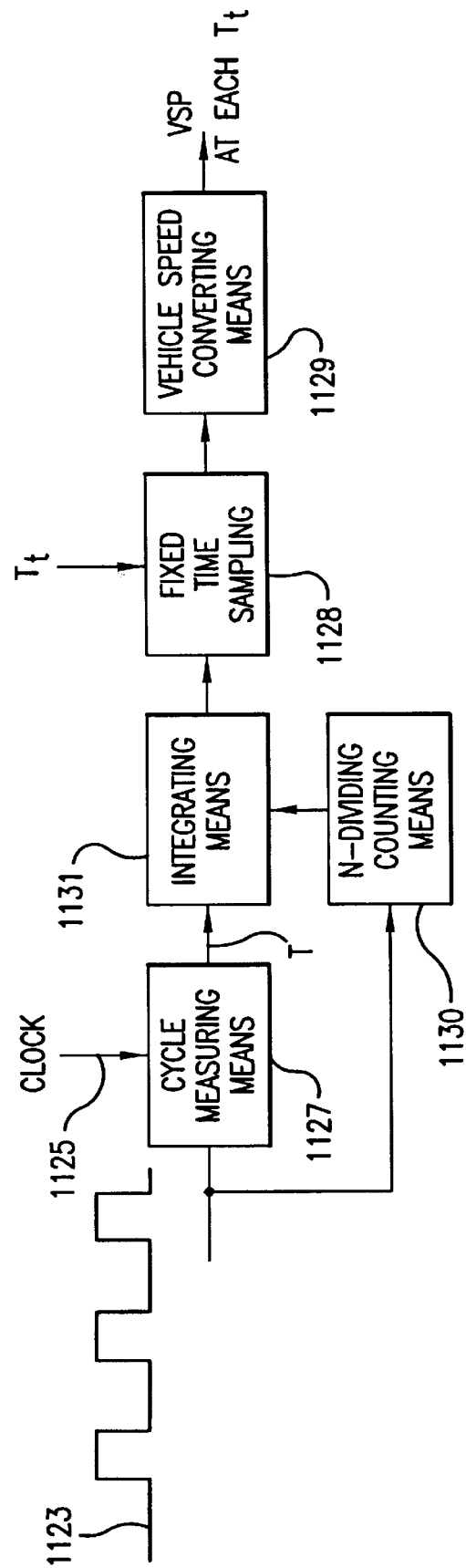
FIG. 43 is a block diagram of another arrangement for vehicle speed measurement.

FIG. 43 shows a block diagram of another embodiment for finding the vehicle speed where the pitch of the gear teeth may not always be constant. As noted previously, the resulting error can be minimized by measuring the cycle for an entire rotation of the gear. Cycle measuring unit 1127 uses clock signal 1125 to find the cycle T. For this purpose, the signal pulses 1123 are entered into a frequency divider 1130 which reduces their frequency by a factor of N. The integrator unit 1131 accumulates the total number of clock pulses 1125 until it receives an output pulse from the frequency divider 1130. The resulting integrated value is sampled at fixed intervals $T_t$ in the sampling unit 1128, and the result is converted to the vehicle speed in the vehicle speed conversion unit 1129.

Figure 44:
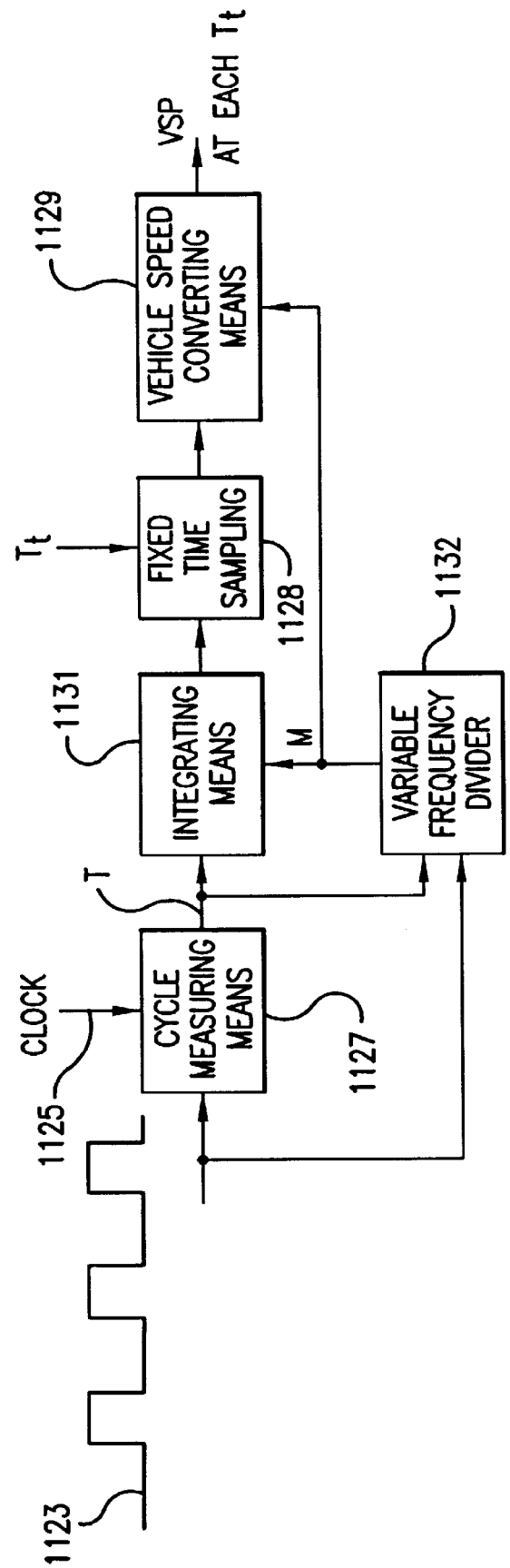
FIG. 44 is a block diagram of an arrangement for vehicle speed measurement based on the variable divided cycle measurement.

FIG. 44 is a block diagram of yet another arrangement for determining vehicle speed. As shown in FIG. 43, the measurement error can be minimized by increasing the dividing ratio; however, in such an arrangement, the measured cycle value may overflow at low vehicle speeds. (That is, the number of clock pulses during the measured period may exceed the capacity of the counter 1127.) In addition, noises are left in some areas due to the timing inaccuracies among the vehicle speed, the clock, and the vehicle speed conversion. To eliminate this noise, and to measure the vehicle speed more accurately, the dividing ratio can be changed according to the vehicle speed. As in FIGS. 37 and 43, the pulse signal 1123 is measured by counting clock pulses 1125 in the cycle measuring unit 1127 to find the cycle T. This cycle T is integrated in the integrating means 1131 until a pulse is received from the frequency divider 1132, which divides the frequency of pulses 1123 by a factor of M, which in this case is controlled in response to the length of cycle T as measured in cycle measuring unit 1127. (The manner in which the factor M is controlled by cycle T is shown in FIG. 41, especially steps 82 and 85.) This integrated value is sampled at fixed intervals $T_t$ in the sampling unit 1128. The result is then converted to the vehicle speed in the vehicle speed conversion unit 1129 according to the dividing ratio M.

Figure 45:
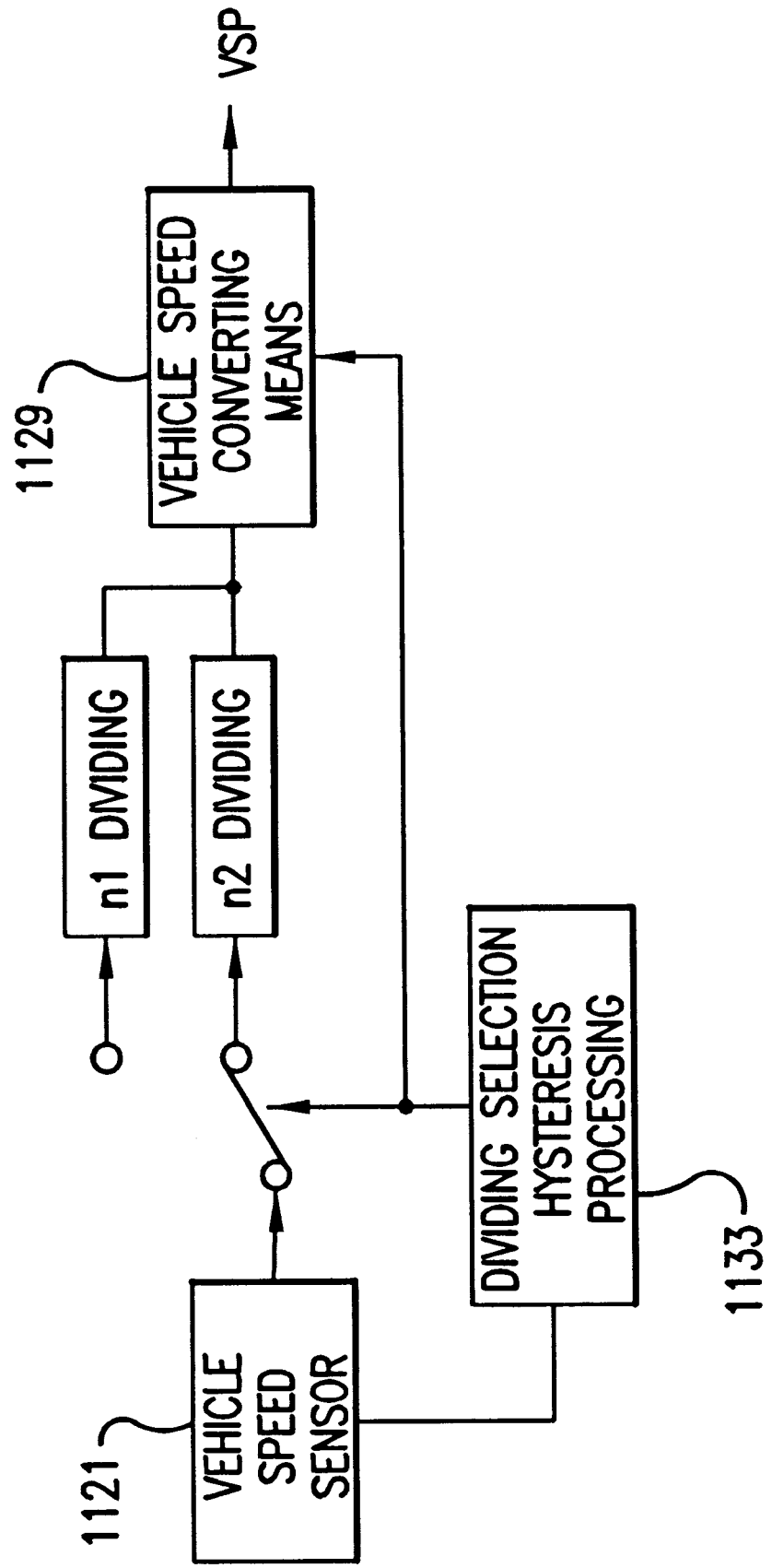
FIG. 45 is a block diagram of an arrangement for vehicle speed measurement based on variable dividing cycle measurement and including a hysteresis unit.

FIG. 45 shows another alternative embodiment in which the pulse output signal from vehicle speed sensor 1121 is divided by one of two factors $N_1$ and $N_2$ in order to determine vehicle speed Vsp, with the selection of $N_1$ and $N_2$ being controlled by hysteresis unit 1133. The hysteresis function provided in this manner can minimize the variation caused by changing the dividing ratio, even when the vehicle is running at a speed with which the dividing ratio is changed. This hysteresis is also useful to avoid frequent changes of the dividing ratio.

Figure 46:
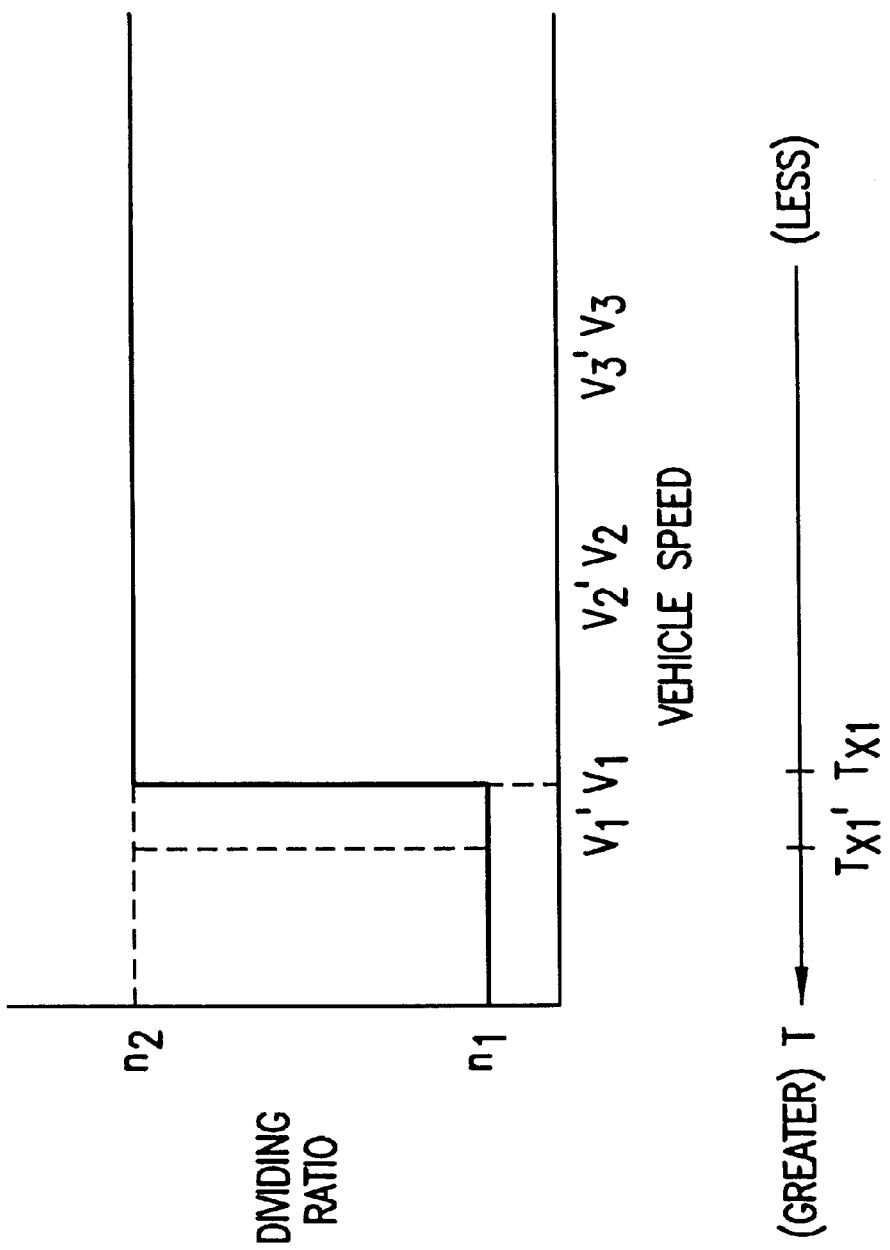
FIG. 46 is a graph of a hysteresis function suitable for use in FIG. 45.

FIG. 46 is a graphic depiction of the variable dividing operation with hysteresis. When the vehicle speed is increasing, the dividing ratio $N_1$ is used for vehicle speed up to $V_1$, while $N_2$ is used for speeds over $V_1$. When vehicle speed is decreasing, $N_2$ is used for speeds of $V_1'$ or more, and $N_1$ when the speed is less than $V_1'$. The values of the measured cycle period T corresponding to vehicle speed are shown below the graph, with the values $T_{x1}'$ and $T_{x1}$ corresponding to velocities $V_1'$ and $V_1$ being indicated. (Note that because vehicle speed varies inversely with T, in FIG. 47 the values of T increase toward the left and decrease toward the right.)

Figure 47:
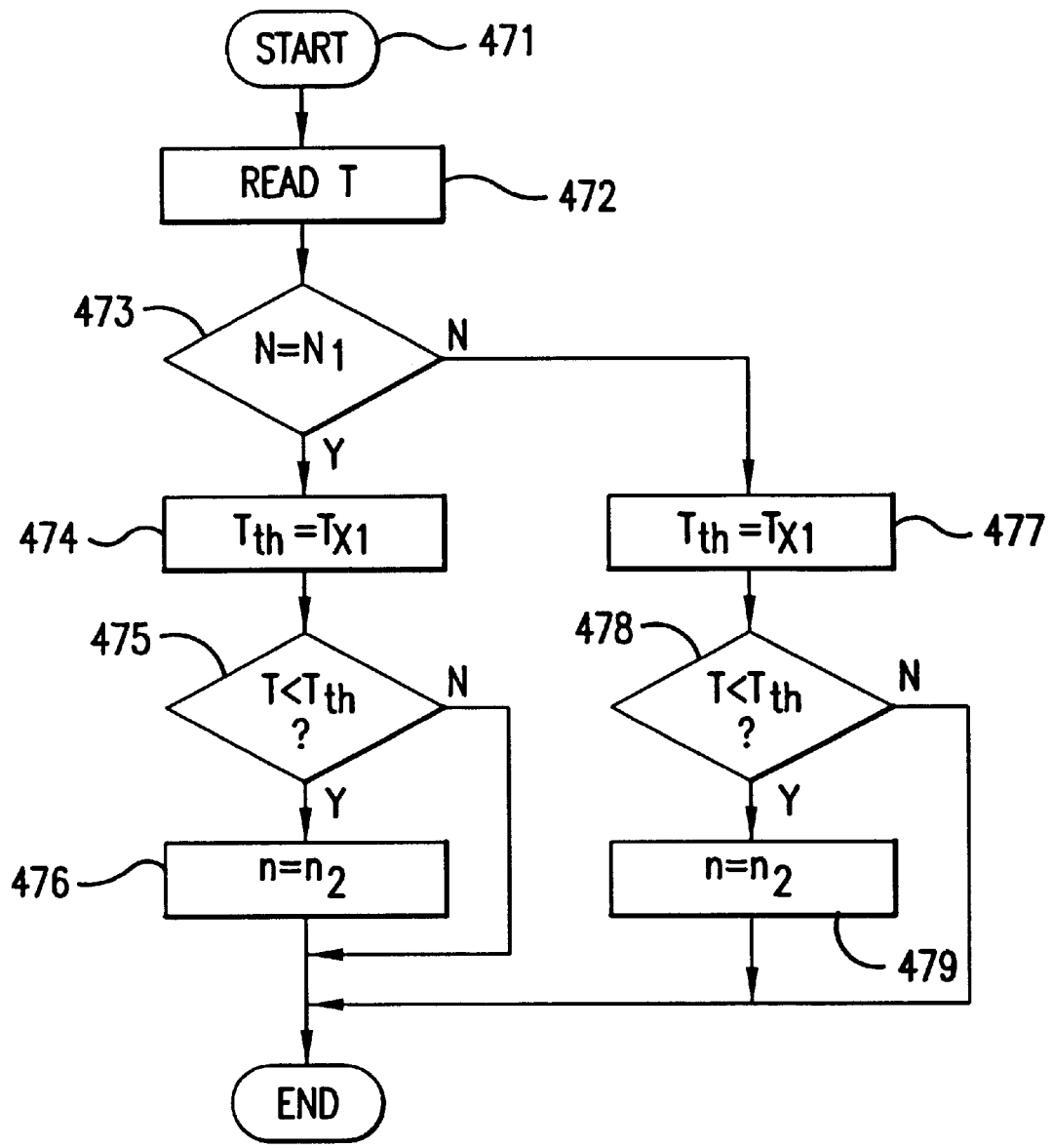
FIG. 47 is a flow chart which shows the manner of operation of the hysteresis unit 1133 in FIG. 45.

FIG. 47 is a flow chart which illustrates the operation of the hysteresis unit 1133. At step 472, the most recently sampled value of T is read and stored, and at step 473 a determination is made whether the current value of N is $N_1$ or $N_2$ (or in other words, where on the hysteresis loop the vehicle is currently operating). If $N=N_1$, the transition (from $N_1$ to $N_2$) value $T_{th}$ is established at $T_{th}=T_{x1}$ (step 474) and a determination is made whether $T<T_{th}$ at step 475. If it is, N is set to N$_2$ (step 476) and processing is ended. If N=N$_2$ in step 473, then T$_{th}$ is set at a higher value of T (lower vehicle speed) (step 477) and a determination is made whether T>T$_{th}$ (step 478). If so, N is set to N$_1$ (step 479) and processing is terminated.

Returning now to FIG. 9, there is shown a conceptual block diagram of an arrangement for calculating vehicle driving torque T$_o$ (that is, output shaft torque) based on mechanical characteristics of the torque converter. In this arrangement, T$_o$ is estimated by the output shaft torque estimation unit 1010, based on inputs of Gear Position GP, engine speed value Ne and turbine speed N$_T$, as well as the torque converter operational characteristic stored in the memory 1015 which is accessed by the estimation unit 1010.

Figure 9:
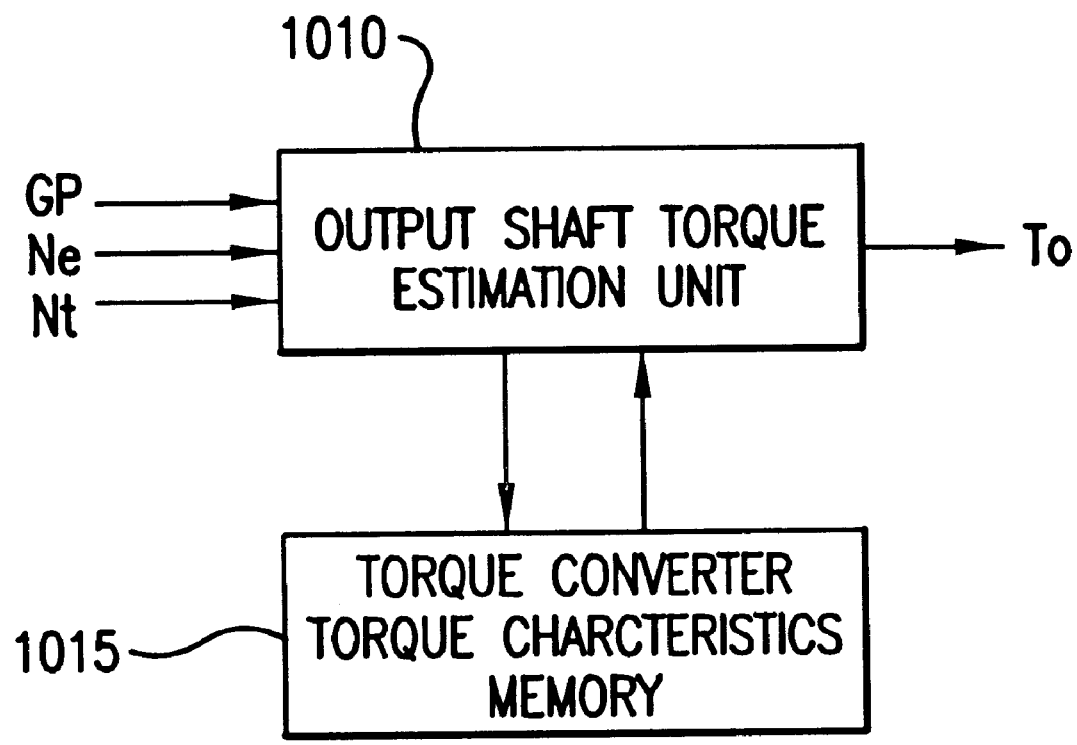
FIGS. 9 and 10 are block diagrams of a torque estimation unit according to an embodiment of the invention.
Figure 10:
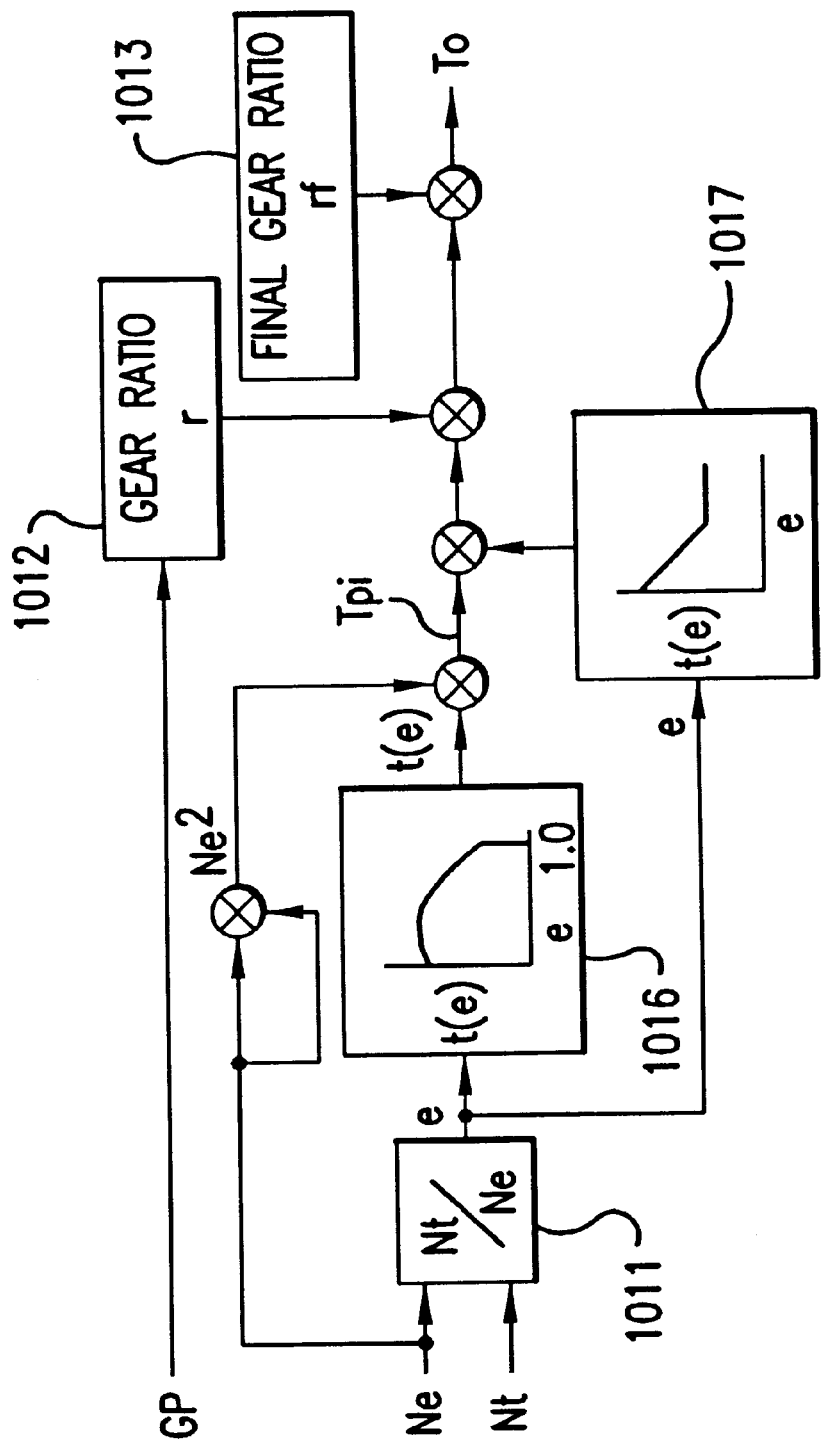

FIG. 10 is a more detailed block diagram of the output shaft torque estimation arrangement of FIG. 9, which shows the processing of several input signals to determine output torque based on expression 16 set forth above. This arrangement utilizes stored torque converter torque characteristics, as noted in connection with FIG. 9. It should also be noted, however, that engine torque characteristics may be used for this purpose as well, in which case, after the look up table is queried according to the throttle opening and the engine speed, then the accessary load is subtracted from the result. Furthermore, both the torque converter torque characteristics and the engine torque characteristics can also be used together. In any of these methods, no additional sensor is needed to calculate the driving torque T$_o$. An additional sensor, when needed, is used for the longitudinal acceleration of the vehicle. When the vehicle is running on a slope, the sensor can sense both the slope resistance and the vehicle acceleration. And this feature of the additional sensor can be used to find the slope status by subtracting the differentiated vehicle speed DVSP from the sensor output, as described previously. In this case, characteristics of the engine, etc., can be used even before they reach the steady state, for example, just after the engine is started.

In FIG. 10, the turbine speed Nt and the engine speed Ne are entered to the speed ratio calculator 1011 to find the input/output speed ratio e (expression 13). Then, the torque converter pump capacity coefficient t(e) is found from the look up table 1016, while the torque ratio t(e) is found from the look up table 1017. The torque converter pump capacity coefficient t(e) is multiplied by the square of the engine speed and by the torque ratio t(e). The result is then multiplied by the gear ratio found in the gear ratio look up table 1012 according to the current gear position, and by the gear ratio 1013 of the differential to calculate the output shaft torque T$_o$. (See expression 16.)

In the embodiment of FIG. 10, the output shaft torque is found from the characteristics of the torque converter; however, as noted previously, the engine output torque calculated from the throttle opening and the engine speed can also be used to calculate the output shaft torque, in which case, the loads generated by accessaries such as the air conditioner must be taken into account. As explained in more detail in connection with FIG. 52 below, the torque characteristics and the engine output torque can also be used together to find the output shaft torque.

Figure 55:
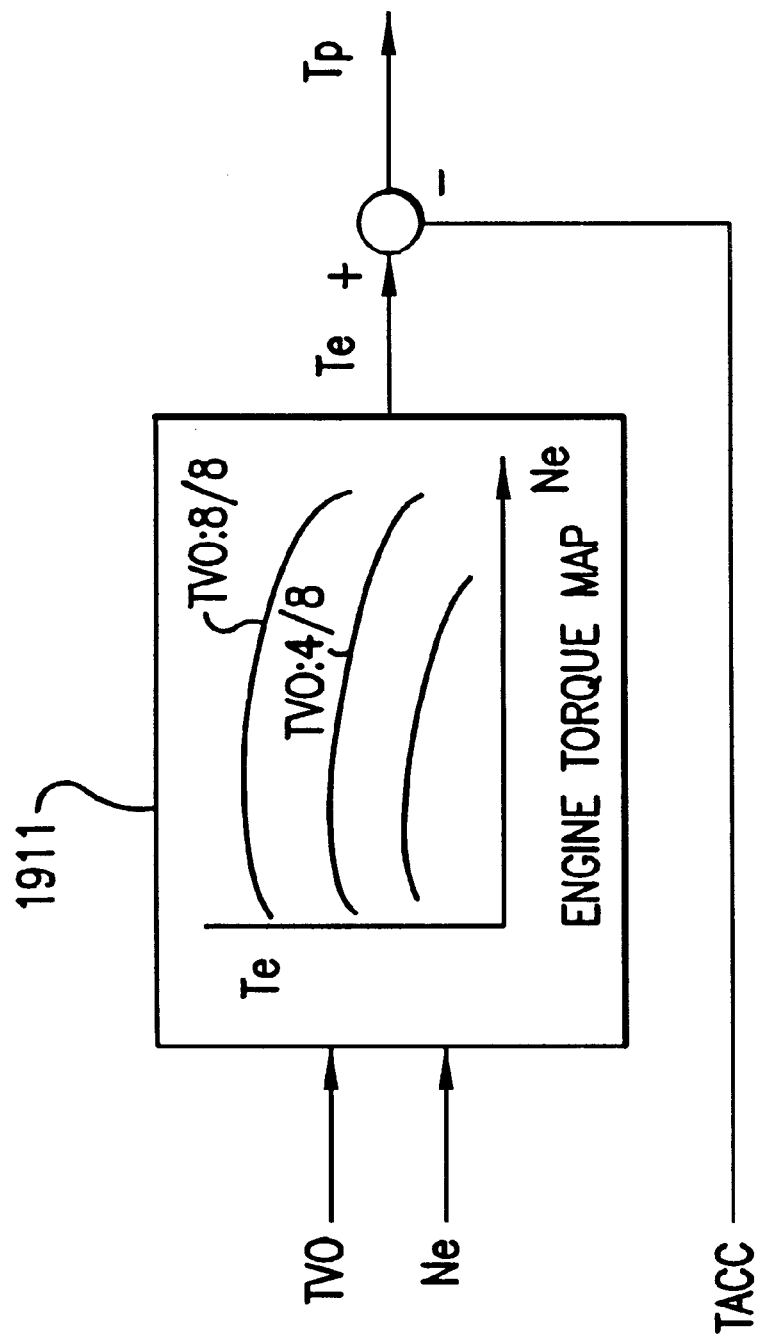
FIG. 55 is a block diagram of the procedure for pump torque estimation according to the engine torque characteristics.

FIG. 55 is a conceptual block diagram of an arrangement to estimate pump torque from the engine torque characteristics. The look up table in the engine torque calculator 1911 is addressed according to the throttle opening TVO and the engine speed N$_e$, and the engine output torque T$_e$ is calculated. The torque Tacc used for an air conditioner and the like is subtracted from this engine torque Te to calculate the pump torque T$_p$.

Figure 48:
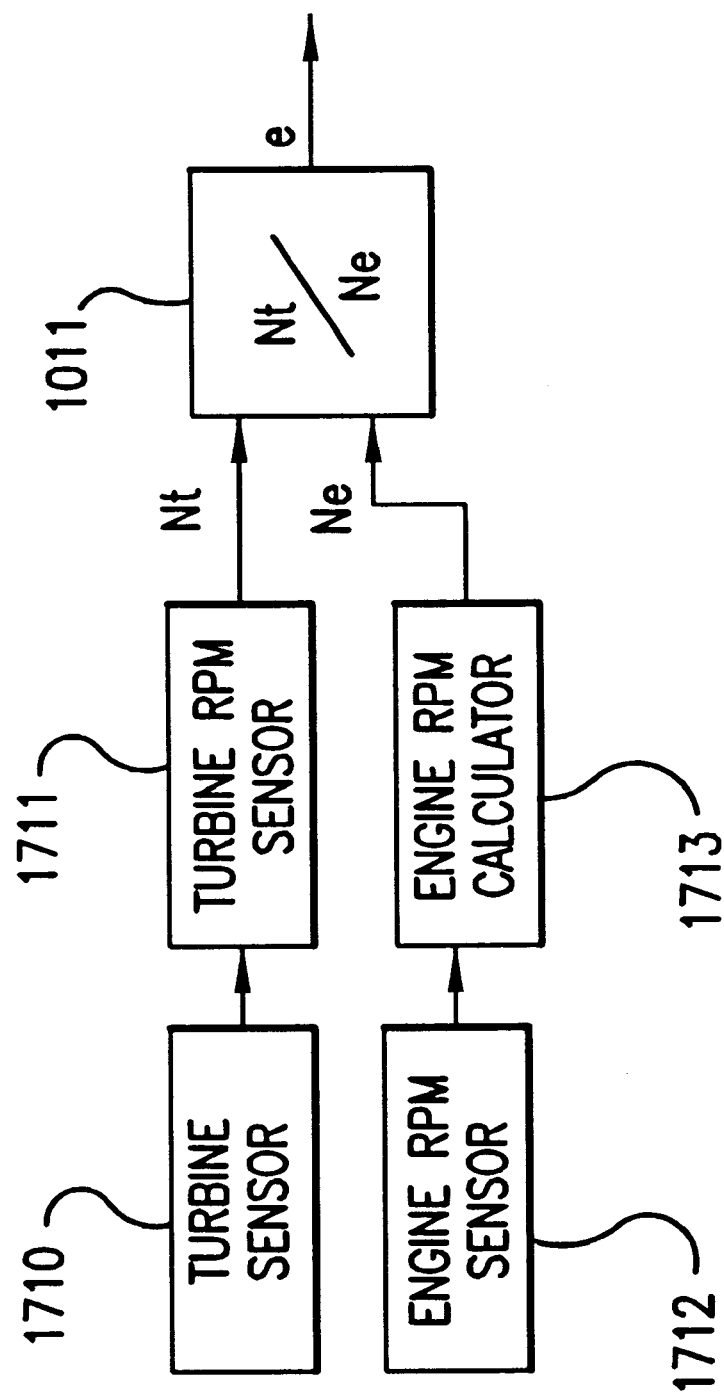
FIG. 48 is a block diagram of an arrangement for speed ratio e calculation using a turbine sensor and an engine revolution sensor.

FIG. 48 is a block diagram of an arrangement to find the speed ratio e. The cycle of a pulse train from the turbine sensor 1710 is measured in the turbine speed calculator 1711 and the result is converted to turbine speed N$_t$. The cycle of the pulse train from the engine rotation sensor 1712 is measured in the engine speed calculator 1713, and the result is converted to the engine speed N$_e$. The calculated turbine speed and engine speed are divided in the speed ratio calculator 1011 to find the speed ratio e.

Figure 49:
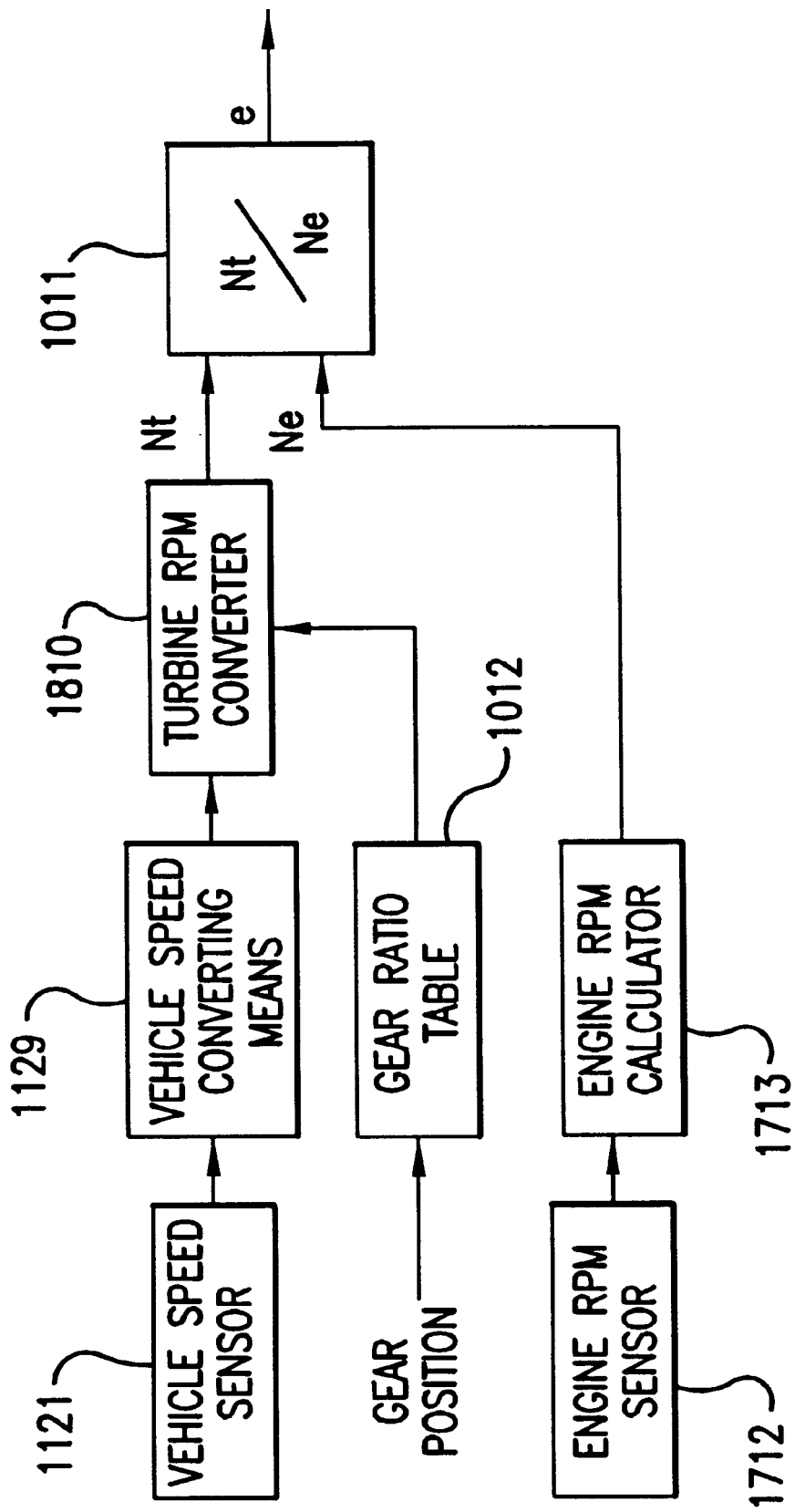
FIG. 49 is another block diagram of an arrangement for speed ratio e calculation using a vehicle speed sensor and an engine revolution sensor.

FIG. 49 shows a block diagram of another embodiment to find the speed ratio e. The cycle of the pulse train from the vehicle speed sensor 1121 is measured in the vehicle speed converter 1129 to find the vehicle speed, which is then converted to turbine speed N$_t$ in the turbine speed converter 1810 according to the gear ratio determined from look up table 1012 based on the current gear position, and the vehicle speed. The cycle of the pulse train from the engine rotation sensor 1712 is measured in the engine speed calculator 1713, and the result is converted to the engine speed in a known manner. The calculated turbine speed and engine speed are entered to the speed ratio calculator 1011 to find the speed ratio e.

Figure 50:
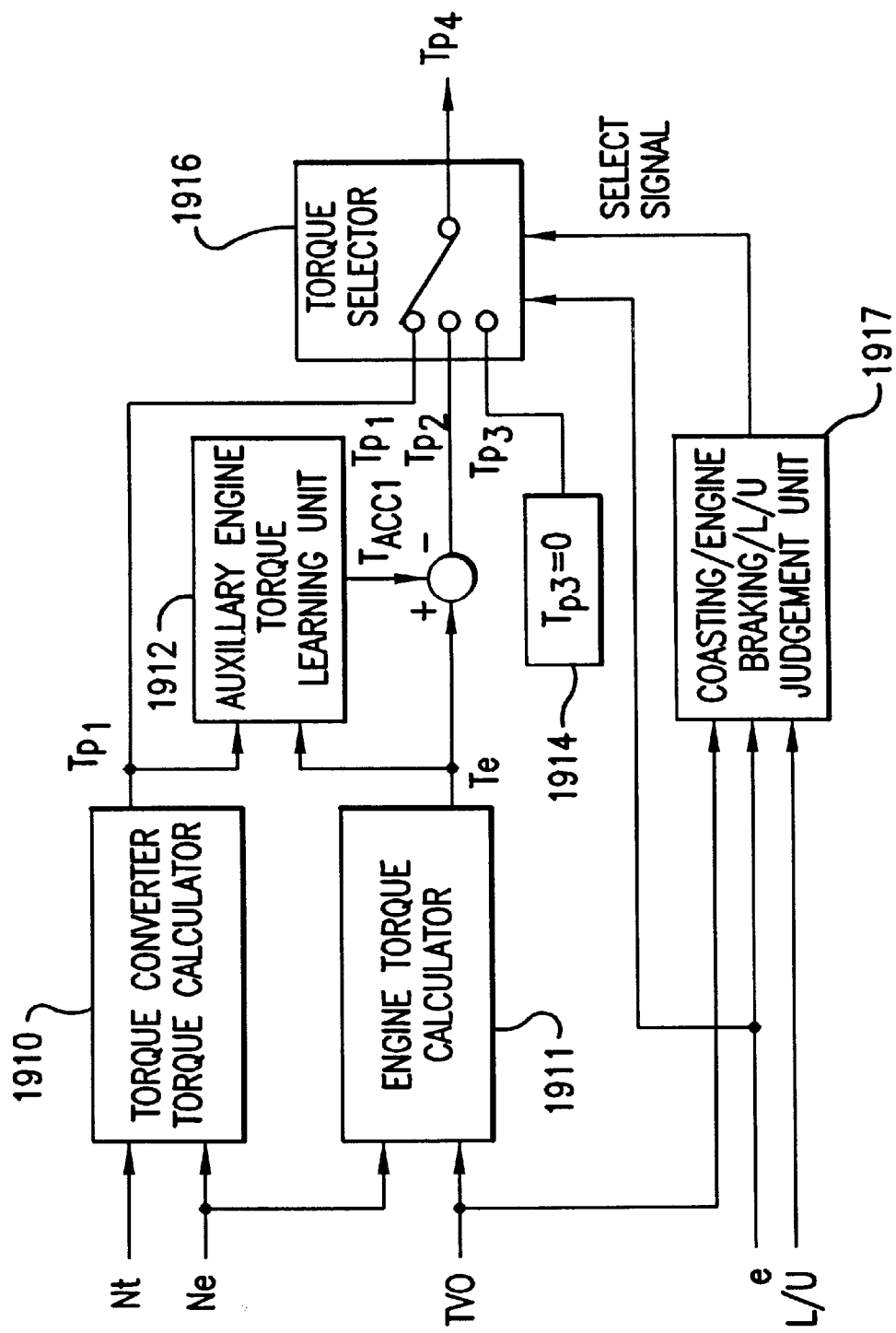
FIG. 50 is a block diagram of an arrangement for torque converter torque/engine torque selection.

FIG. 50 is a block diagram of an arrangement according to the invention to estimate the pump torque when the torque converter torque and the engine torque are both used. An important aspect of this embodiment is that when the speed ratio e is high, or in the case of coasting, engine braking, or lock up (direct mechanical linkage) of the torque converter ("L/U"), the torque found from the engine torque characteristics is more accurate than the torque found from the torque converter characteristics. Thus, selection of the most accurate torque value can be made according to the speed ratio e, L/U status, TVO, and the like, in order to minimize the torque estimation error. The torque converter torque T$_{p1}$ is calculated in the torque converter torque calculator 1910 in the same manner as in FIG. 10. The pump torque T$_{p2}$ is calculated by accessing the look up table in the engine torque calculator 1911 based on the throttle opening and the engine speed to calculate the engine torque T$_e$, and then subtracting the accessary load T$_{acc1}$ calculated in the auxiliary engine torque learning unit 1912. (The accessary load T$_{acc1}$ is ignored during gear shifting or when the speed ratio e is within a certain range.) Unit 1914 provides a signal which corresponds to a torque T$_{p3}$ of zero.

The speed ratio e, as well as the L/U and TVO signals are entered to the coasting-engine braking-L/U judgment unit 1917 to determine the vehicle's status (coasting, engine braking, or L/U). For this purpose, the vehicle is judged to be in a lockup (L/U) state whenever the signal L/U is transmitted to the judgment unit 1917. Further, when the speed ratio e is greater than 1.0, the vehicle is judged to be coasting.

The output from judgment unit 1917 and the speed ratio e are entered to the torque selection unit 1916. When the speed ratio e is below a threshold value stored in the torque selection unit 1916, T$_{p1}$ is selected; when e is above the threshold, as well as in the case of L/U, T$_{p2}$ is selected. And in the case of coasting, T$_{p3}$ (torque=0) is selected. In the case of engine braking, T$_{p2}$ is selected. The selected T$_{p1}$/T$_{p2}$/T$_{p3}$ is output as T$_{p4}$ to minimize the pump torque estimation error.

Figure 51:
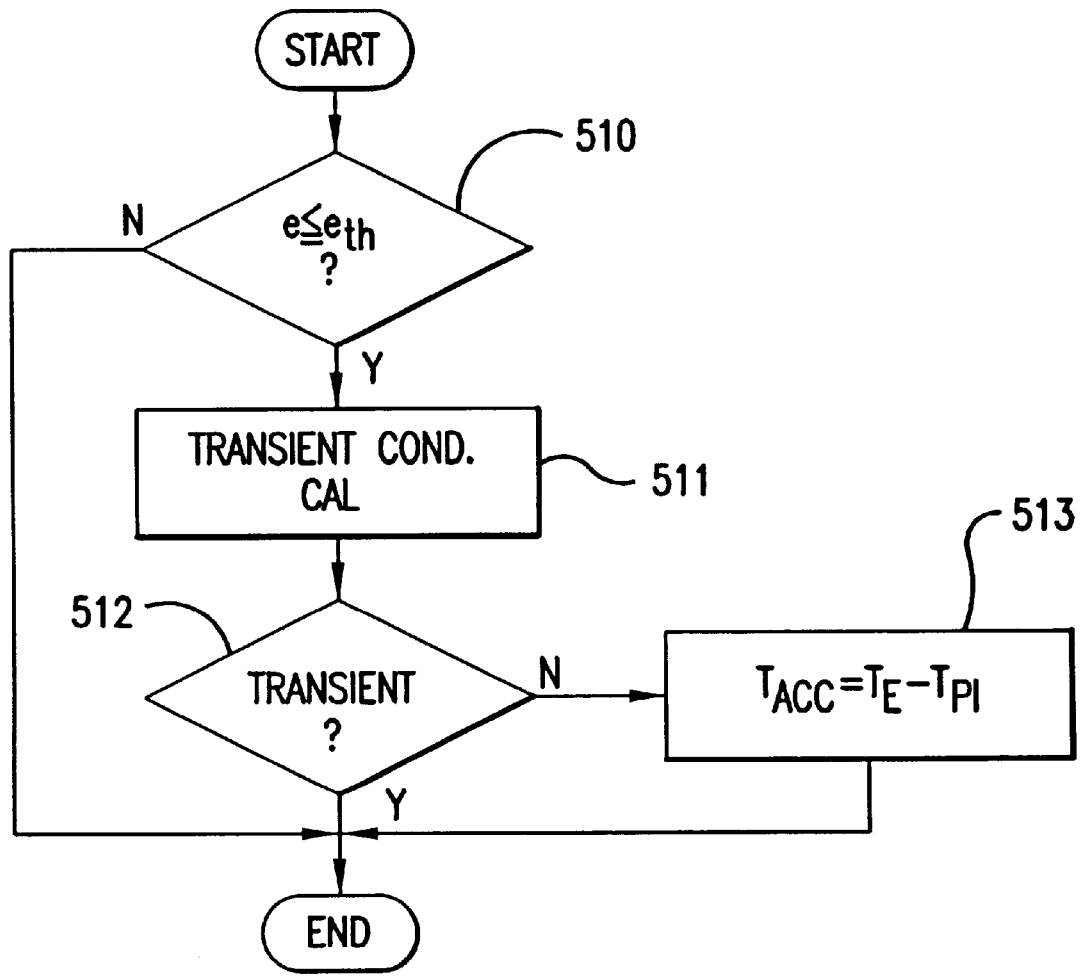
FIG. 51 is a flow chart which shows the operation of auxiliary engine torque learning unit 1912 in FIG. 50.

FIG. 51 is a flow chart which shows the operation of auxiliary engine torque learning unit 1912. At step 510, a determination is made whether e is less than a threshold value e$_{th}$, and if not processing is terminated. If e≦e$_{th}$, however, inputs necessary to detect transient conditions are read at step 511 and a determination is made in step 512 whether transient conditions (shifting·CURG)≠NXTGP; $\Delta TVO > \Delta TVO_{th}$; or $DTVO > DTVO_{th}$) exist. If not, $T_{acc1}$ is set equal to $T_E - T_{p1}$ at step 513. If, however, transient conditions exist, processing is terminated.

Figure 52:
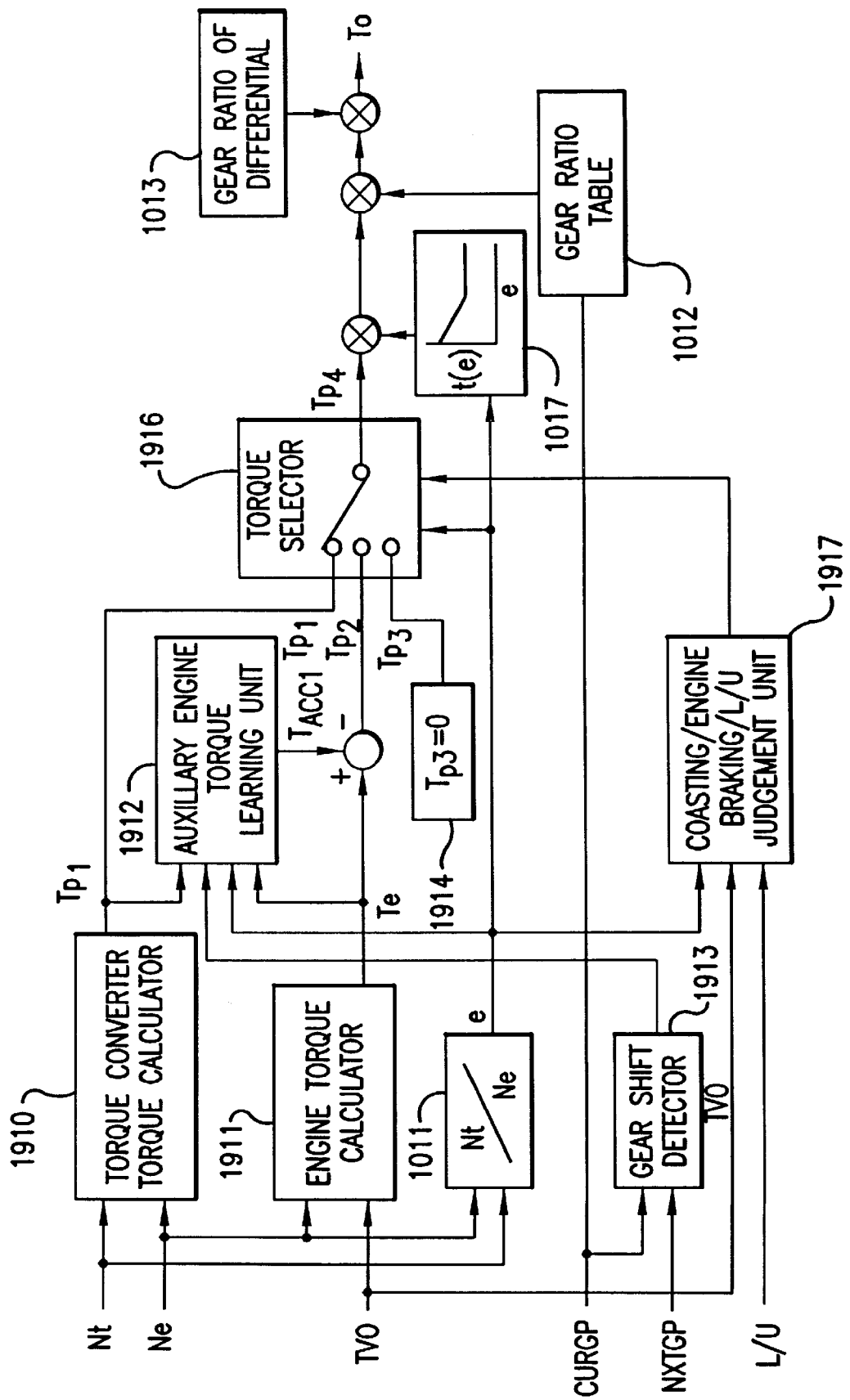
FIG. 52 is a block diagram of an arrangement for output shaft torque estimation unit processing when the torque converter torque/engine torque is selected.

FIG. 52 shows a block diagram of an arrangement to estimate output shaft torque To, which incorporates the apparatus shown in FIG. 50. As in the embodiment of FIG. 50, the torque converter torque $T_{p1}$ is calculated in the torque converter torque calculator 1910. A look up table is accessed in the engine torque calculator 1911 to calculate the engine torque $T_e$ according to the throttle opening and the engine speed. The accessary load $T_{acc1}$, calculated in the auxiliary engine torque learning unit 1912 (FIG. 51) is subtracted from engine torque Te to calculate the pump torque $T_{p2}$. (Determination of the accessary load $T_{acc1}$ is suppressed when the system is determined to be "gear shifting" by the gear shifting detector 1913 according to the current gear position CURGP and the next specified gear position NXTGP, or when the speed ratio e, determined in speed ratio calculator 1011, is within a predetermined range.) Unit 1914 provides a signal which corresponds to a torque $T_{p3}$ of zero in the same manner as in FIG. 37.

As in FIG. 50, the speed ratio e, as well as the L/U and TVO signals are entered to the coasting-engine braking-L/U judgment unit 1917, which determines the vehicle's status, as described previously in connection with FIG. 50. When e<1 and TVO=0, the vehicle is judged to be coasting, while if e>1 and TVO=0, it is judged as engine braking; and when the L/U signal is ON, the vehicle is judged as L/U. The status signal from unit 1917 and the speed ratio e from speed ratio calculator 1011 are entered to the torque selection unit 1916, which selects one of the three available torque signals $T_{p1}$, $T_{p2}$ and $T_{p3}$. When the speed ratio e is below a threshold value stored in the torque selection unit 1916, $T_{p1}$ is selected; when it is above the threshold, as well as in the case of L/U, $T_{p2}$ is selected. And in the case of coasting, $T_{p3}$ (torque=0) is selected. In the case of engine braking, $T_{p2}$ is selected.

The selected signal $T_{p1}/T_{p2}/T_{p3}$ is output as $T_{p4}$ to minimize the pump torque estimation error. $T_{p4}$ is multiplied by the torque ratio t(e), calculated by accessing the torque look up table 1017, based on the speed ratio e. The result is multiplied by the gear ratio determined from the current gear position CURGP in the gear ratio look up table 1012, and then multiplied by the gear ratio 1013 of the differential to calculate the output shaft torque $T_o$. (Gear position information is provided by the automatic transmission controller, not shown. See FIG. 7.) The gear position signal used to find the gear ratio in the gear ratio look up table 1012 may be replaced with the next specified gear position signal NXTGP. The current gear position signal CURGP and the next specified gear position signal NXTGP can also be used together.

As shown in FIGS. 1 and 2, the slope detection unit according to the invention includes an arrangement to suppress changes in the estimated slope value during periods when error generating transient conditions exist. FIGS. 11–24, 53 and 54 show the details of embodiments of the invention to eliminate errors due to a variety of noise generating conditions.

Figure 11:
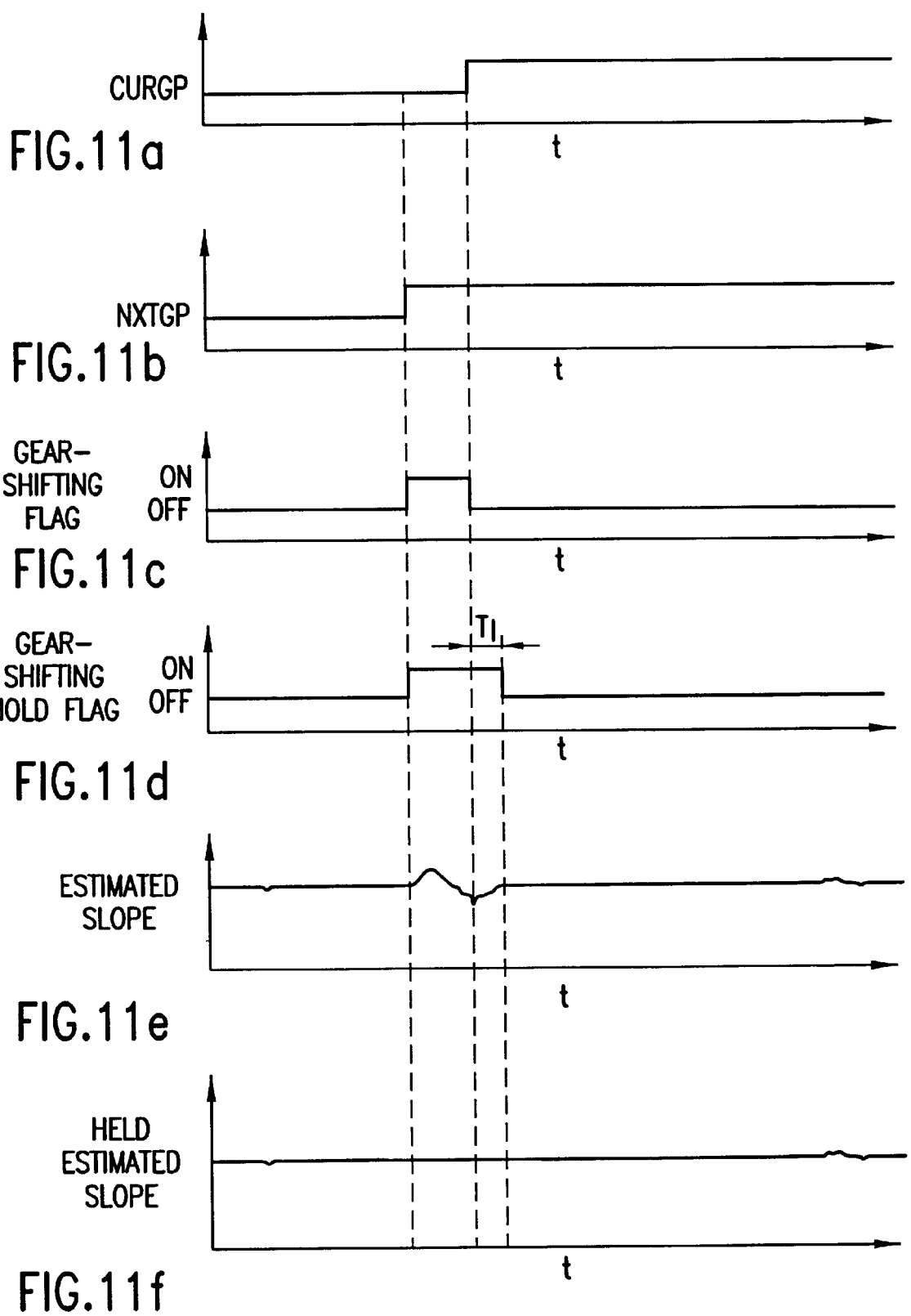
FIG. 11 is a graphic depiction of signals generated by a slope estimation arrangement according to the invention, including noise suppression based on shifting of an automatic transmission.

FIG. 11 shows a timing chart of an arrangement according to the invention to eliminate noises based on gear position, as explained in conjunction with FIG. 12 below. Such noise errors, which are generated during gear shitting, and for a certain time after the gear shifting is completed, must be eliminated. As shown in FIG. 11, changes in the Estimated Slope are suppressed ("Held Estimated Slope") when a current gear position signal CURGP differs from a next gear position signal NXTGP and for a certain time (T1 sec) after the current gear position signal matches the next gear position signal. Noises are thus eliminated.

Figure 12:
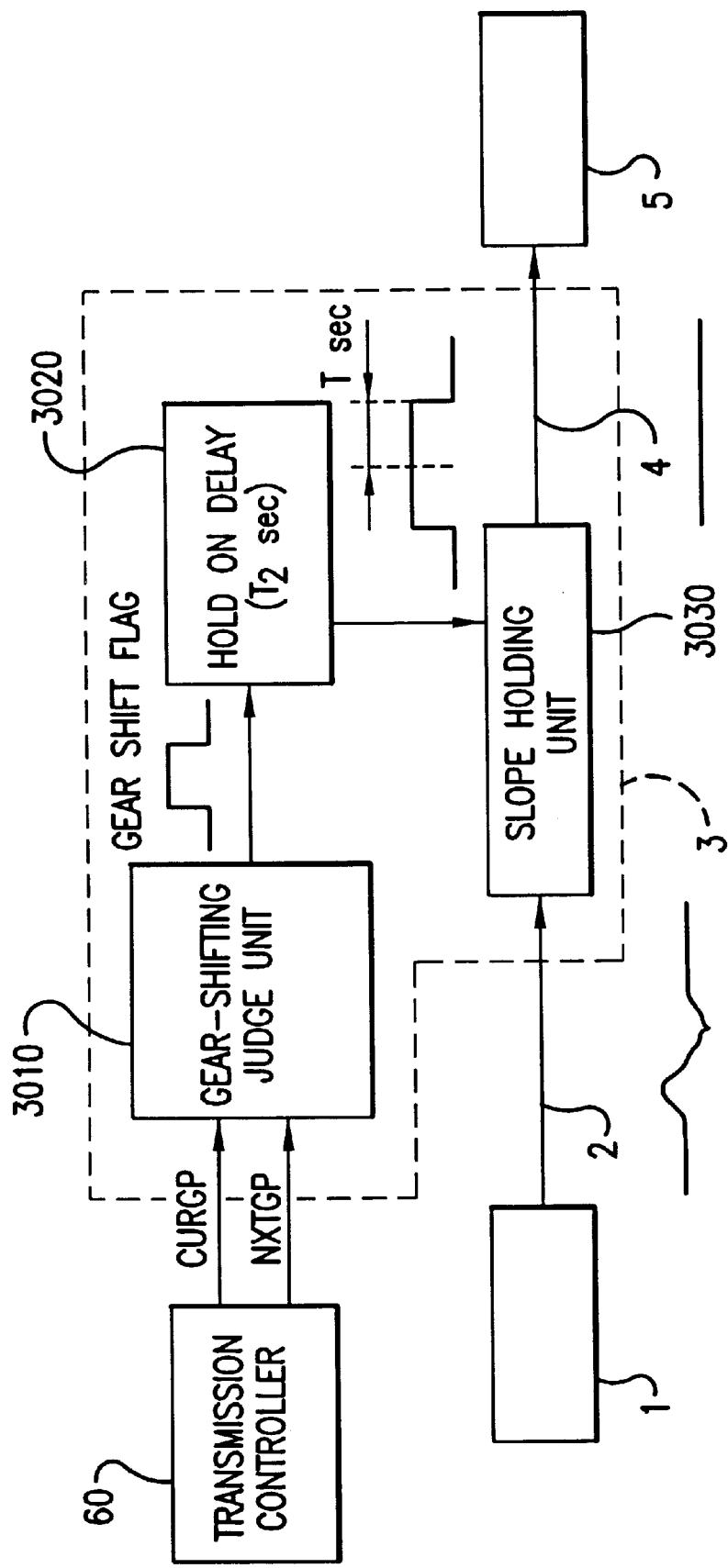
FIG. 12 shows a block diagram of a noise suppression arrangement according to the invention, based on shifting of an automatic transmission.

FIG. 12 shows an embodiment of this invention to eliminate noises based on the gear position. Because the estimated slope depends on the engine/transmission mechanism, and because the gear position and the gear ratio are indeterminate during gear shifting, errors occur in the estimated slope, and must be eliminated. Moreover, because the data are passed through a low pass filter LPF, spike-like errors also occur for a time after the gear shifting is completed. To eliminate such errors, the gear shifting status of the transmission is determined in the "gear shifting" sensing unit 3010 based on a comparison of the current gear position and next gear position signals CURGP and NXTGP received from the vehicle's automatic transmission (not shown); a "gear shifting" flag is output whenever the current gear position signal output from the transmission controller 60 differs from the next gear position signal, as shown in FIG. 11. When the "gear shifting" flag is ON and for a fixed time (T1 sec) after it is turned OFF by the "gear shifting" sensing unit 3010, a HOLD ON signal is set by the HOLD ON delay unit 3020. When the HOLD ON signal is set in the slope holding unit 3030, the slope value determined by slope estimation unit 1 just before HOLD ON is set is held constant to eliminate noises until the HOLD ON signal is terminated.

Figure 13:
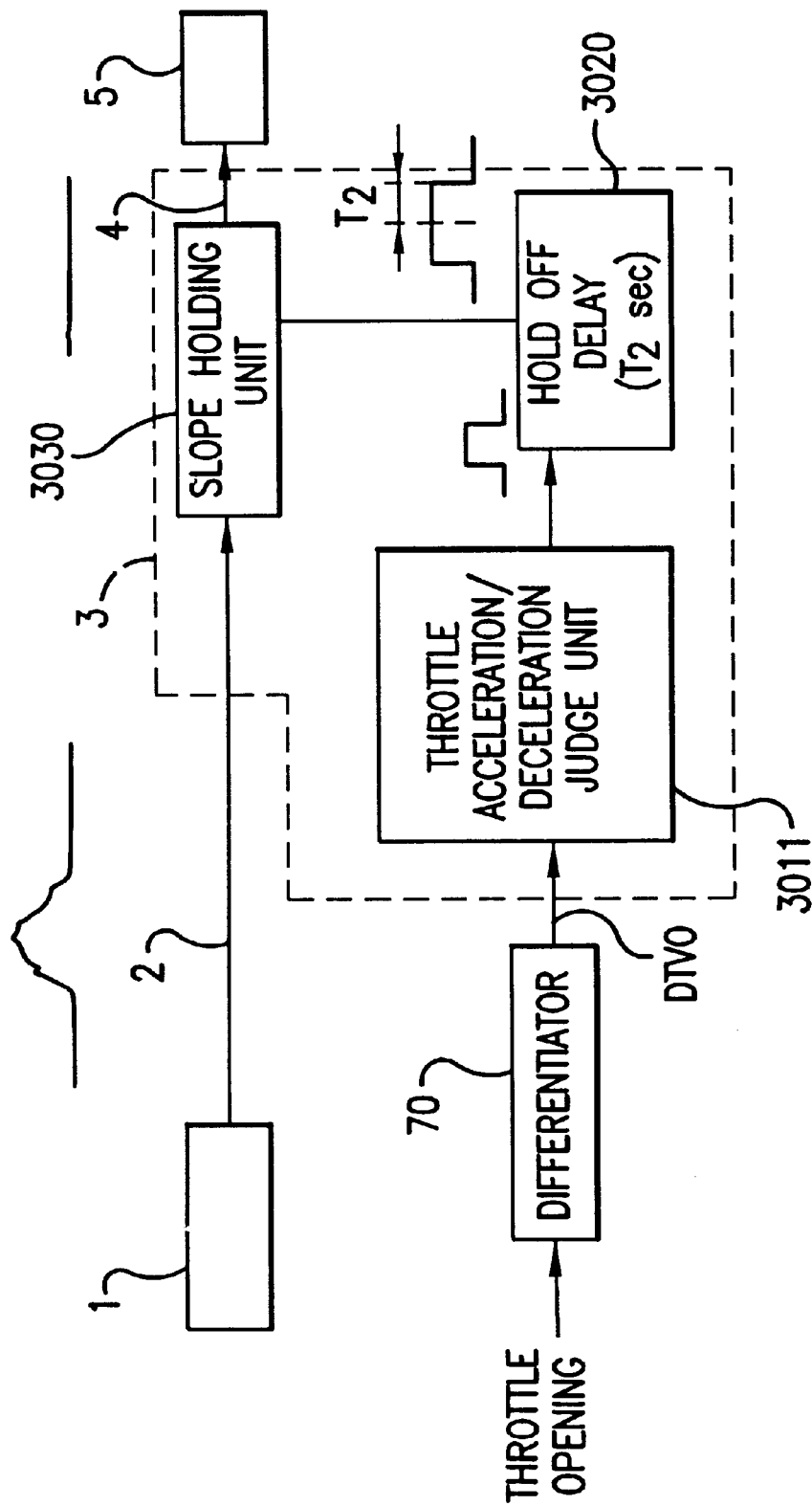
FIG. 13 is a block diagram of noise suppression based on vehicle acceleration/deceleration.

FIG. 13 shows an embodiment of the invention to eliminate noises attributable to changes in the engine throttle opening. When the throttle is opened/closed abruptly, the engine output torque changes abruptly also, generating noise distortion in the estimated slope value, which must be eliminated. Moreover, since the slope signal is passed through a low pass filter (FIGS. 3, 4), errors may also continue for a certain time after the throttle is opened/closed abruptly. To eliminate those errors, the differentiated throttle valve opening signal DTVO is found in the throttle opening differential unit 70, and the acceleration/deceleration sensor unit 3011 outputs a throttle accelerating/decelerating flag only when DTVO exceeds a predetermined threshold $\perp$th. When the throttle accelerating/decelerating flag is ON: and for a preset time (T2 sec) after it is turned OFF, the HOLD ON signal is set in the delay unit 3020. When the HOLD ON signal is set in the slope holding unit 3030, the slope value determined by slope estimation unit 1 just before the HOLD ON signal is set, is held to eliminate noises.

Figure 14:
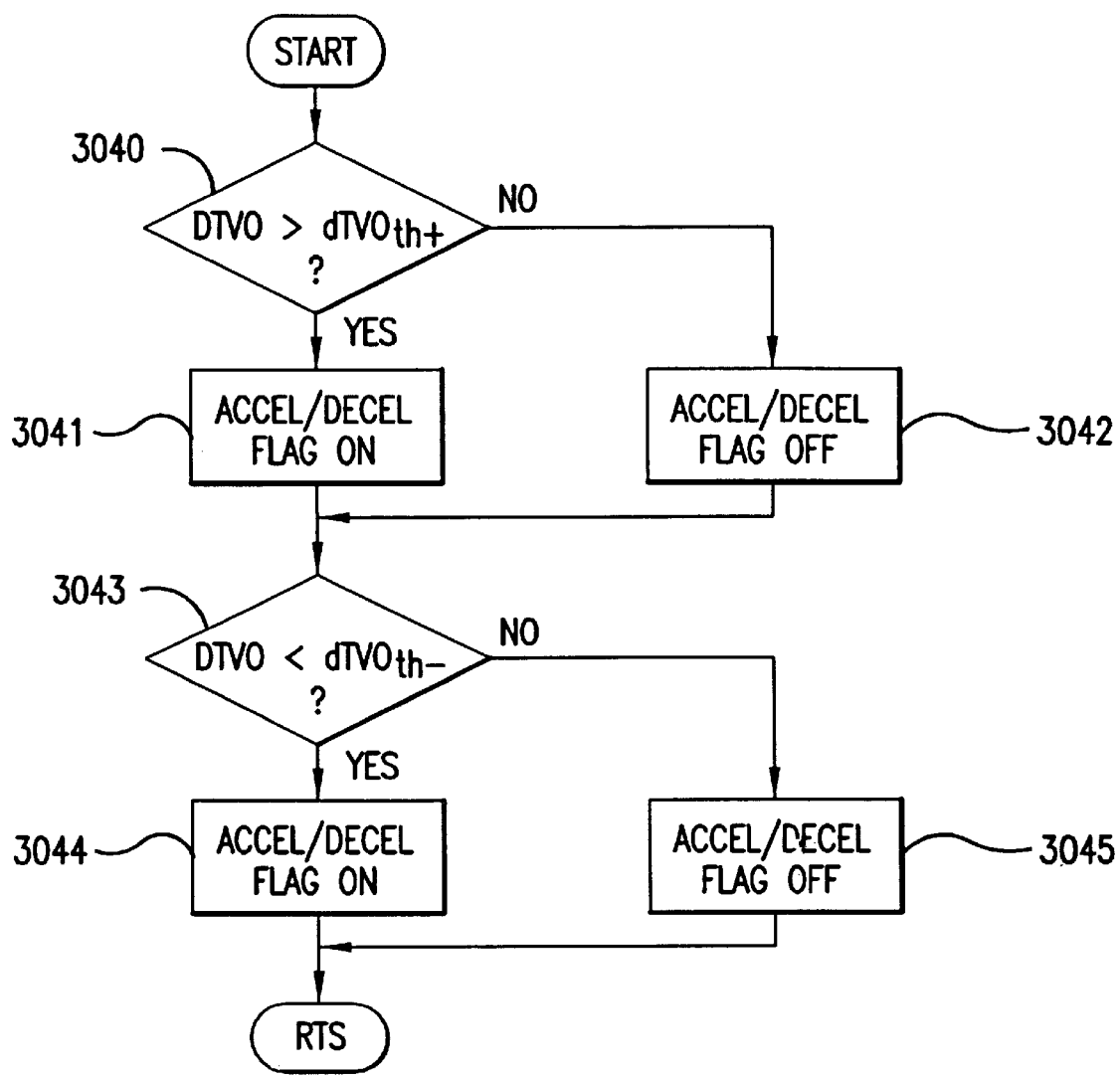
FIG. 14 shows a flow chart for the vehicle acceleration/deceleration determination.
Figure 15A:
FIG. 15 shows a timing chart for noise suppression based on the differentiated throttle opening.
Figure 15B:
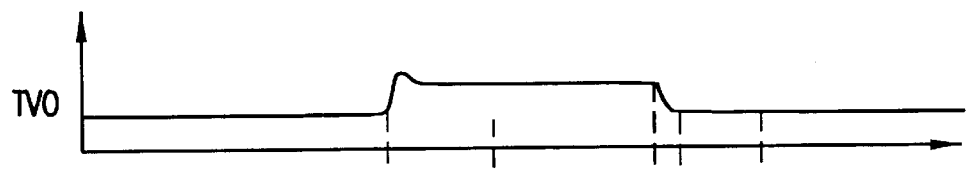
Figure 15C:
Figure 15D:
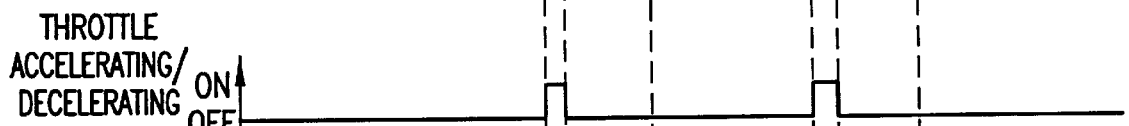
Figure 15E:
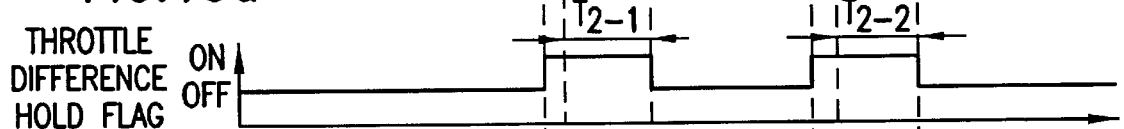
Figure 15F:
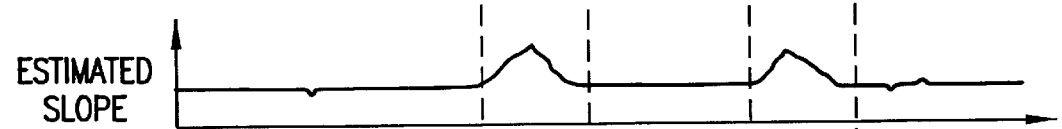
Figure 15G:
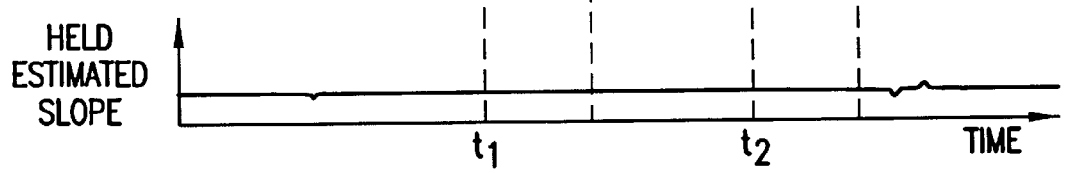

FIG. 14 is a flow chart which illustrates the operation of an arrangement to judge throttle valve opening (acceleration/deceleration) suitable for use as the acceleration/deceleration sensor unit 3011 in FIG. 8. The differentiated throttle valve opening signal DTVO is compared with a throttle acceleration threshold value dTVOth+ (3040). When DTVO>dTVOth+, a determination is made that the throttle opening is increasing and the throttle accelerating/decelerating flag is turned ON (3041). When it is not, the flag is turned OFF (3042). Then DTVO is compared with a throttle deceleration threshold value dTVOth− (3043). When DTVO<DTVOth−, a determination is made that the throttle valve opening is decreasing, and the throttle accelerating/decelerating flag is turned ON (3044). When it is not, the flag is turned OFF (3045).

FIG. 15 shows a timing chart for an arrangement to eliminate noises due to changes in the throttle opening as set forth above. DVSP is the differentiated vehicle speed (acceleration), while TVO is the throttle valve opening and DTVO its first derivative. At time $t_1$, the accelerator pedal is depressed; in response, TVO is increased abruptly, DTVO spikes upward and the vehicle acceleration DVSP increases accordingly. (At a later time $t_2$ these processes are reversed.) When DTVO spikes upward, indicating a rapid depression of the accelerator pedal, a corresponding throttle accelerating/decelerating flag (pulse) is generated, which in turn causes a HOLD flag to be set for a period of $T_2$ seconds, during which all transient variations in the estimated slope are suppressed, as indicated in the Held Estimated slope waveform.

Figure 16:
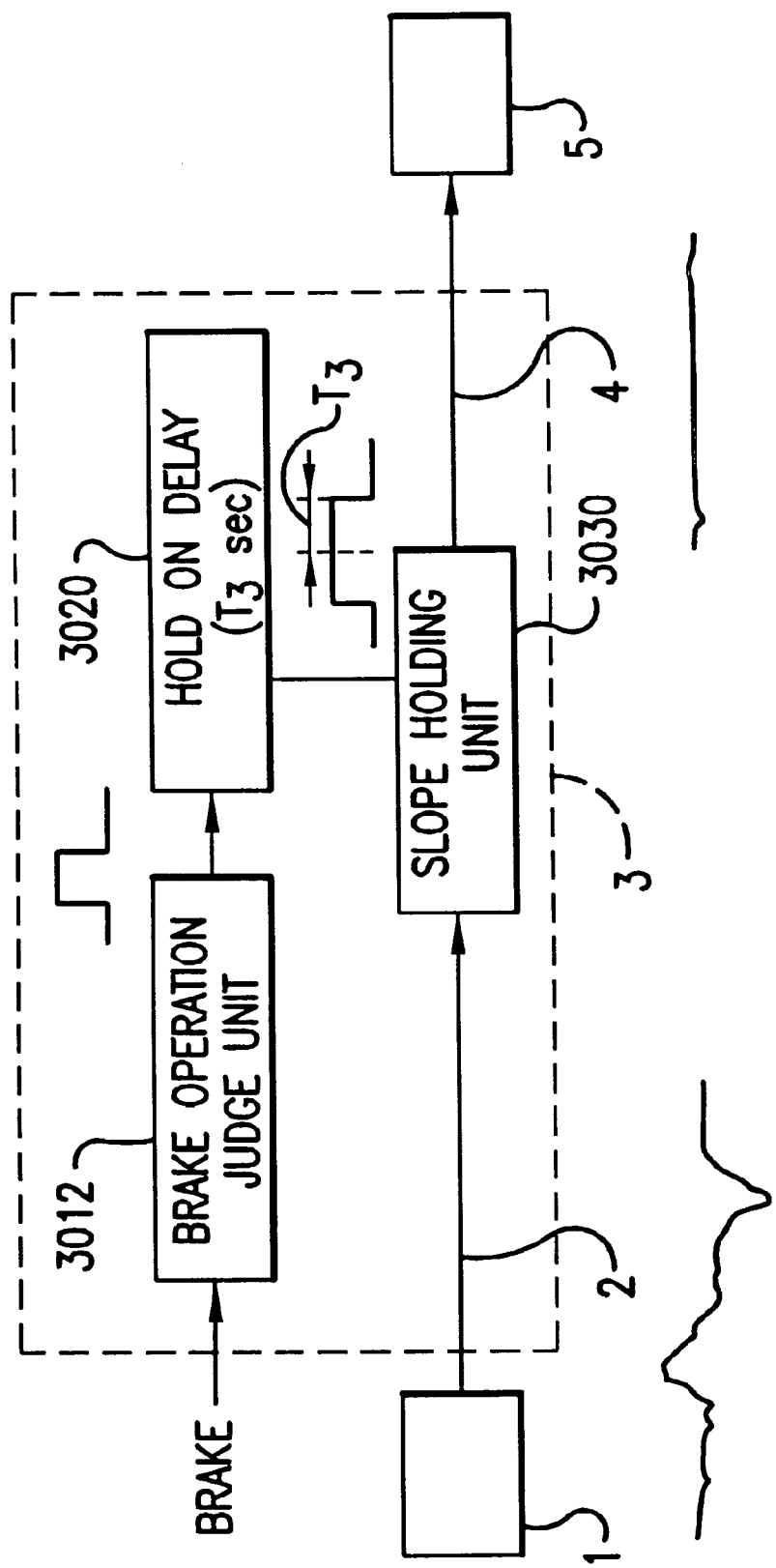
FIG. 16 shows a block diagram of an arrangement for noise suppression based on brake operation.
Figure 17A:
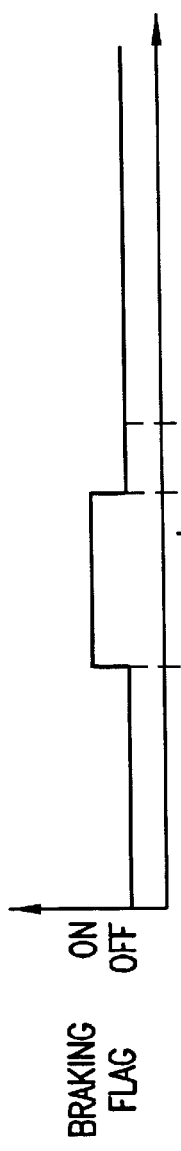
FIG. 17 shows a timing chart for noise suppression based on the brake operation.
Figure 17B:
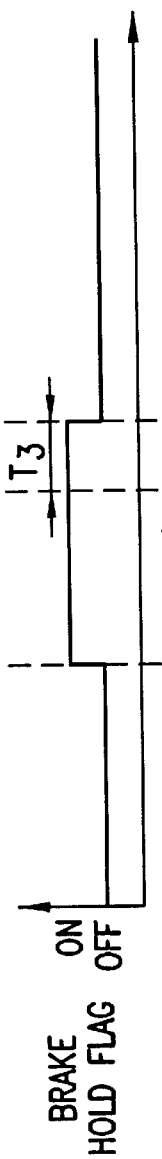
Figure 17C:
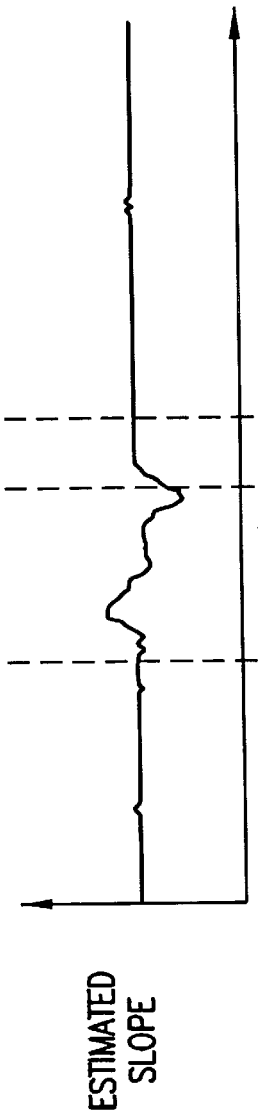
Figure 17D:
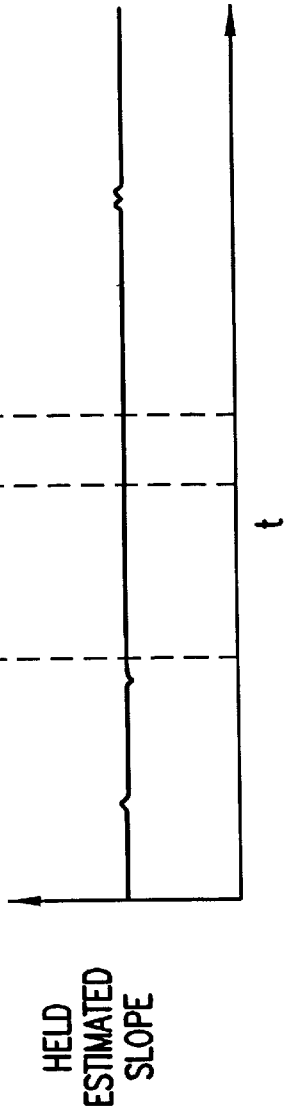

FIG. 16 shows an arrangement according to the invention to eliminate noises due to braking operation. When the brake pedal is depressed, errors occur in the running resistance affecting the vehicle tires, and in the estimated slope. Therefore, noises must be eliminated while the brake is operated and (since the estimated slope signal is passed through a low pass filter LPF) for a certain time after the brake pedal is released. For this purpose, depression of the brake pedal is detected in the braking detection unit 3012 and a braking signal is output. When the braking signal is ON and for a fixed time after it is turned off, the HOLD ON signal is set in the delay unit 3020. When the HOLD ON is set, the immediately preceding slope value determined by slope estimation unit 1 is held in holding unit 3030 to eliminate noises.

FIG. 17 is a timing chart for an arrangement to eliminate noises due to braking operation as shown in FIG. 16. It shows that a braking flag signal is generated when the brake pedal is depressed, which causes a Brake Hold Flag to be set and to remain set for a period of $T_3$ seconds after the pedal is released. While the Brake Hold Flag is set, transient changes in the Estimated Slope are suppressed. (See Held Estimated Slope.)

Figure 18:
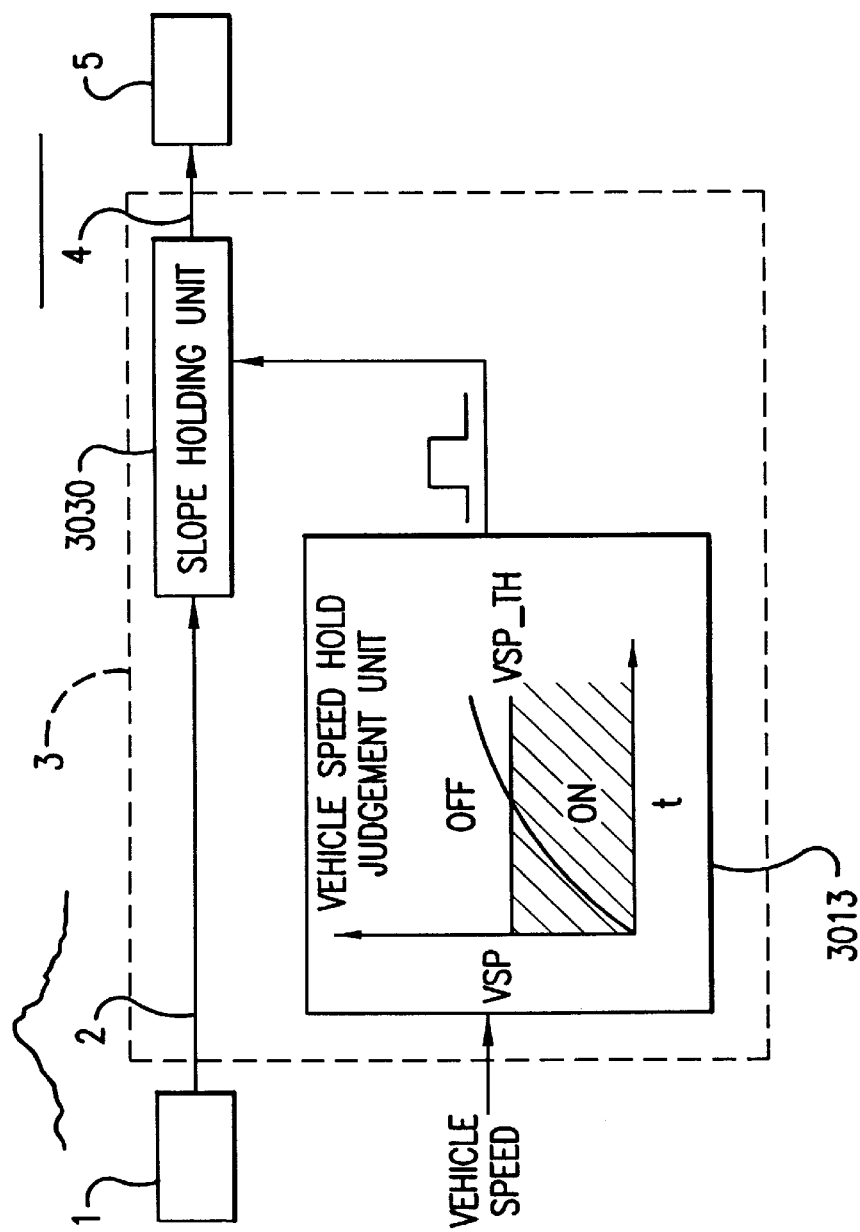
FIG. 18 shows a block diagram of an arrangement for noise suppression based on vehicle speed.

FIG. 18 shows an arrangement to eliminate noises due to low vehicle speed. Since the vehicle speed is determined by measuring the length of output shaft rotation cycles, speeds which are less than a few Km/H cannot be measured accurately, which causes errors to occur in the estimated slope. Whether or not the vehicle speed is less than a preset threshold of a few (e.g. 5.0) km/h is determined in the vehicle speed holding judgment unit 3013. During any time period when it is less than the threshold, judgment unit 3013 outputs a vehicle speed flag to the slope holding unit 3030, which causes the immediately preceding estimated slope to be held to eliminate noises.

Figure 19:
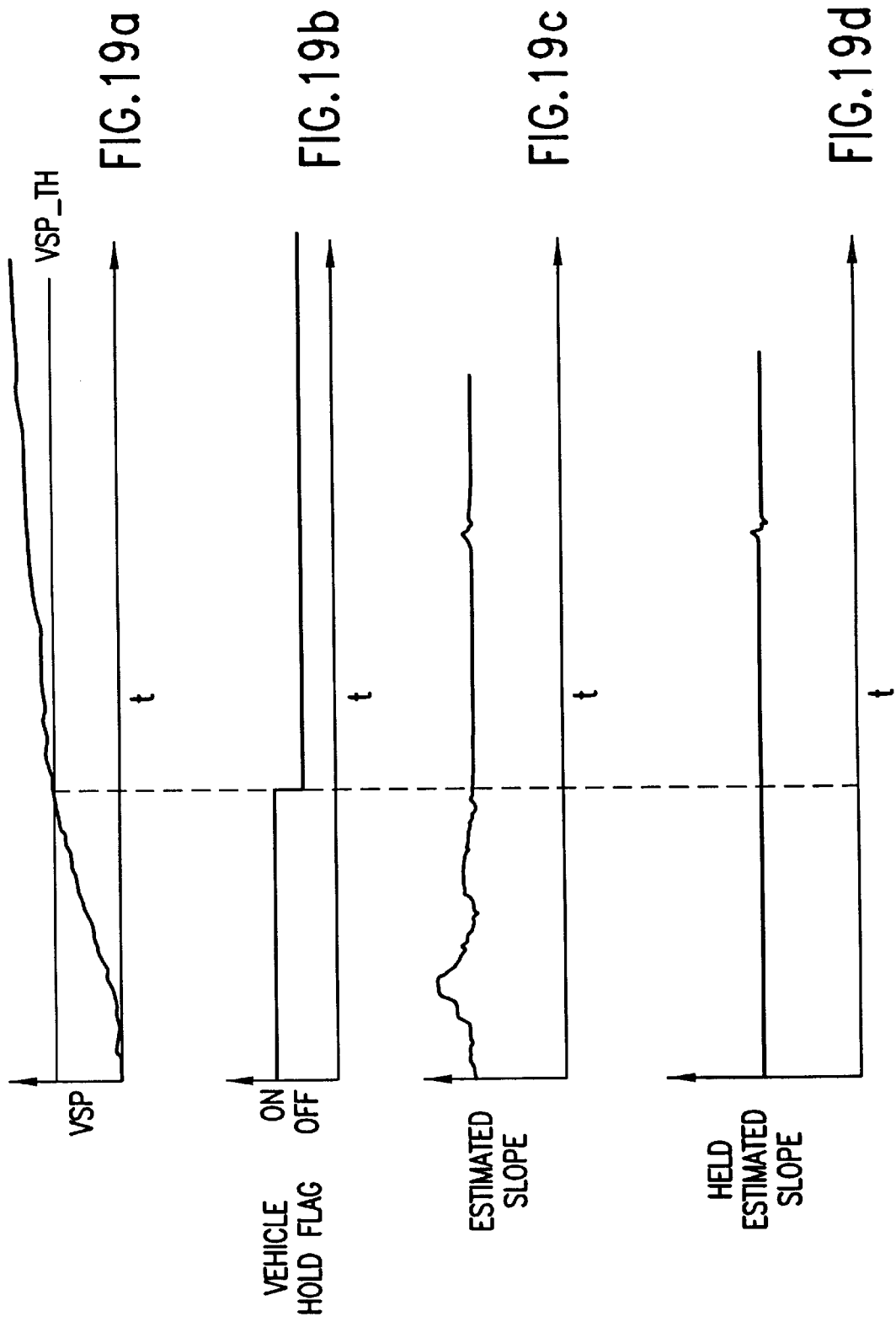
FIG. 19 is a timing chart of the noise suppression based on a vehicle hold judgment.

FIG. 19 shows a timing chart for the elimination of noises due to low vehicle speed, as illustrated in FIG. 18. Errors occur in the estimated slope when the vehicle speed VSP is less than a preset threshold VSP-TH of a few km/h. Therefore, noises must be eliminated in that case. To eliminate the noises, a Hold Flag signal is generated when vehicle speed is below the threshold, causing a suppression of transients in the estimated slope while the flag is set. The Held Estimated Slope is thus free of such noises.

Figure 20:
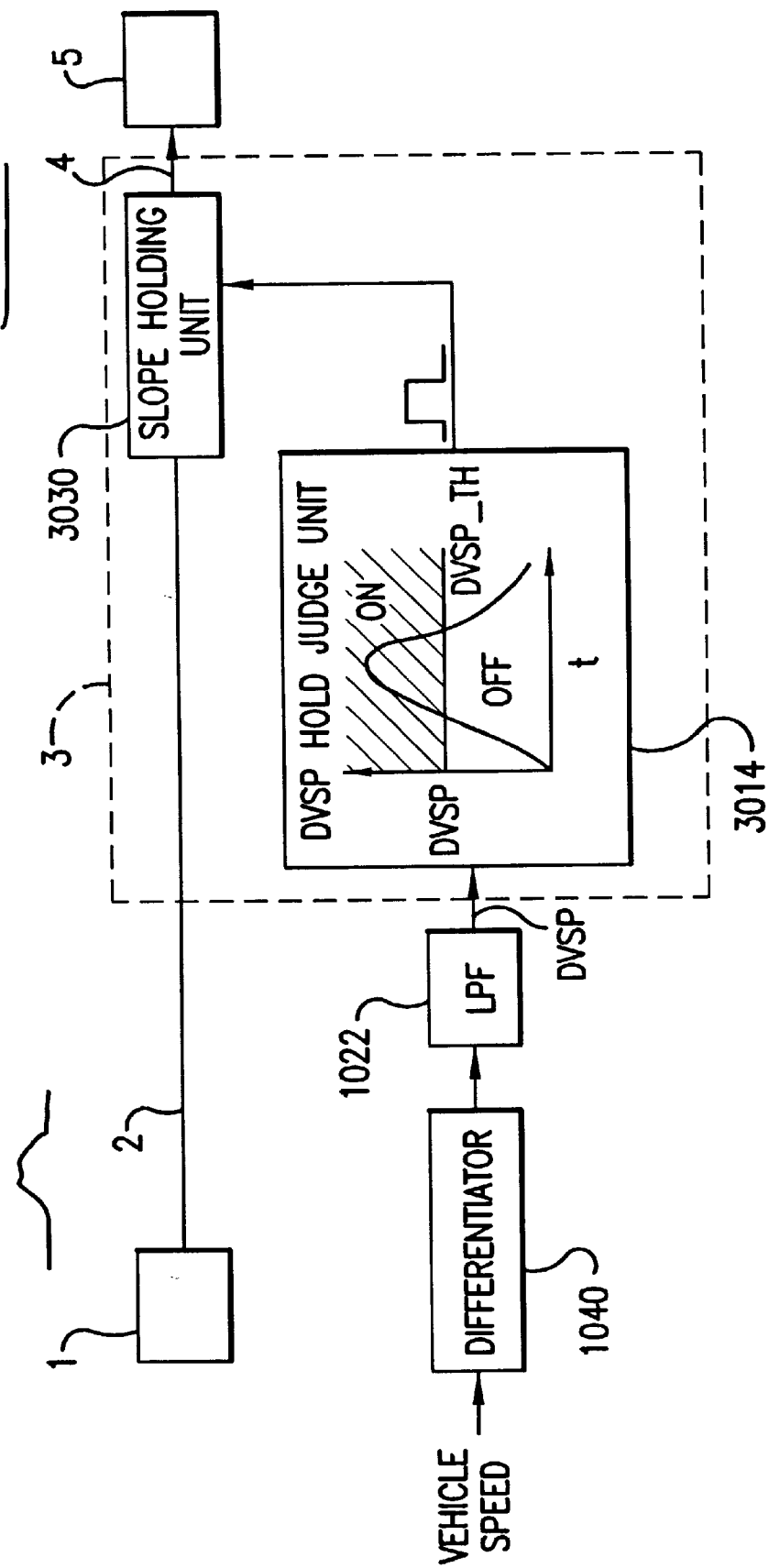
FIG. 20 is a block diagram of an arrangement for noise suppression based on vehicle acceleration.
Figure 21A:
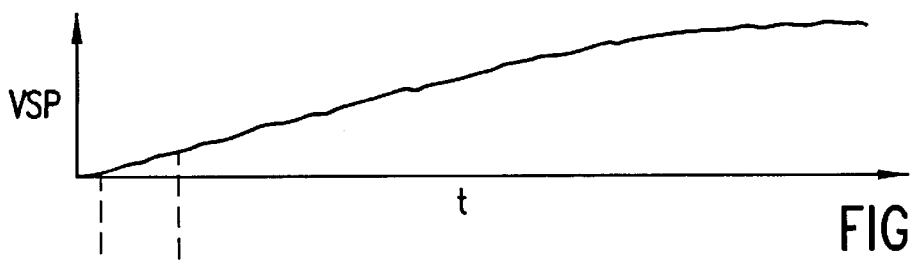
FIG. 21 is a timing chart of the procedure for the noise suppression based on acceleration.
Figure 21B:
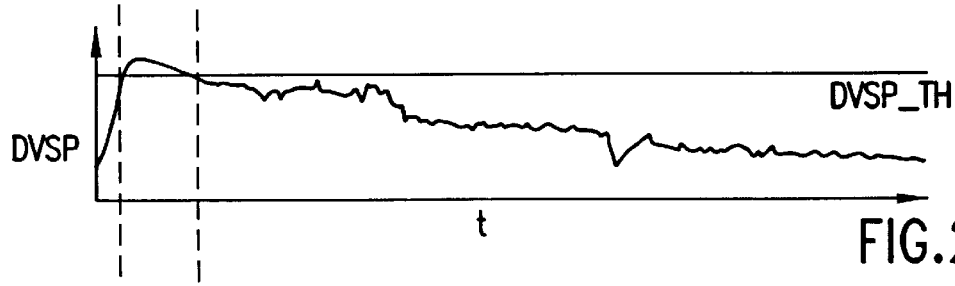
Figure 21C:
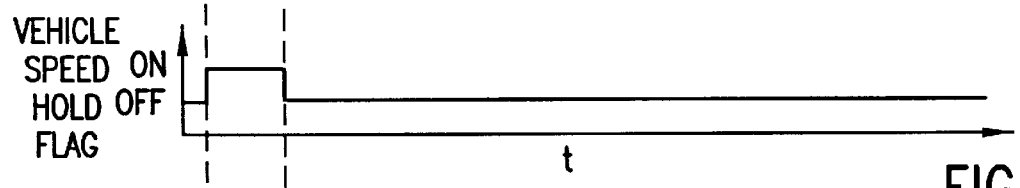
Figure 21D:
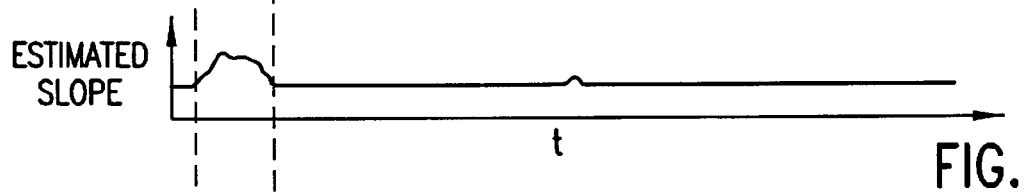
Figure 21E:
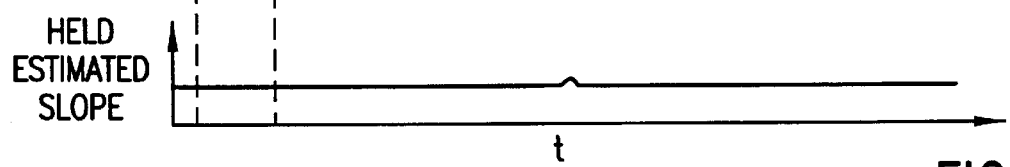
Figure 22A:
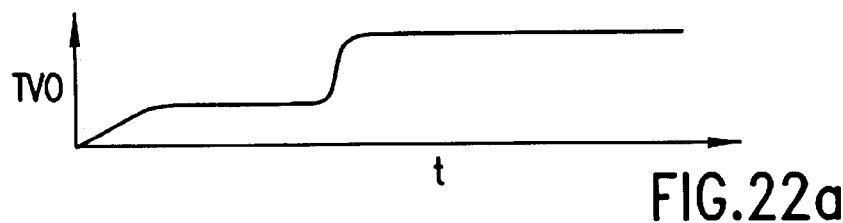
FIG. 22 shows an example of the holding process when two or more factors are duplicated.
Figure 22B:
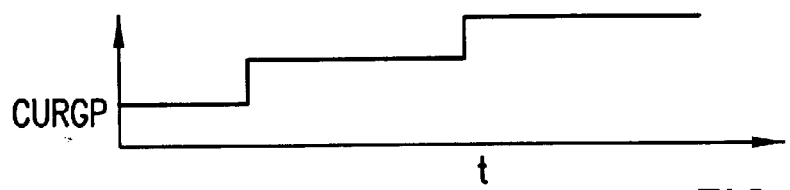
Figure 22C:
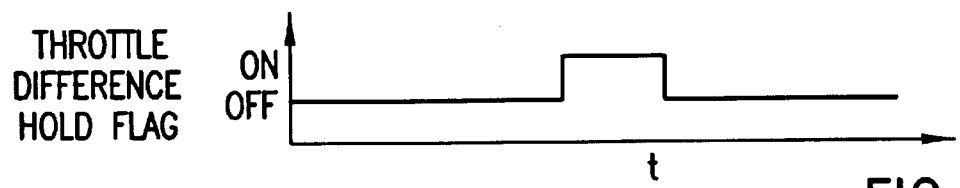
Figure 22D:
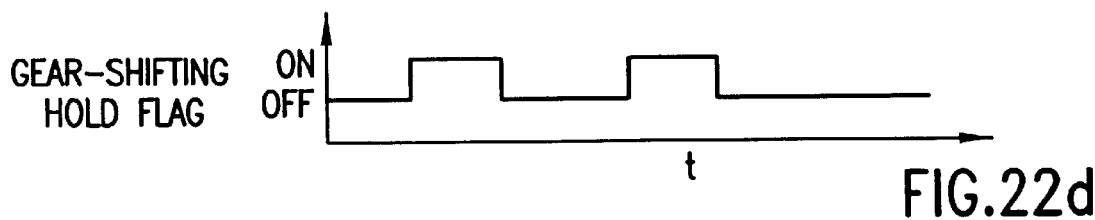
Figure 22E:
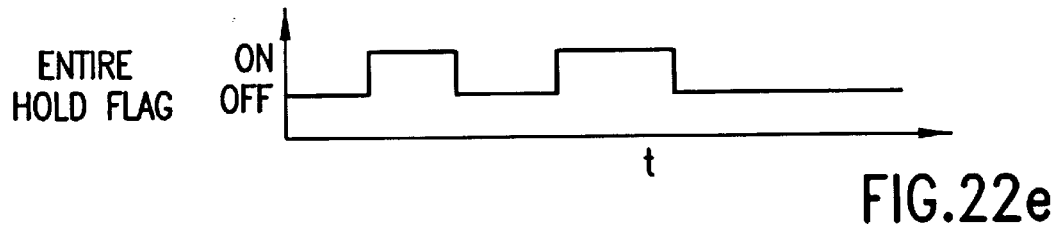

FIGS. 20 and 21 illustrate an arrangement according to the invention to eliminate noises due to errors which occur in the estimated slope (because of the low pass filter and other factors) when the vehicle speed is changed abruptly. (In some cases, errors also occur in the estimated slope due to calculation overflow, and a limiter must be set for entries in order to save memory space.) In the arrangement in FIG. 20, vehicle speed is differentiated in the vehicle speed differentiator unit 1040, to generate a signal DVSP indicative of vehicle acceleration, which is then passed through a low-pass filter LPF. Whether DVSP is larger than a preset threshold value DVSP-TH is determined in the differentiated vehicle speed Hold judgment unit 3014; when it is, a vehicle speed HOLD flag is output. When a HOLD flag is transmitted to the slope holding unit 3030, the value just before HOLD flag is held to eliminate the noises.

Figure 53:
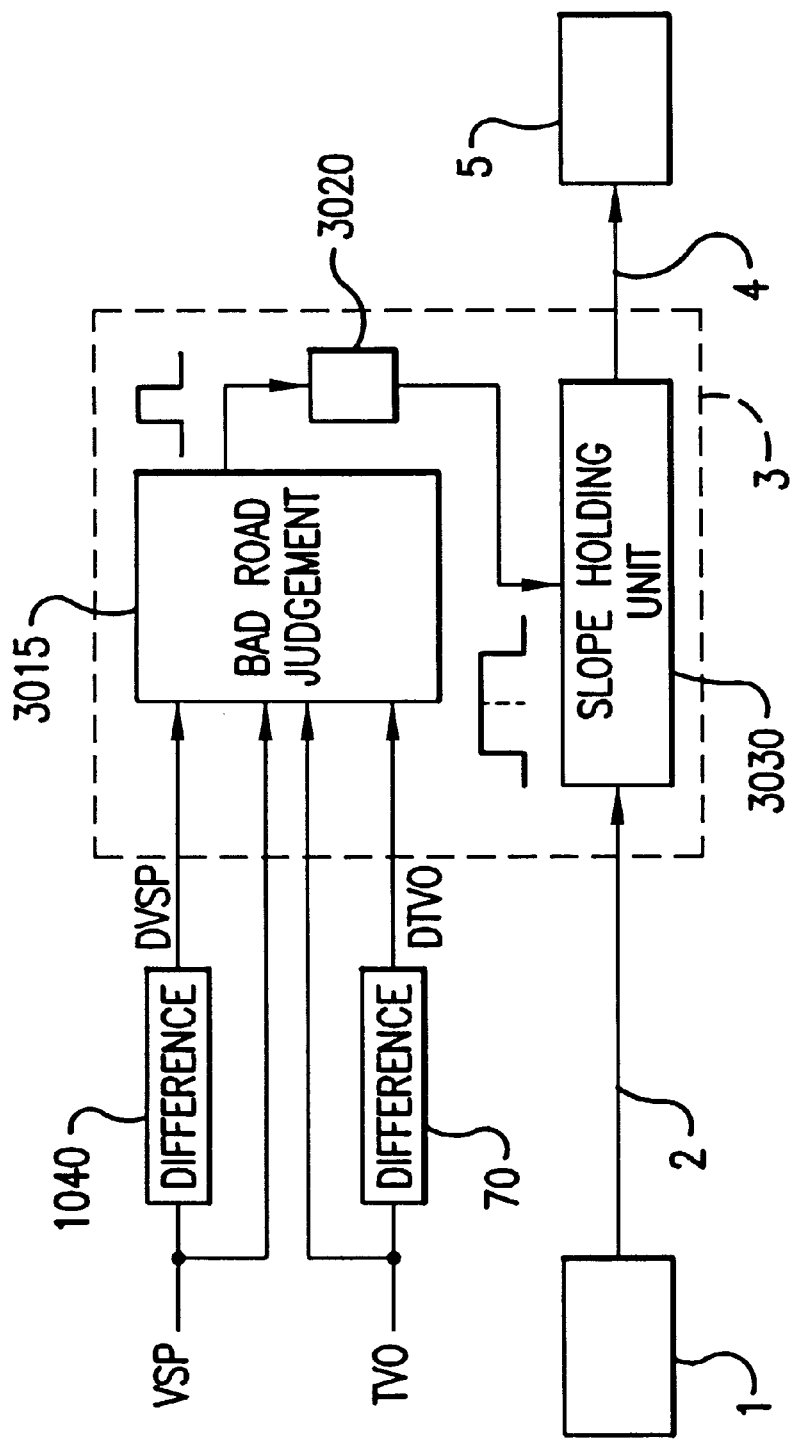
FIG. 53 is a block diagram of the procedure for noise elimination processing on a bad road.

FIG. 53 explains an embodiment of the invention to eliminate noises attributable to bumpy roads. On bumpy roads, the vehicle body frequently moves upward and downward abruptly, causing errors in the estimated slope. In the arrangement in FIG. 53, the vehicle speed signal VSP and the throttle valve opening signal TVO are first differentiated in differentiator units 1040 and 70, and are entered to the bad road judgment unit 3015. A determination is made in bad road judgment unit 3015 whether those values fail within predetermined limits, and a bad road hold flag is output when the limits are exceeded. When the bad road hold flag is ON, and for a certain time thereafter (due to delay unit 3020), a HOLD ON signal is transmitted to the slope holding unit 3030, and the immediately preceding estimated slope value is held, to eliminate noises.

Figure 54:
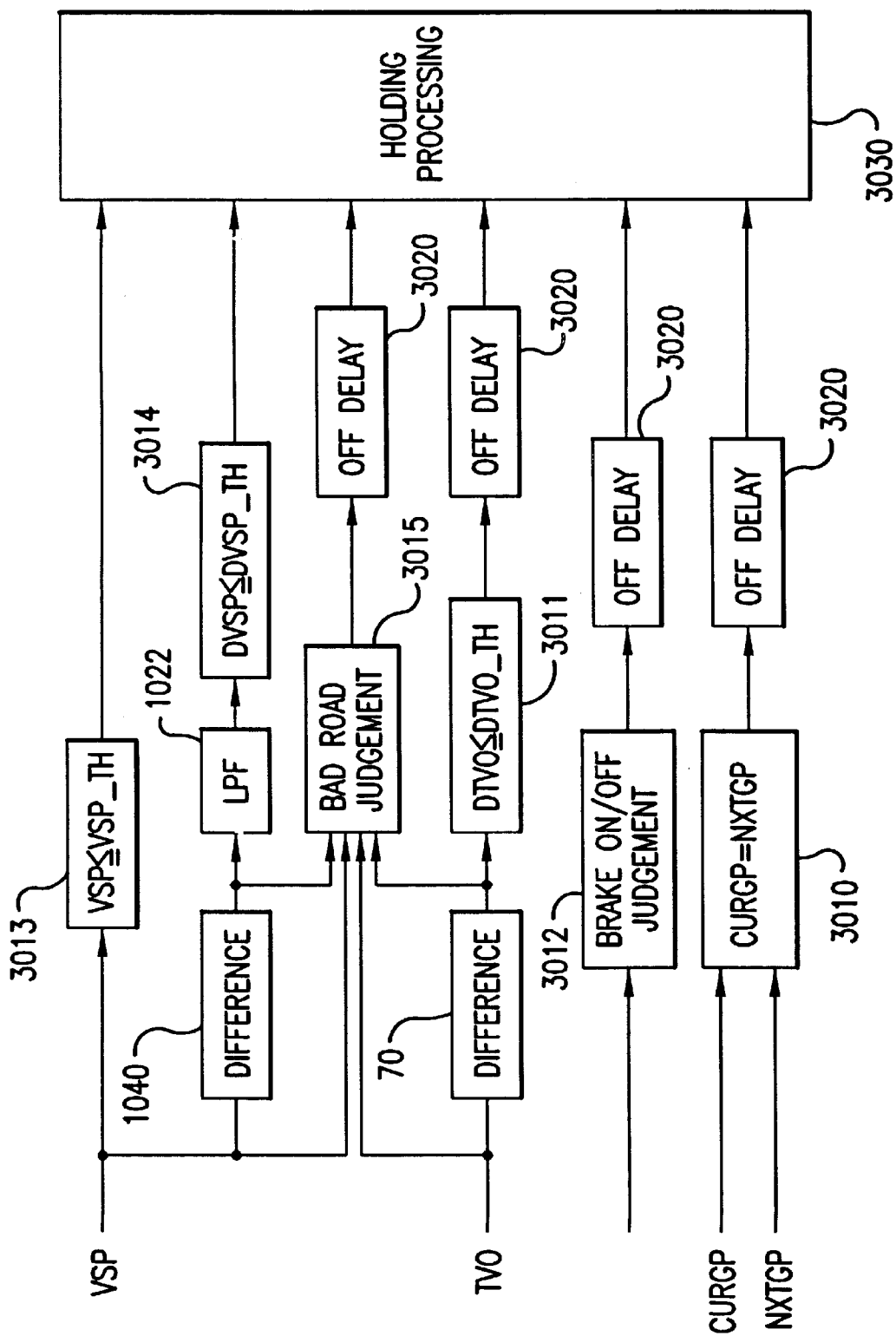
FIG. 54 is a block diagram of the procedure for the entire noise elimination processing.

FIG. 54 shows a block diagram of an arrangement for noise elimination processing which includes all of the apparatus described above. The vehicle speed, throttle opening, brake signal, and gear position signal are entered to each of the judgment units 3010 to 3015. When HOLD ON is generated by reason of any one of those signals, the estimated slope is held constant. That is, when HOLD ON is generated in the slope holding unit 3030, the immediately preceding value is held to eliminate the noises.

FIG. 22 is a timing diagram which explains how the estimated slope is held when two or more of the factors discussed hereinabove are detected. FIG. 22, for example, shows the throttle valve opening signal TVO and the current gear position signal CURGP, as well as the resulting hold flag signals for each. The hold flag for the entire system is output so long as the hold flag for either of those factors remains set. (See "Entire Hold Flag".)

Figure 23:
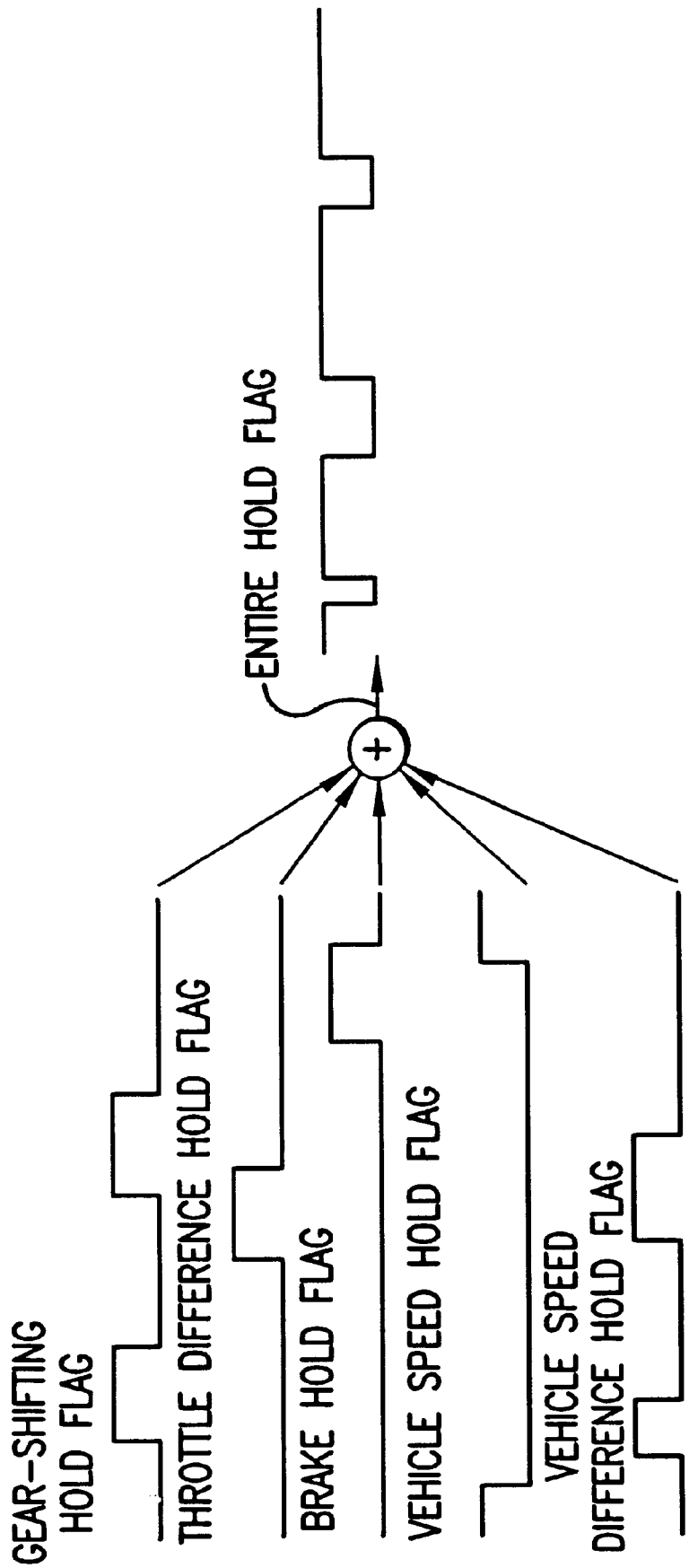
FIG. 23 shows a block diagram for generating a hold signal as the sum of two or more factors.

FIG. 23 explains how the hold signal is generated for the sum of all of the factors mentioned above. This hold flag for the sum of the factors is generated as the sum of the gear shifting hold flag, the throttle difference hold flag, the brake hold flag, the vehicle speed hold flag, and the differentiated vehicle speed hold flag.

Figure 24:
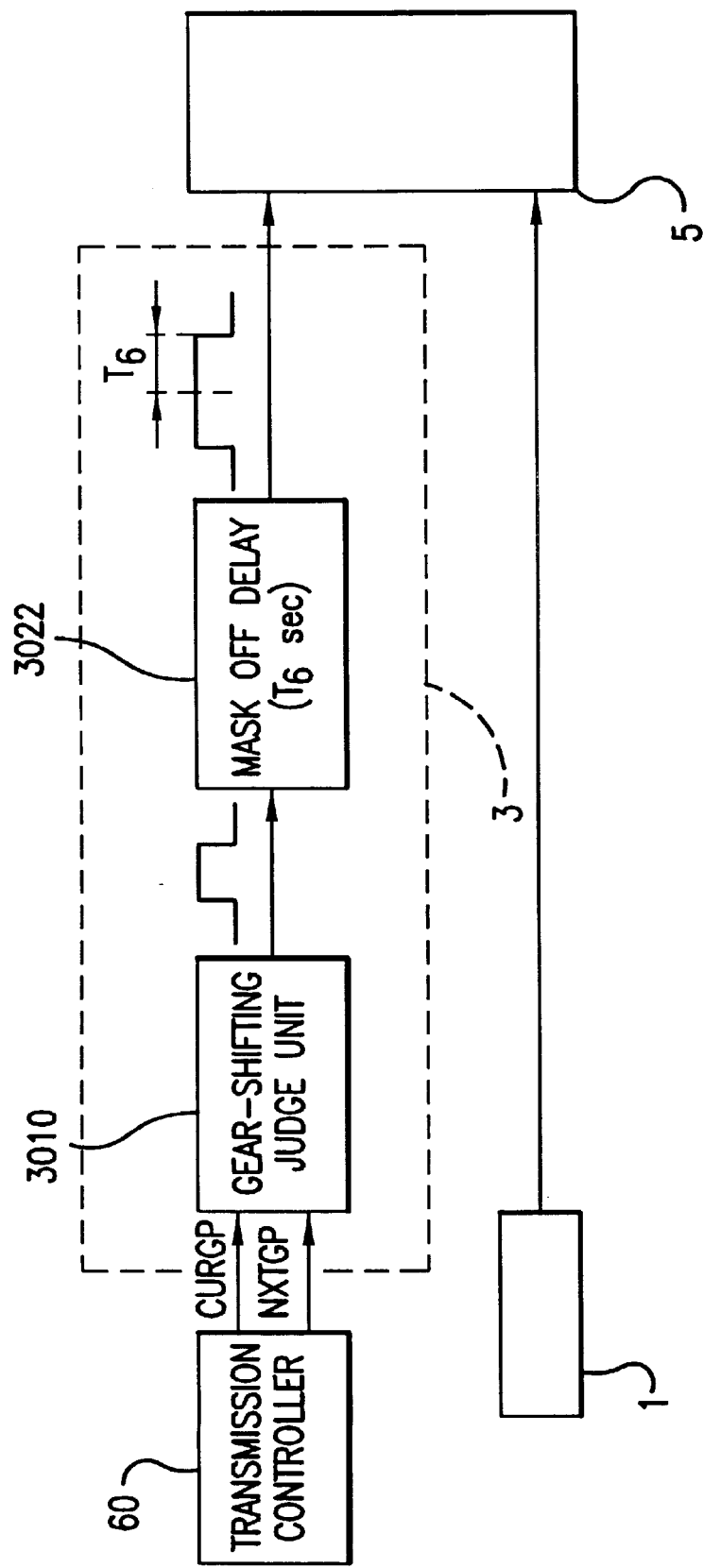
FIG. 24 shows an embodiment of an arrangement for noise elimination according to a mask flag.

FIG. 24 explains an embodiment of the invention to eliminate noises using a mask flag. In this arrangement, the vehicle gear shifting status is determined in the gear shifting sensor unit 3010 and the gear shifting flag is output according to whether the current gear position signal output from the transmission controller 60 matches with the next gear position signal. (See FIG. 12.) When the gear shifting flag is output to the delay unit 3022 by the sensor unit 3010, and for a preset time (T6 sec) thereafter, the mask flag is output to the navigation unit 5, together with the slope information 2. The mask flag value is then checked to determine whether to use the slope 2 and eliminate noises.

Figure 25:
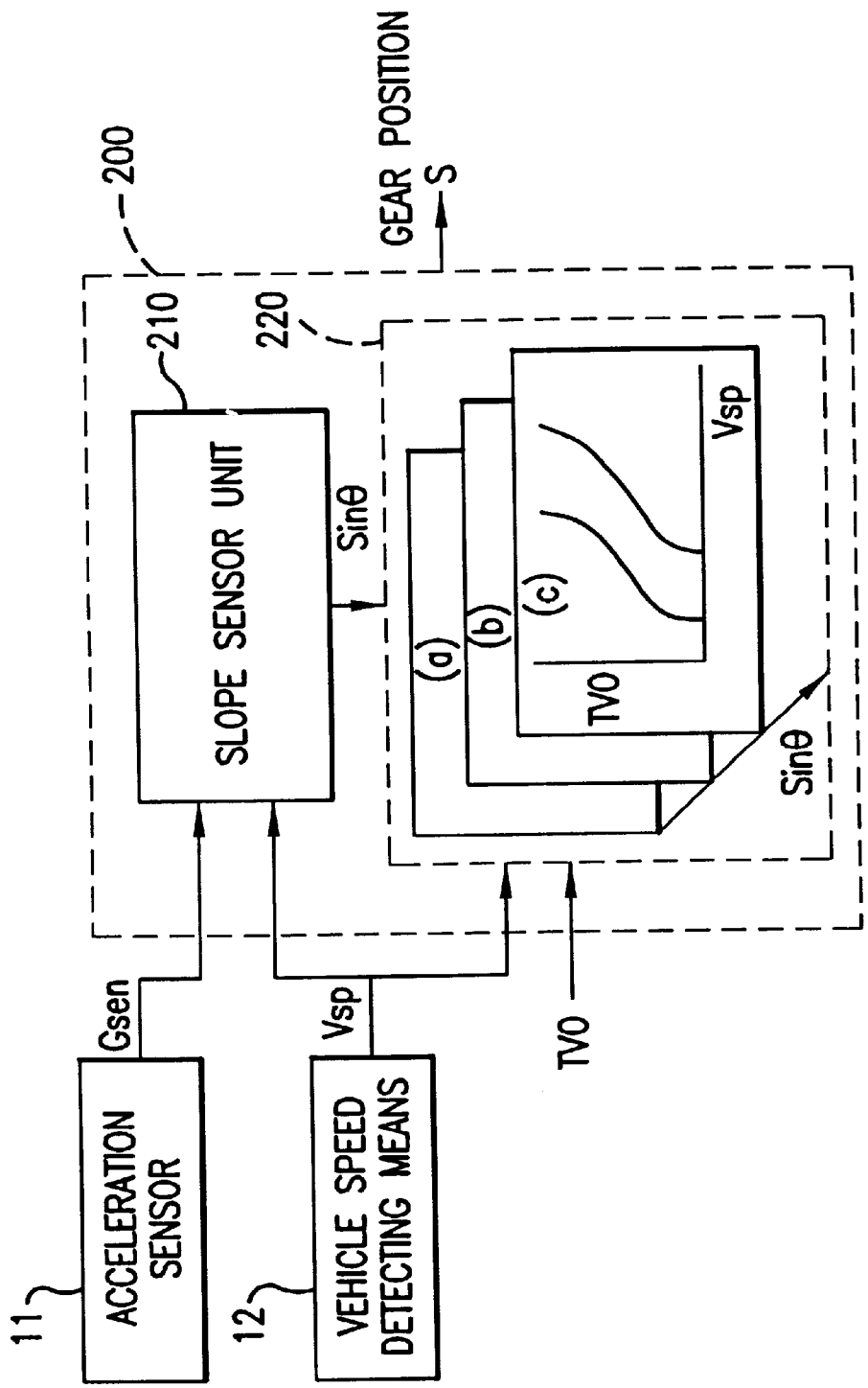
FIG. 25 is a block diagram of an embodiment of the invention for controlling a transmission.

The slope value detected in the manner disclosed herein can be used to control the transmission of vehicles, as shown in FIG. 25. In this application, 200 indicates the transmission controller, while 210 indicates a slope sensor unit, and 220 indicates a transmission pattern selector contained therein. The acceleration sensor 11 and the vehicle speed detecting means 12 are the same as those described herein (see, e.g., FIG. 38), and the slope sensor unit 210 may, for example, be the same one of the slope sensor units explained in FIGS. 5 through 8. The unit 210 senses the slope Sin θ from the signal Gsen supplied from the acceleration sensor 11 and the signal Vsp supplied from the vehicle speed detecting means 12, The unit 210 then supplies the detected slope Sin θ to the transmission shift pattern selector 220, which is equipped with three types of shifting patterns; (a), (b), and (c). The selector 220 selects one of the patterns according to the slope Sin θ supplied from the slope sensor unit 210, and queries the selected pattern based on the vehicle speed signal Vsp supplied from the vehicle speed detecting means 12 and the throttle opening signal TVO supplied from the throttle valve opening sensor (not shown in this figure), to determine a desired gear position. The transmission control 200 then outputs the signal S indicating the desired gear position of the transmission. The transmission, not shown in the figure, selects the gear position according to the signal S.

Figure 26A:
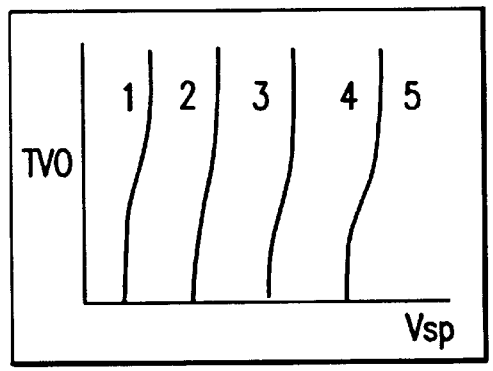
FIG. 26 is a gear shifting look up table.
Figure 26B:
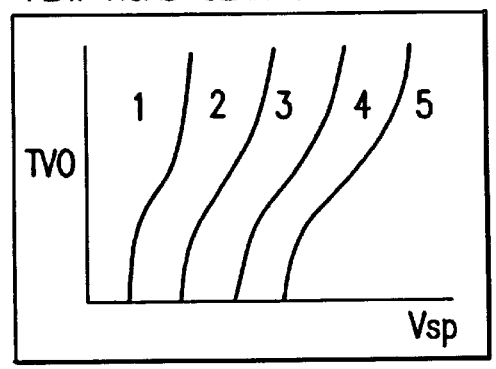
Figure 26C:
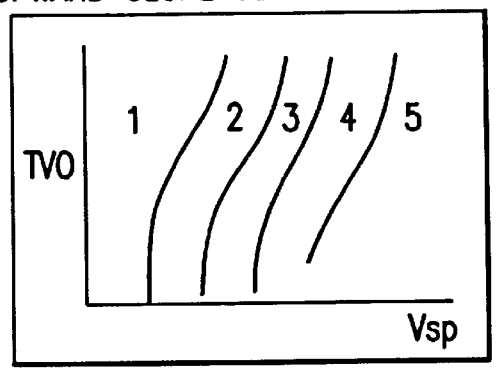

FIG. 26 shows an example of three types of gear shifting patterns: a downward slope pattern (a), a flat surface pattern (b), and an upward slope pattern (c). The downward slope gear shifting pattern (a) is designed so that the gear can be shifted up at a lower speed than on a flat road to avoid excessive torques. The upward slope gear shifting map (c) is designed so that the gear can be shifted up at a higher speed than on a flat road in order to go up the hill easily with the gear set at a lower position with a large torque. As a result, the gear shifting schedule is changed according to the slope Sin θ, allowing the gear to be shifted appropriately to the target slope without a sense of incompatibility.

In other words, in this embodiment, as shown clearly in FIG. 26, the gear shifting schedule is described as a gear shifting pattern whose throttle opening TVO is represented on the vertical axis and whose vehicle speed Vsp is represented on the horizontal axis. Such a gear shifting map is prepared for each slope and selected according to the slope Sin θ. Therefore, in this embodiment, the optimized gear shifting ratio is always given automatically regardless of the slope status. Gear shifting is thus possible in a wide range of driving conditions. Gear shifting frequency can be reduced and the braking frequency can also be reduced, keeping the proper driving status.

Figure 27:
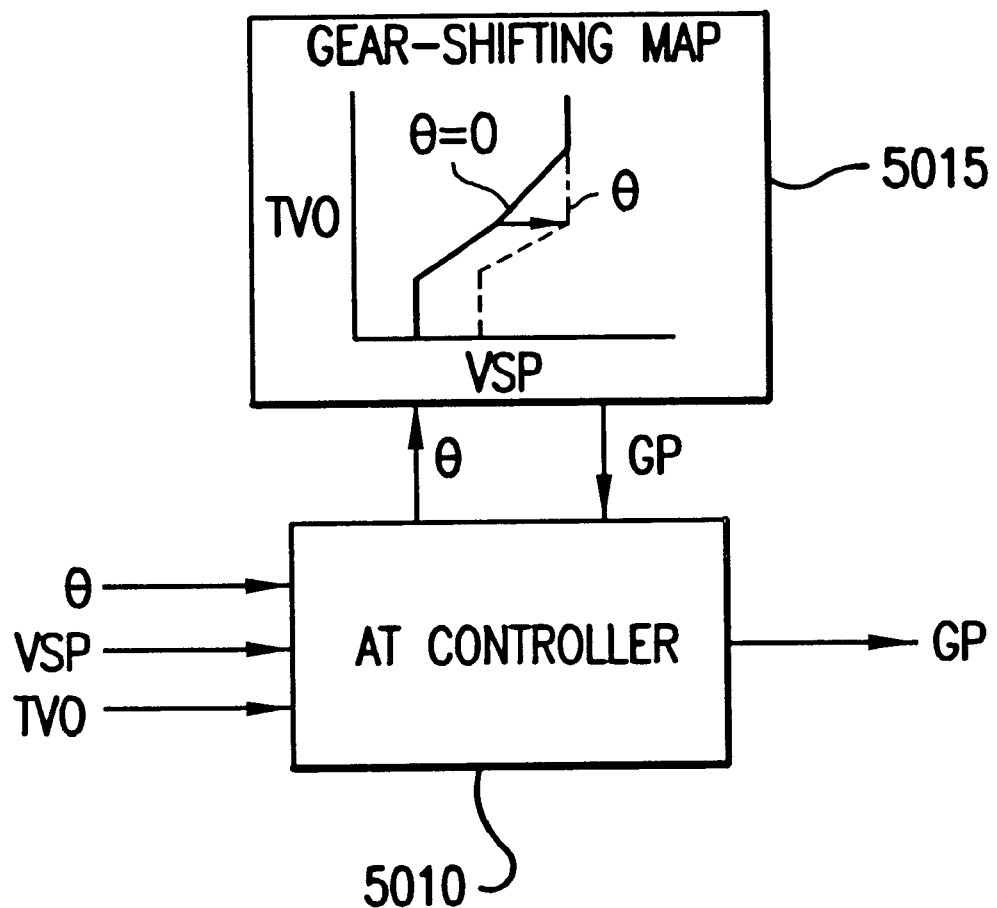
FIG. 27 shows another embodiment of the invention to control a transmission.

FIG. 27 shows another embodiment of this invention for controlling a vehicle transmission. The estimated slope signal θ, vehicle speed signal VSP, and throttle opening signal TVO are entered to the transmission controller 5010. A gear shifting look up table stored in memory 5015 is modified as described below in response to changes in the slope, and the gear position is determined according to the throttle opening. In this manner, frequent shifting that is often encountered when running on an upward slope at high speeds can be avoided, and up-shifting at the beginning of upward slopes and excessive acceleration on downward slopes can be prevented.

Figure 28:
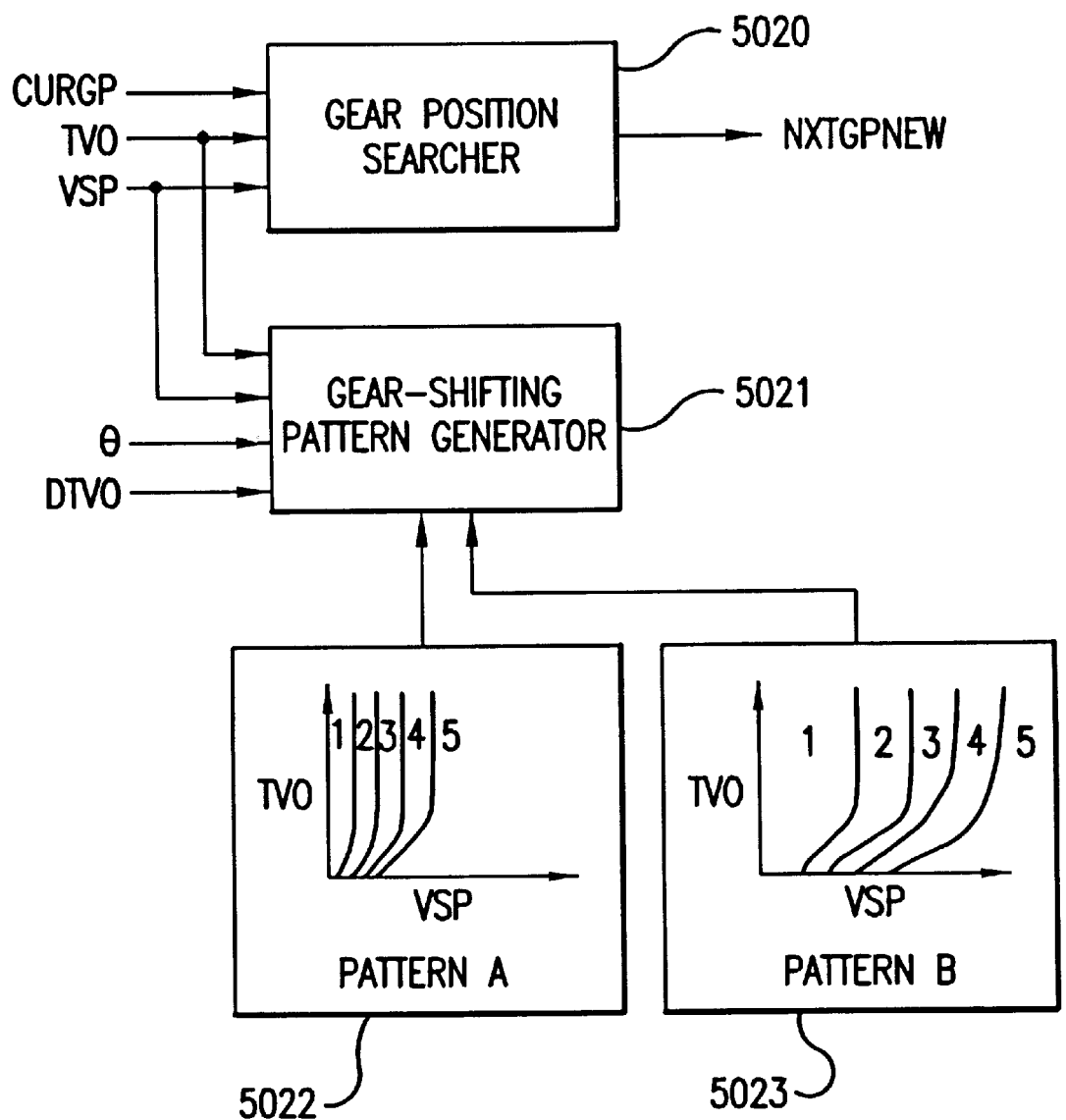
FIG. 28 shows still another embodiment of the invention to control a transmission.

In FIG. 28, a gear shifting pattern optimized for the vehicle's current operating status is generated in the gear shifting pattern generator 5021 by interpolation between pattern A 5022 (in which the gear shifting lane is closer to the low speed side, and up-shifting is needed immediately at low speeds) and preset pattern B 5023 (in which up-shifting is not needed until higher vehicle speed, the gear shifting lane being closer to the high speed side). TVO, VSP, DTVO, and 0 are used to create the optimized pattern in a manner described below. The gear shifting pattern thus created is used to search and output the next specified gear position NXTGPN in and from CURGP, TVO, and VSP by the transmission controller 5020. In pattern B (5023) the gear shifting lane is moved toward higher vehicle speed relative to pattern A (5022); however, it may also be moved in the direction of narrower throttle valve opening TVO. That is, the curves may be moved downward as well as to the right. When the gear shifting lane is moved upward up-shifting-up will occur more readily. When the pattern is moved downward (lower values of TVO) up-shifting is less likely.

Figure 29:
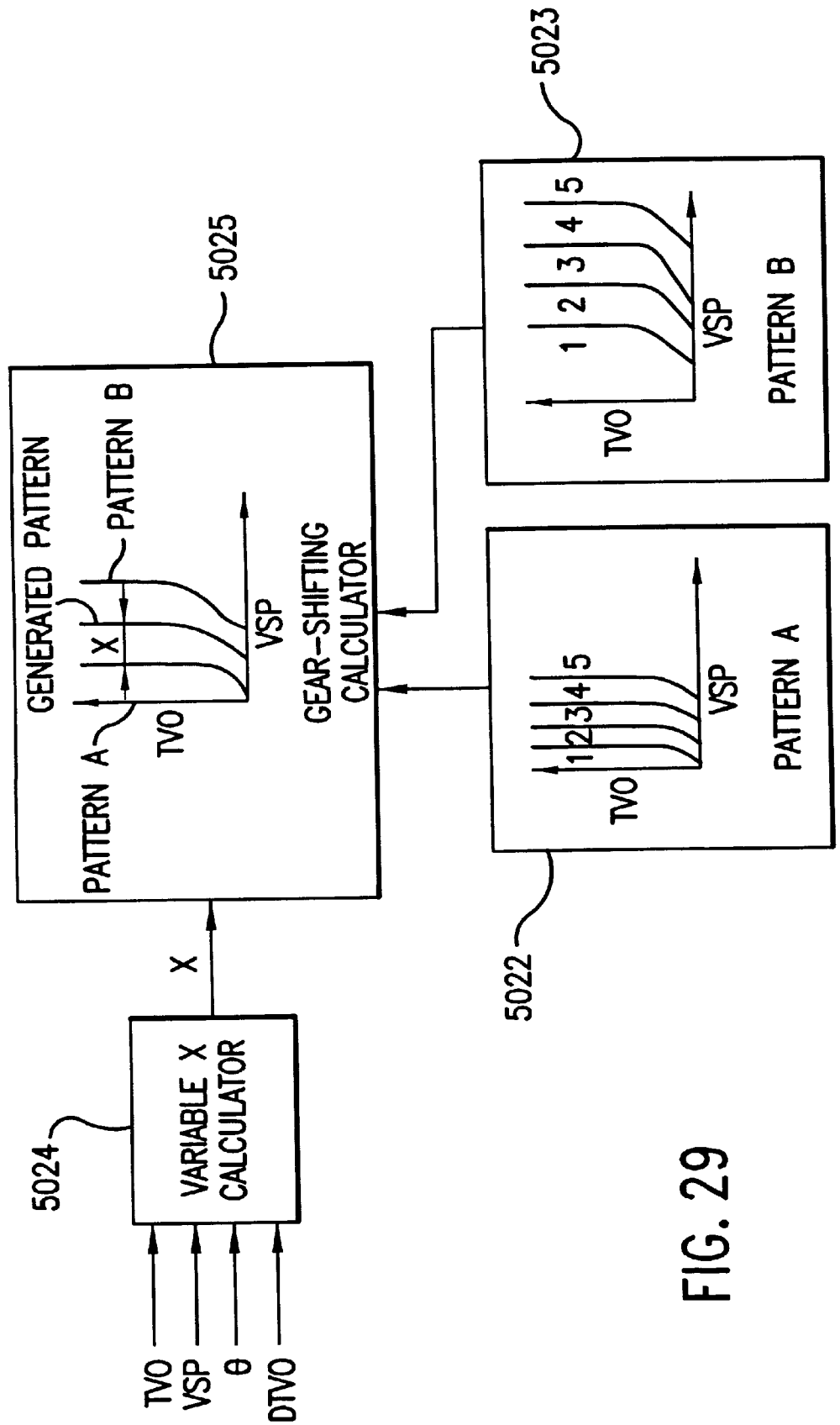
FIG. 29 shows a block diagram for generating a gear shifting pattern.

FIG. 29 shows a block diagram of an arrangement to generate a gear shifting pattern as provided in FIG. 28. The variable X is calculated in the variable X calculator 5024 (FIG. 30) using throttle valve opening TVO and its first derivative DTVO, vehicle speed VSP, and estimated slope θ. The difference between pattern A 5022 and pattern B 5023 is interpolated in the gear shifting pattern calculator 5025 according to the variable X to generate a gear shifting pattern.

Figure 30:
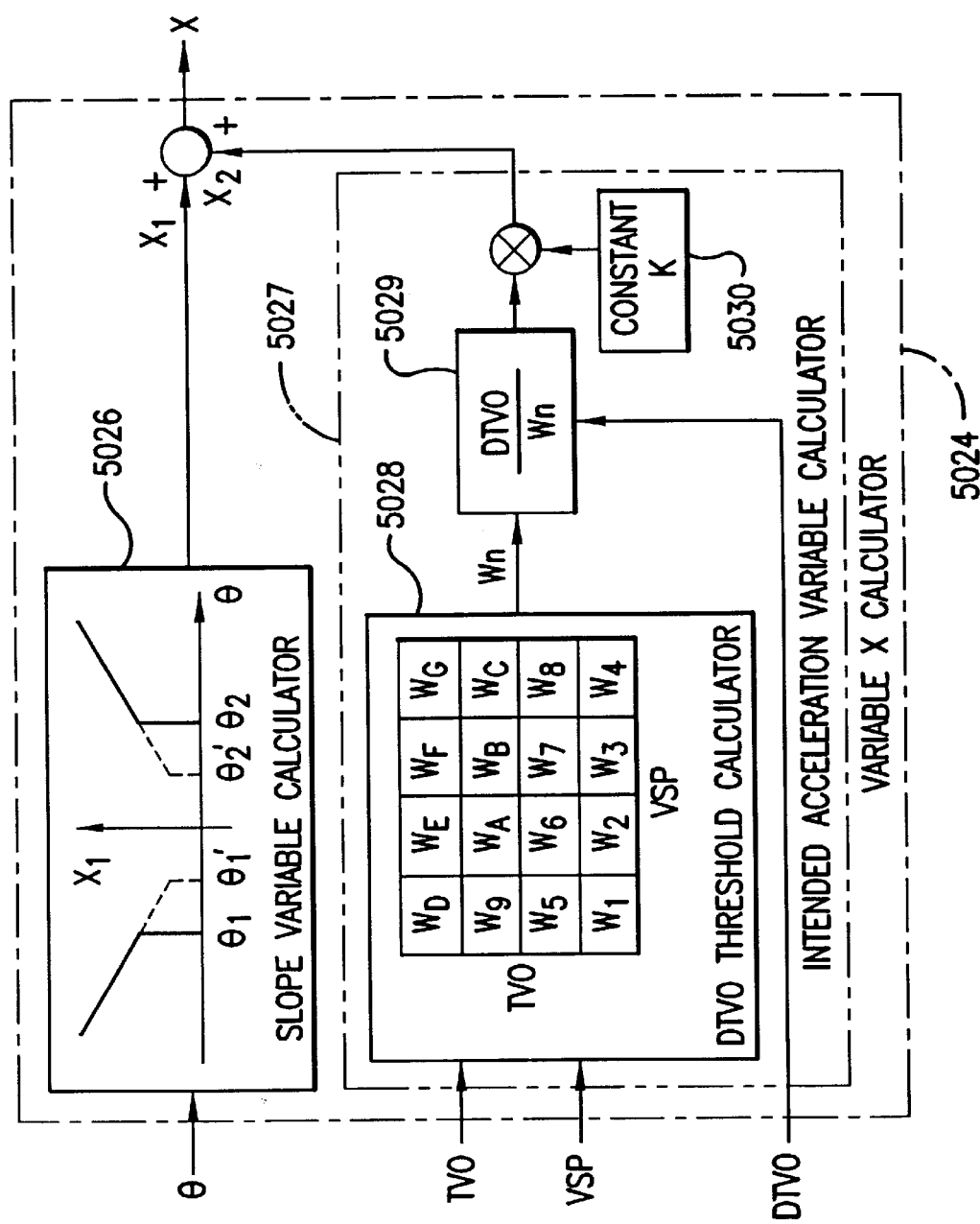
FIG. 30 shows a block diagram for calculating a variable of a gear shifting pattern.
Figure 31A:
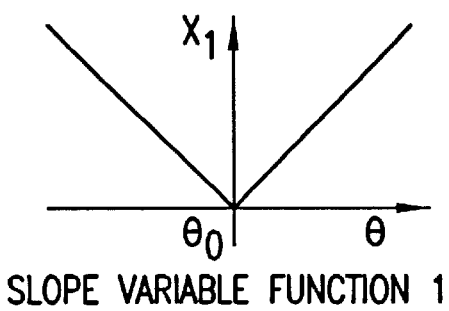
FIG. 31 is a graphic depiction of various gear shifting pattern slope variable functions.
Figure 31B:
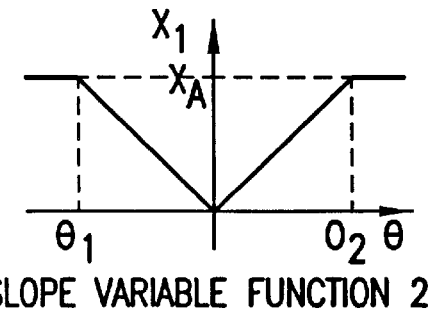
Figure 31C:
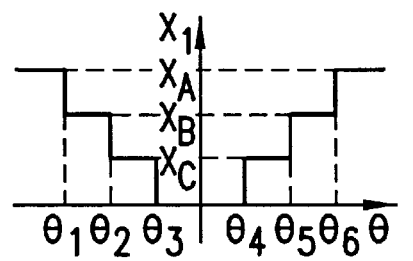
Figure 31D:
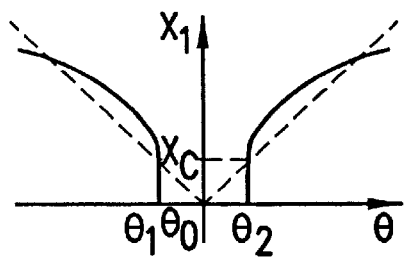

As shown in FIG. 30, the variable X calculator 5024 comprises a slope variable calculator 5026 used to calculate a variable $x_1$ of the gear shifting pattern based on the vehicle's slope, and an intended acceleration variable calculator 5027 used to calculate the variable $x_2$ of the gear shifting pattern according to the driver's intention to accelerate, as discussed below. As shown in FIG. 30, those outputs $x_1$ and $x_2$ are summed to generate the variable X.

The slope variable calculator 5026 treats vehicle slope θ as the argument of a function to calculate $x_1$. For example, between $\theta_1$ and $\theta_2$, $X_3$ is fixed. If θ is less than $\theta_1$ or greater than $\theta_2$, however, the value of $x_1$ varies directly with the absolute value of θ, as shown by the graphic representation in slope variable calculator 5026. Thus, the gear shifting pattern remains the same within the range of $\theta_1$ to $\theta_2$, but when the vehicle enters on an upward or downward slope which exceeds the range $\theta_1$–$\theta_2$, the gear shifting lane is moved to the high speed side, depending on the slope.

In the intended acceleration variable calculator 5027, the DTVO threshold calculator 5028 determines a DTVO threshold value Wn, based on TVO and VSP. DTVO is then divided by the DTVO threshold value $W_n$, and the result is multiplied by a constant k to calculate $x_2$. After this, the calculator 5024 calculates the variable X as the sum of $x_1+x_2$. Thus, the variable x is a function of both the angle of the vehicle operating surface and the intended vehicle acceleration.

FIG. 31 shows a number of slope variable functions which may be used as alternatives to that shown in slope variable calculator 5026 in FIG. 30. (A) is a function such that for all values of θ, $X_1=k|\theta|$, where k is a proportionality constant. When this function is used, the gear shifting pattern is changed in proportion to the slope. (B) is a function similar to (A) except that an upper limit is imposed on $X_1$. Within the range of $\theta_1$ to $\theta_2$, this function is the same as (A); in other cases $X_1$=xa is fixed. (C) is a function used to change the gear shifting pattern in steps within the range of the subject slope in which xa is assumed for less than $\theta_1$, xb for $\theta_1$ to $\theta_2$, xc for $\theta_2$ to $\theta_3$, $x_0$ for $\theta_3$ to $\theta_4$, xc for $\theta_4$ to $\theta_5$, xb for $\theta_5$ to $\theta_6$, and xa is assumed for more than $\theta_6$ respectively. The number of steps can be varied as desired. (D) is a function in which x, is fixed for values θ between $\theta_1$ and $\theta_2$. However, when θ is less than $\theta_1$ or larger than $\theta_2$ $x_1$ varies with the absolute value of θ according a preset function in which the slope of the $x_1$ curve becomes smaller as |θ| increases. Those functions mentioned above may be used in place of the function of the slope variable calculator 5026 shown in FIG. 30.

Figure 32A:
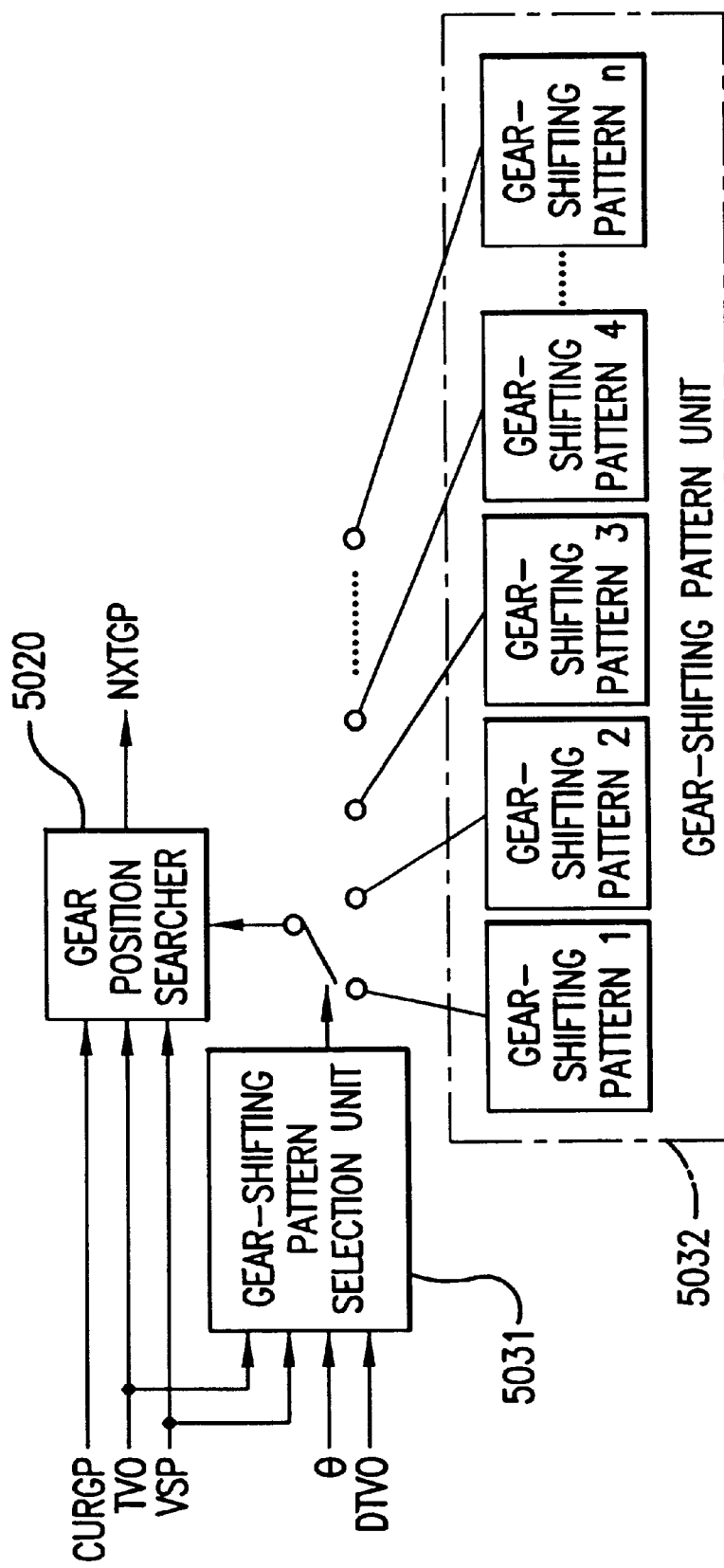
FIG. 32A shows another embodiment of the invention to control the transmission.

FIG. 32A shows yet another embodiment of the invention to control the transmission. A target gear shifting pattern is selected by the gear shifting pattern selection unit 5031 from among the gear shifting patterns stored in memory unit 5032, based on TVO, VSP, DTVO, and θ. For this purpose, a parameter S is calculated according to the equation:

$$S=\xi(\Theta) \cdot K_1+\phi(DTVO) \cdot K_2+N \qquad \text{[Expression 19]}$$

wherein N is an integer which designates the normal shifting pattern that is used on a flat surface at constant vehicle speed. A shifting pattern is then selected from among those indicated in FIG. 33, based on the value of S. (If S=2.3, for example, pattern 2 is selected; if S=4.0, pattern 4 is selected, etc.)

Figure 32B:
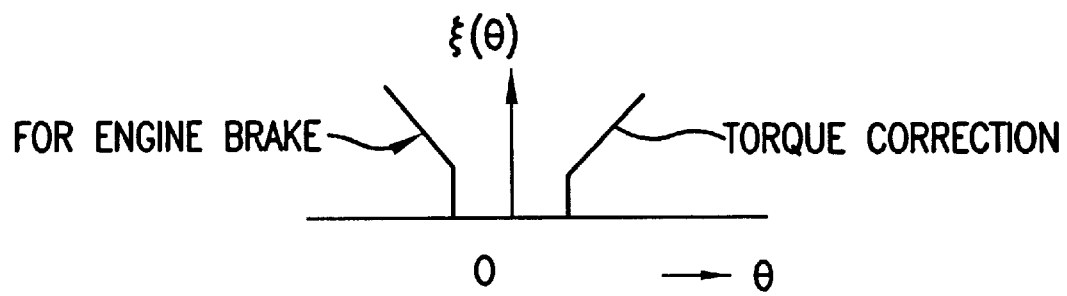
FIGS. 32B and 32C are graphic representations of functions used to select a shift pattern in FIG. 32A.
Figure 32C:
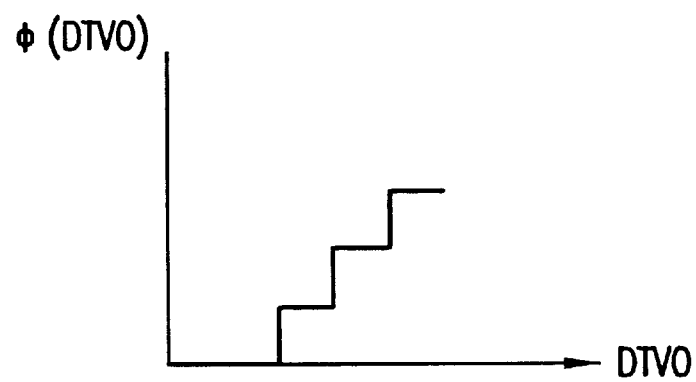

The functions ξ and φ in Expression 19 are shown in FIGS. 32B and 32C. In practice, the quantities TVO and VSP are also taken into account in the calculation of the parameter S, as shown in FIG. 32A, in a manner analogous to that set forth above.

The gear shifting pattern selected in this manner is then used to determine the next specified gear position NXTGP in the gear position searching unit 5020, in response to CURGP, TVO, and VSP. In this manner, the frequent shifting that is often encountered when running on an upward slope at high speeds, up-shifting at the beginning of an upward slope and excessive acceleration on a downward slope can be prevented.

FIG. 33 explains the gear shifting patterns used in the gear shifting pattern unit 5032 shown in FIG. 32. Pattern (A), in which the first gear is selected regardless of the values of the throttle opening and vehicle speed, is adapted for sharp upward slopes that the vehicle can ascend only in first gear, or for the sharp downward slopes for which engine braking by the first gear must be used. Pattern (B) is useful for sharp upward slopes that require the use of first or second gear, or sharp down slopes that require engine braking in second gear. Pattern (C) is for upward slopes that require the first to the third gears, or downward slopes that require engine braking by the third gear. (D) is selected for travelling uphill at high speeds without frequent shifting. (E) is for normal running on a flat road, while (F) is used when quick acceleration or strong power is needed. Pattern (G) permits slow acceleration and low-fuel consumption. Pattern (H) is best for going up a winding hill at low speeds in order to prevent up-shifting. (I) is for slow acceleration at high speed in order to prevent unexpected down-shifting. (J) is selected when starting with the second gear on a low traction road or a downward slope. Finally (K) is selected when starting with the third gear on a low traction road or downward slope.

Figure 34:
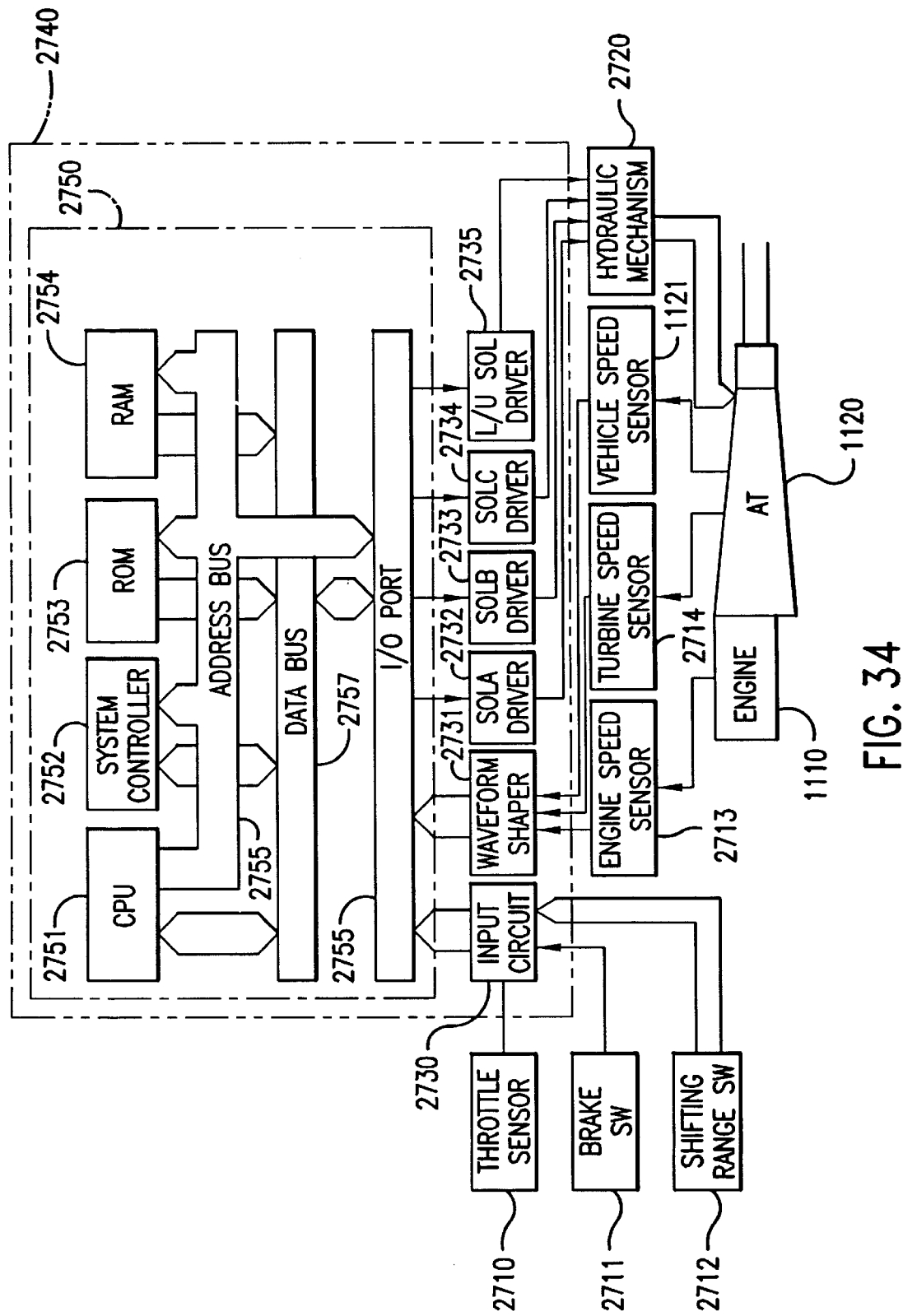
FIG. 34 shows another arrangement according to the invention for controlling the transmission based on the estimated slope.

FIG. 34 shows a hardware configuration to control the slope oriented transmission. The signals from the engine speed sensor 2713, the turbine speed sensor 2714, and the vehicle speed sensor 1121 attached to the engine 1110, automatic transmission 1120, etc., the throttle sensor 2710, the brake SW 2711, the shifting range SW 2712, and the like are entered into the auto transmission control unit 2740. Those signals are then entered to the I/O interface 2755 of the microcomputer 2750 through the input circuit 2730 and the waveform shaper 2731 for A/D conversion and cycle measurement. At this time, the clock time is controlled by the system controller 2752, which is operated with the program stored in the ROM 2753 to be executed in the CPU 2751. Data retrieved from memory are saved in the RAM 2754 once, then used to estimate torque, slope, gear shifting pattern change, etc. under the control of the program in the ROM 2753. The resulting gear position and L/U signals are output to the shifting solenoid A, B, and C drivers 2732 to 2734 and the L/U solenoid driver 2735 from the I/O port 2755 to operate the hydraulic mechanism and control the transmission. The ROM 2753 also contains the gear shifting pattern, pump torque, and engine torque look-up tables.

In addition to controlling gear shifting in response to the estimated slope, the arrangement according to the invention can also be used to optimize a vehicle speed control unit. For this purpose, a means to record the vehicle speed and a status sensing unit are provided to determine the status of the speed control unit according to the slope, so that a target acceleration can be obtained independently of the slope.

The slope information obtained from the slope detecting means may also be used to improve the accuracy of a navigation system that is equipped with a means to detect the vehicle location. In addition, such slope information may also be used to drive the throttle and a throttle controller to accelerate the vehicle speed accurately according to acceleration pedal depression, independently of the slope. Furthermore, as explained above, this invention can provide every vehicle with noiseless estimated slope information for stable vehicle control.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for generating an operating signal indicative of a slope of a surface on which a vehicle is supported, based on sensed operating parameters of said vehicle, a method of eliminating errors in said operating signal caused by noise, said process comprising:

sensing at least one operating parameter of said vehicle which is indicative of slope of said surface, and generating output signals indicative thereof;

processing said output signals in a data processor and generating said operating signal in response thereto;

detecting occurrence of at least one predetermined condition which causes noise in said operating signal, and generating a noise suppression signal in response thereto; and during existence of said noise suppression signal, maintaining said operating signal at a value thereof immediately prior to the generation of said noise suppression, until said noise suppression signal terminates.

2. Method according to claim 1 wherein said at least one predetermined condition comprises at least one of gear shifting in an automatic transmission, change of throttle valve opening, operation of brakes, low vehicle speed, vehicle acceleration, rough road and slippery road surface.

3. In a process for estimating slope of a surface on which a vehicle is supported, the steps of:

sensing at least one operating parameter of said vehicle and generating first signals indicative thereof;

processing said first signals in a data processor to provide an estimated slope value;

detecting occurrence of at least one predetermined operating condition which causes errors in said estimated slope value;

generating a noise elimination signal in response to detection of said predetermined operating condition;

suppressing changes of said estimated slope value during generation of said noise elimination signal.

4. Method according to claim 3, wherein said at least one predetermined operating condition comprises a plurality of operating conditions, and wherein said suppressing step is performed whenever a noise elimination signal is generated in response to at least one of said plurality of operating conditions.

5. A process for generating an operating signal indicative of a slope of a surface on which a vehicle is supported, based on sensed operating parameters of said vehicle, a method of eliminating noise in said operating signal, said process comprising:

sensing a plurality of said operating parameters and generating respective output signals indicative of said operating parameters;

based on said output signals, detecting occurrence of at least one predetermined condition indicative of an occurrence of noise in said operating signal, said predetermined condition being selected form the group consisting of gear shifting in an automatic transmission, change of throttle valve opening, operation of brakes, low vehicle speed, rough road and slippery road surface;

generating a noise suppression signal in response to detection of said predetermined condition; and maintaining said operating signal at a value thereof immediately prior to said noise suppression signal until said noise suppression signal terminates.

6. In a device for generating an operating signal indicative of a slope of a surface on which a vehicle is supported, based on sensed operating parameters of said vehicle, apparatus eliminating noise in said operating signal, said apparatus comprising:

at least one sensor for sensing operating parameters of said vehicle and generating output signals indicative thereof; and a digital computer system having a computer readable memory encoded with a program which includes code for processing said output signals to detect occurrence of at least one predetermined condition which causes noise in said operating signal, said predetermined condition being selected from the group consisting of gear shifting in an automatic transmission, change of throttle valve opening, operation of brakes, low vehicle speed, rough road and slippery road surface;

generating a noise suppression signal in response to detection of said predetermined condition; and maintaining said operating signal at a value thereof immediately prior to the generation of said noise suppression signal, until said noise suppression signal terminates.

* * * * *